US010366519B2

(12) United States Patent
Lee et al.

(10) Patent No.: US 10,366,519 B2
(45) Date of Patent: Jul. 30, 2019

(54) OPERATING METHOD FOR IMAGE AND ELECTRONIC DEVICE SUPPORTING THE SAME

(71) Applicant: Samsung Electronics Co., Ltd., Suwon-si, Gyeonggi-do (KR)

(72) Inventors: Chul Hwan Lee, Seoul (KR); Chang Ho Lee, Suwon-si (KR); Yong Joon Jeon, Hwaseong-si (KR); Min Kyung Hwang, Seoul (KR); Sung Hyuk Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/172,837

(22) Filed: Jun. 3, 2016

(65) Prior Publication Data
US 2016/0357406 A1 Dec. 8, 2016

(30) Foreign Application Priority Data
Jun. 5, 2015 (KR) ........................ 10-2015-0079842

(51) Int. Cl.
| | |
|---|---|
| *G06T 11/60* | (2006.01) |
| *G06T 7/11* | (2017.01) |
| *G06K 9/00* | (2006.01) |
| *G06K 9/20* | (2006.01) |
| *G06K 9/22* | (2006.01) |
| *H04N 5/232* | (2006.01) |
| *G06T 7/162* | (2017.01) |
| *G06T 7/187* | (2017.01) |

(52) U.S. Cl.
CPC .......... *G06T 11/60* (2013.01); *G06K 9/00228* (2013.01); *G06K 9/2081* (2013.01); *G06K 9/22* (2013.01); *G06T 7/11* (2017.01); *G06T 7/162* (2017.01); *G06T 7/187* (2017.01); *H04N 5/23293* (2013.01); *G06T 2200/24* (2013.01); *G06T 2207/20132* (2013.01)

(58) Field of Classification Search
CPC ..... G06F 3/041; H04N 21/4728; H04N 7/147
See application file for complete search history.

(56) References Cited

U.S. PATENT DOCUMENTS

| | | | |
|---|---|---|---|
| 2003/0158855 A1* | 8/2003 | Farnham | G06F 3/0481 |
| 2010/0026872 A1* | 2/2010 | Jiang | G03B 17/38 |
| | | | 348/333.03 |

(Continued)

FOREIGN PATENT DOCUMENTS

KR 10-2009-0042381 A 4/2009

*Primary Examiner* — Weiming He
(74) *Attorney, Agent, or Firm* — Jefferson IP Law, LLP

(57) ABSTRACT

An electronic device is provided. The electronic device includes a display outputting a screen, a processor electrically connected to the display, and a memory electrically connected to the processor and configured to store at least one image and instructions. The instructions are configured to, when executed by the processor, cause the processor control the display to display a candidate image having a first size and including at least a portion of the stored at least one image, and control the display to display a recommendation object having a second size smaller than the first size and corresponding to a portion of the candidate image on the screen together with the candidate image.

18 Claims, 27 Drawing Sheets

(56) References Cited

U.S. PATENT DOCUMENTS

| | | | |
|---|---|---|---|
| 2010/0066751 A1* | 3/2010 | Ryu | G06F 1/1626 |
| | | | 345/581 |
| 2013/0135428 A1* | 5/2013 | Choi | H04N 5/23293 |
| | | | 348/36 |
| 2014/0204244 A1* | 7/2014 | Choi | H04N 5/23222 |
| | | | 348/231.99 |
| 2015/0022698 A1* | 1/2015 | Na | H04N 5/23222 |
| | | | 348/241 |
| 2016/0080643 A1* | 3/2016 | Kimura | H04N 5/23206 |
| | | | 348/207.1 |

\* cited by examiner

OPERATING METHOD FOR IMAGE AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Jun. 5, 2015 in the Korean Intellectual Property Office and assigned Serial number 10-2015-0079842, the entire disclosure of which is hereby incorporated by reference.

TECHNICAL FIELD

The present disclosure relates to an operation for an image.

BACKGROUND

An electronic device includes a display displaying an image. For example, the electronic device outputs a lock screen, a background screen, or a home screen through the display.

An image used for the lock screen or the background screen is an image stored in a memory, e.g., an image taken by a user, an image provided from an external source. An electronic device provides only a function to output the stored image when the image stored in the memory is applied to the screen according to the related art. Accordingly, to apply the image that the user wants to display as the lock screen, there is an inconvenience in that a complex process such as activating an editor like a drawing board and inputting various inputs associated with the editing of the image is performed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an operating method for an image and an electronic device, which are to simplify an image setting method of a specified screen by recommending at least one image using all or a part of an image when a screen to which an image is applied is set.

Another aspect of the present disclosure is to provide an operating method for an image and an electronic device, which are to set an image in consideration of not only an entire screen of the display but also a screen characteristic or a screen attribute (e.g., a screen layout (e.g., a widget, an icon, etc.) or an object set to be displayed in the screen) when the image is set as a background.

In accordance with an aspect of the present disclosure, an electronic device is provided. The electronic device includes a display outputting a screen, a processor electrically connected to the display, and a memory electrically connected to the processor and configured to store at least one image and instructions. The instructions are configured to, when executed by the processor, cause the processor control the display to display a candidate image having a first size and including at least a portion of the stored at least one image, and control the display to display a recommendation object having a second size smaller than the first size and corresponding to a portion of the candidate image on the screen together with the candidate image.

In accordance with an aspect of the present disclosure, a method of operating an application program is provided. The method includes displaying at least one candidate image through at least a portion of a display, displaying at least one recommendation object corresponding to specific areas of the candidate image selected from the at least one candidate image and having a size smaller than a size of the candidate image through an area distinguished from the candidate image, and setting a recommendation image corresponding to the recommendation object as a background image in response to a user input selecting the recommendation object.

According to various embodiments of the present disclosure, various embodiments may support the user to easily and rapidly select the portion of the image applied to the designated screen. In addition, various embodiments may recommend various partial images in consideration of the property of the screen, which is to be set, and thus the image that is adaptable to the screen state may be recommended.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
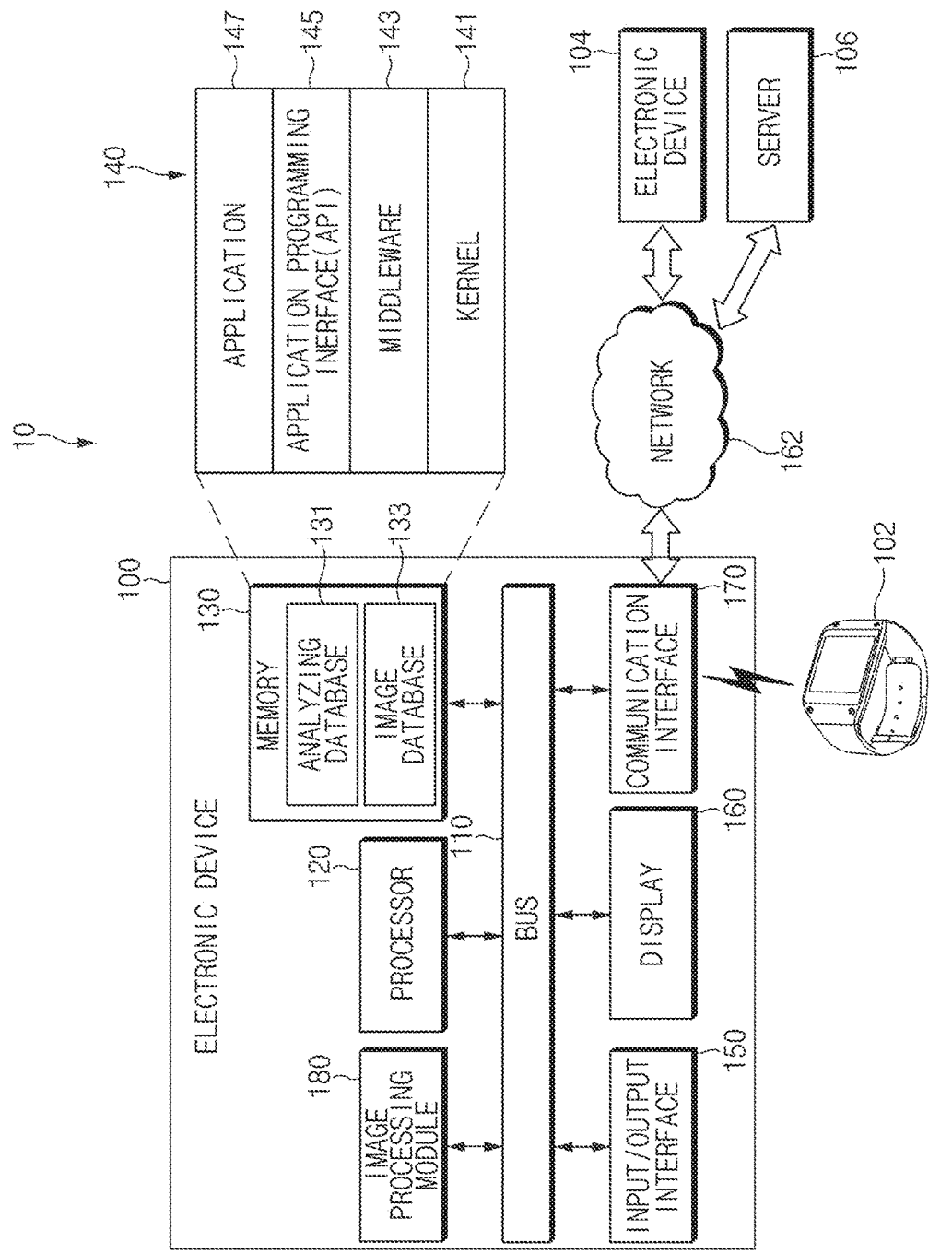
FIG. 1 is a view showing an operational environment of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) an audio layer 3 (MP3) player, a mobile medical device, a camera, a wearable device (e.g., a head-mounted-device (HMD), such as an electronic glasses), an electronic apparel, an electronic bracelet, an electronic necklace, an electronic appcessory, an electronic tattoo, a smart mirror, a smart band, a smart watch, and the like.

Hereinafter, an electronic device will be described with reference to accompanying drawings according to various embodiments. In the disclosure disclosed herein, a term "user" used herein may refer to a person who uses an electronic device or may refer to a device (e.g., an artificial electronic device) that uses the electronic device.

FIG. 1 is a view showing an operational environment of an electronic device according to an embodiment of the present disclosure.

Referring to FIG. 1, the operational environment 10 in which the electronic device 100 is operated may include an electronic device 100, a network 162, a first external electronic device 102, a server 106, and a second external electronic device 104.

In the above-mentioned operational environment 10, the electronic device 100 may provide at least one image (e.g., a specific image, a background image, or a lock screen, which is stored in a memory 130, a candidate image designated to be used for a chatting application or transmission of a massage). In this operation, the electronic device 100 may analyze at least one objects included in at least one image (hereinafter, the candidate image will be referred to as the image) stored in the memory 130. The electronic device 100 may provide a recommendation image generated on the basis of the analyzed objects. The candidate image may be provided from the server 106 or the second external electronic device 104 via the network 162. Alternatively, according to various embodiments, the electronic device 100 may receive the candidate image from the first external electronic device 104 connected to the electronic device 100 by a short-range communication channel. The electronic device 100 may store an image taken by the camera as the candidate image.

The network 162 may support to form a wireless communication channel between the electronic device 100, the second external electronic device 104, and the server 106. Additionally, in a case where the first external electronic device 104 includes a wireless communication interface, the network 162 may support to form the wireless communication channel for the first external electronic device 104. The network 162 may include, for example, at least one device that supports a wireless communication function (e.g., various wireless communication manners of second generation (2G), third generation (3G), fourth generation (4G), long term evolution (LTE), fifth generation (5G), etc.), a wireless access communication function (e.g., a WI-FI communication function), etc. As another way, the network 162 may include a telecommunications network, i.e., at least one of a computer network (e.g., local area network (LAN) or wireless area network (WAN)), an internet, or a telephone network. The network 162 may support to form a communication channel between the server 106 or the second external electronic device 104 and the electronic device 100. According to an embodiment, the network 162 may transfer the candidate image stored in the server 106 or the second external electronic device 104 to the electronic device 100. Further, the network 162 may transfer the candidate image stored in the electronic device 100 or the recommendation image associated with the candidate image to the server 106 or the second external electronic device 104.

The server 106 may be connected to the electronic device 100 through the network 162. The server 106 may form a wireless communication channel in response to a request from the electronic device 100. The server 106 may receive, for example, specific data from the electronic device 100. In addition, the server 106 may transmit, for example, specific data to the electronic device 100. According to an embodiment, the server 106 may provide a specific web page to the electronic device 100. The server 106 may provide a function to select at least one candidate image through the web page. When a signal corresponding to the selection of the candidate image is received from the electronic device 100, the server 106 may provide the candidate image corresponding to the received signal to the electronic device 100.

According to various embodiments, the server 106 may receive the candidate image from the electronic device 100. The server 106 may analyze the received candidate image. For example, the server 106 may classify the candidate image by object types (e.g., a person object, a thing object, a background object, etc.) and combine the classified objects to generate at least one recommendation image. The server 106 may generate a web page configured to include the candidate image and the recommendation image (or a web page configured to include a thumbnail corresponding to the recommendation image and the candidate image) and provide the web page to the electronic device 100. When the thumbnail corresponding to the recommendation image is provided to the electronic device 100 and an input signal selecting a specific thumbnail is received from the electronic device 100, the server 106 may provide the recommendation image corresponding to the input signal to the electronic device 100. In association with the support of the above-mentioned function, the server 106 may include a communication module communicated with the electronic device 100, a storage device storing the candidate image or the recommendation image, and a processor processing to analyze the candidate image and generate the recommendation image.

Each of the first and second external electronic devices 102 and 104 may include components same as or different from those of the electronic device 100. According to various embodiments, all or a part of operations that the electronic device 100 will perform may be executed by another or plural electronic devices (e.g., the first and second electronic devices 102 and 104 and the server 106). According to an embodiment, in the case where the electronic device 100 executes any function or service automatically or in response to a request, the electronic device 100 may not perform the function or the service internally, but, alternatively additionally, it may request at least a portion of a function associated with the electronic device 100 at other device (e.g., the first and second electronic devices 102 and 104 or the server 106). The other electronic device (e.g., the first and second electronic device 102 and 104 or the server 106) may execute the requested function or additional function and may transmit the execution result to the electronic device 100. The electronic device 100 may provide the requested function or service using the received result or may additionally process the received result to provide the requested function or service. To this end, for example, cloud computing, distributed computing, or client-server computing may be used.

According to various embodiments, the first external electronic device 102 may form a short-range communication channel with the electronic device 100. The first external electronic device 102 may transmit device information (e.g., size information of display, resolution information of display, or shape information of display (e.g., a circular shape, a quadrangular shape, a rectangular shape, etc.)) to the electronic device 100. The first external electronic device 102 may receive one selection image among one or more recommendation images generated from a specific candidate image from the electronic device 100. The received selection image may be used as the background image or the lock screen image of the first external electronic device 102. According to various embodiments, the first external electronic device 102 may provide the candidate image obtained by using a built-in camera to the electronic device 100. Alternatively, the first external electronic device 102 may provide the candidate image stored in a memory or a storage part in response to a request of the electronic device 100 or a user input.

The electronic device 100 may include a bus 110, a processor 120, a memory 130, an input/output (I/O) interface 150, a display 160, a communication interface 170, and an image processing module 180.

The bus 110 may interconnect the above-described components 120 to 180 and may be a circuit for conveying communications (e.g., a control message and/or data) among the above-described components.

The processor 120 may include one or more of a CPU, an application processor (AP), or a communication processor (CP). The processor 120 may perform, for example, data processing or an operation associated with control and/or communication of at least one other component(s) of the electronic device 100. According to an embodiment, the processor 120 may perform data processing associated with the providing of the recommendation image. For example, the processor 120 may output at least one candidate image to the display 160 in response to a user input or specified schedule. When the input signal corresponding to the candidate image selection is received, the processor 120 may analyze the selected candidate image. The processor 120 may generate at least one recommendation image on the basis of the analyzed result. The processor 120 may output the recommendation image to the display 160, apply the selection image selected in response to the user input to a predetermined screen, or transmit the selection image to the external electronic device 102 or 104. In association with the performance of the above-mentioned function, the processor 120 may operate at least one processor (e.g., AP, CP, or an integrated processor). In association with the operation for the image, the processor 120 may perform control of the image processing module 180 or support operation of the image processing module 180.

The memory 130 may include a volatile and/or nonvolatile memory. The memory 130 may store instructions or data associated with at least one other component(s) of the electronic device 100. The instructions may be executed by at least one of the processor 120 or the image processing module 180. The instructions may include at least one of collecting instructions associated with collecting the candidate image, displaying instructions associated with displaying the candidate image, analyzing instructions associated with analyzing the selected candidate image, providing instructions associated with generating and providing at least one recommendation image on the basis of the analyzed result, or providing instructions associated with providing the selected image.

The collecting instructions may include, for example, instructions used to collect the candidate image using at least one of the communication interface 170 or the camera. For example, the collecting instructions may include instructions performing a connection of the server 106 or the external electronic devices 102 and 104 in accordance with a scheduled setting or a user input, instructions associated with a reception of a list of the candidate image of the connected server 106 or the external electronic devices, and instructions requesting and collecting the candidate image selected by the user input. The analyzing instructions may include region of interest (ROI)-oriented image analyzing instructions, user context-based image analyzing instructions, or the like. At least one instruction included in the analyzing instructions may be used to apply the candidate image in accordance with the scheduled setting or the user input. The providing instructions may include at least one of an instruction recommending an ROI-oriented image and providing a preview, an instruction allowing the image to be recommended on the basis of a screen property, which is to be set, an instruction allowing the image exceeding a real image to be recommended, an instruction allowing a blank space to be displayed in the case where the blank space is included in a modified image, an instruction allowing the image to be recommended on the basis of a screen shape of the electronic device, or an instruction applying a specific filter when the image is recommended.

According to various embodiments, the memory 130 may store an analyzing database 131 and an image database 133. The analyzing database 131 may store at least one instruction or at least program, which is associated with the analysis of the candidate image. The analyzing database 131 may store, for example, an analyzing algorithm to classify the candidate image by the object types. The analyzing algorithm may distinguish a person object, a thing object, a background object, and an animal object from each other. In this regard, the analyzing database 131 may store texture information or feature point information that may require to distinguish people, things, and animals from each other. In addition, the analyzing database 131 may store texture information or feature point information that may require to distinguish a people's face and an animal's face from each other.

The image database 133 may store at least one candidate image. For example, the image database 133 may store at least one candidate image applied to the lock screen, the home screen, an execution screen of a specific application. As described above, the candidate image stored in the image database 133 may be collected by the camera or provided from the external electronic device or the server. According to various embodiments, the image database 133 may store the recommendation image generated on the basis of a specific candidate image. The image database 133 may store device information on the electronic device 100 or the external electronic device (e.g., the first external electronic device 102). In addition, the image database 133 may store information on selected images applied to the electronic device 100 or the external electronic device.

According to various embodiments, the memory 130 may store software and/or a program 140. The program 140 may include, for example, a kernel 141, a middleware 143, an application programming interface (API) 145, and/or an application program (or an application) 147. At least a portion of the kernel 141, the middleware 143, or the API 145 may be called an "operating system (OS)".

The kernel 141 may control or manage system resources (e.g., the bus 110, the processor 120, the image processing module 180, the memory 130, and the like) that are used to execute operations or functions of other programs (e.g., the middleware 143, the API 145, and the application program 147). Furthermore, the kernel 141 may provide an interface that allows the middleware 143, the API 145, or the application program 147 to access discrete components of the electronic device 100 so as to control or manage system resources.

The middleware 143 may perform a mediation role such that the API 145 or the application program 147 communicates with the kernel 141 to exchange data. Furthermore, the middleware 143 may process task requests received from the application program 147 according to a priority. For example, the middleware 143 may assign the priority, which makes it possible to use a system resource (e.g., the bus 110, the processor 120, the image processing module 180, the memory 130, or the like) of the electronic device 100, to at least one of the application program 147. For example, the middleware 143 may process the one or more task requests according to the priority assigned to the at least one application program, which makes it possible to perform scheduling or load balancing on the one or more task requests.

The API 145 may be an interface through which the application program 147 controls a function provided by the kernel 141 or the middleware 143. The API 145 may include, for example, at least one interface or function (e.g., an instruction) for a file control, a window control, an image processing, a character control, or the like.

The application 147 may include at least one image operational application associated with the image operating function. The image operational application may include a program designed to operate the analyzing database 131, the image database 133, the above-mentioned instructions, and the like. The image operational application may be configured to perform a function to display at least one candidate image, a function to analyze the selected candidate image and display at least one recommendation image, and a function to apply the selected image among the recommendation images to the screen (e.g., the background screen). The image operational application may be received from the server 106 to be installed or may be installed during a manufacturing process.

The I/O interface 150 may perform an interface role to transmit an instruction or data, input from a user or another external device, to other component(s) of the electronic device 100. Furthermore, the I/O interface 150 may output an instruction or data, received from other component(s) of the electronic device 100, to a user or another external device. The I/O interface 150 may include, for example, at least one of a physical button, a touch button, a touch pad, or a touch screen. In addition, the I/O interface 150 may include an input unit, e.g., an electronic pen. Further, the I/O interface 150 may include an audio unit to process an audio signal. The audio unit may output audio data associated with the execution of the application. For example, the audio unit may output audio data corresponding to the occurrence of the touch event, sound effects corresponding to the display control on screen elements (e.g., objects). The output function of the audio data may be omitted by a program set or a user input.

The display 160 may include, for example, a liquid crystal display (LCD), a light-emitting diode (LED) display, an organic LED (OLED) display, a microelectromechanical systems (MEMS) display, or an electronic paper display. The display 160 may display, for example, various contents (e.g., a text, an image, a video, an icon, a symbol, and the like) to a user. The display 160 may include a touch screen and may receive, for example, a touch, gesture, proximity, or hovering input using an electronic pen or a portion of a user's body.

The display 160 may output, for example, at least one screen associated with the image operating function of the electronic device 100. According to an embodiment, the display 160 may output at least one of a selection screen configured to allow at least one candidate image to be selected, a recommendation screen configured to include at least one recommendation image corresponding to the selected candidate image, and an application screen to which the selected recommendation image is applied. The selection screen may include, for example, a screen displaying at least one candidate image stored in the memory 130 in the thumbnail form or in a predetermined size. As another way, the selection screen may include a camera execution screen automatically executed in the case where the at least one candidate image does not exist. Furthermore, the selection screen may include a screen configured to include an area in which the at least one candidate image is arranged in accordance with the user's setting and a preview area in accordance with the execution of the camera. In addition, the selection screen may include a screen configured to connect a specific device (e.g., the server 106 or the external electronic device) and output the candidate image list stored in a corresponding device.

The recommendation screen may include, for example, a screen configured to include at least one recommendation images displayed in the thumbnail form or displayed in a predetermined size. Alternatively, the recommendation screen may include a screen configured to include the candidate image and the recommendation image. As another way, the recommendation screen may include a screen displaying the candidate image with the recommendation image or displaying only the recommendation image. With regard to the recommendation screen, the display 160 may output the recommendation image having a size (e.g., a size greater or smaller than a previous state) controlled by the user input. The application screen may include, for example, at least one of the lock screen to which the selection image (e.g., the recommendation image selected from the recommendation images) is applied, the home screen, and the specific application screen.

According to various embodiments, the electronic device 100 may support allowing the user to select a screen (e.g., the lock screen, the home screen, and the specific application screen, etc.) applied with the image operating function before the candidate image is displayed. Alternatively, the electronic device 100 may support allowing the user to select a screen applied with the image operating function when the recommendation image is displayed or the specific recommendation image is selected. As another way, the electronic device 100 may process to apply the selected image to the specific screen (e.g., the background screen) designated by default or by the user's setting before the image operating function is performed.

The communication interface 170 may establish communication between the electronic device 100 and the external device (e.g., the second external electronic device 104 or the server 106). For example, the communication interface 170 may be connected to the network 162 through wireless communication to communicate with the external device (e.g., the second external electronic device 104 or the server 106).

The wireless communication may include at least one of, for example, LTE, LTE Advance (LTE-A), code division multiple access (CDMA), wideband CDMA (WCDMA), universal mobile telecommunications system (UMTS), wireless broadband (WiBro), global system for mobile communications (GSM), or the like, as cellular communication protocol. Furthermore, the wireless communication may include, for example, a local area network. The local area network may include, for example, at least one of Bluetooth, near field communication (NFC), magnetic stripe transmission (MST), or global navigation satellite system (GNSS).

The GNSS may include, for example, at least one of (Global Positioning System (GPS), Global Navigation Satellite System (Glonass), Beidou Navigation Satellite System (hereinafter, referred to as "Beidou"), or Galileo, the European global satellite-based navigation system. Hereinafter, GPS and GNSS may be interchangeably used in the following descriptions.

The wired communication may include at least one of, for example, a universal serial bus (USB), a high definition multimedia interface (HDMI), a recommended standard-232 (RS-232), or a plain old telephone service (POTS).

The image processing module 180 may process various signals associated with the image operating function and may perform a data process. In this regard, the image processing module 180 may be provided as at least one processor or as a part of the processor. According to an embodiment, the image processing module 180 may be provided in the form of software, and thus the image processing module 180 may be loaded on a certain processor to process the image operating function. As another way, the image processing module 180 may be provided in the form of hardware in association with the processing of the image operating function and may perform the data processing associated with the image operating function. As described above, the image processing module 180 may be provided in the form of software or hardware.

Figure 2:
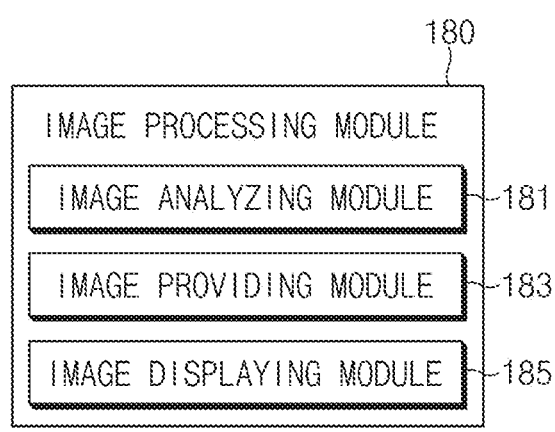
FIG. 2 is a view showing an example of an image processing module according to various embodiments of the present disclosure.

FIG. 2 is a view showing an example of the image processing module 180 according to various embodiments of the present disclosure.

Referring to FIG. 2, the image processing module 180 may include an image analyzing module 181, an image providing module 183, and an image displaying module 185.

The image analyzing module 181 may support at least one of functions collecting the candidate image, displaying the candidate image selection screen, and analyzing the selected candidate image. For example, the image analyzing module 181 may provide an icon and a menu, which are associated with the image operating function. When an input signal corresponding to the selection of the icon or menu associated with the image operating function, the image analyzing module 181 may output at least one candidate image stored in the memory 130. In this operation, the image analyzing module 181 may output the list of the candidate images. According to various embodiments, the image analyzing module 181 may provide a function to take a picture of the candidate image or to receive the candidate image. For instance, when the image operating function is requested to be executed, the image analyzing module 181 automatically activates the camera to take the picture of the candidate image or in accordance with a specified condition (e.g., in the case that the candidate image does not exist in the memory 130). Alternatively, when the image operating function is requested to be executed, the image processing module 180 may form a communication channel with the server 106 or the external electronic device and may receive the candidate image list from the server 106 or the external electronic device. When the candidate image is photographed or received from the eternal device (e.g., the server 106 or the external electronic device), the image analyzing module 181 may store the candidate image into the image database 133.

When the candidate image is selected, the image analyzing module 181 may perform an analysis on the selected candidate image. According to an embodiment, the image analyzing module 181 may classify the candidate image by the object types. For example, in the case that people are included in the candidate image, the image analyzing module 181 may extract person objects and the background object with respect to each people. As another example, in the case that the animal is included in the candidate image, the image analyzing module 181 may extract the animal object and the background object corresponding to the animal. As another example, in the case that the people and the animal are included in the candidate image, the image analyzing module 181 may extract the animal object, the person object, and the background object to be distinguished from each other. According to various embodiments, the image analyzing module 181 may extract the thing object corresponding to the thing (e.g., house, mountain, tree, lake, etc.) included in the candidate image.

According to various embodiments, the image analyzing module 181 may perform at least one of the ROI-oriented image analysis and the user context-based image analysis during the analysis of the image. For example, the image analyzing module 181 may determine the object having a specific meaning according to the operation of the electronic device 100 as the ROI and analyze the image with reference to the ROI. For example, the image analyzing module 181 may extract a partial image configured to include only objects corresponding to designated specific people in the image in which the people are included or only objects corresponding to a specific area adjacent to the designated specific people.

The object having a specific meaning may include an object corresponding to a face of a person with whom the user makes contact more than a specified number of times among information stored into a phone book. As another example, the object having a specific meaning may include an object corresponding to a specific person, animal, or thing searched by a designated user search (e.g., more than a specified number of times, more than a specified time duration, or recently searched) or a person including designated tagging information.

With regard to the user context-based image analysis, the image analyzing module 181 may detect a specific object on the basis of the user context configured to include user information registered in the electronic device 100 or the server 106 by the user, word information mainly used in the communication with the external electronic device, and schedule information registered in the electronic device 100. The user context may include, for example, objects corresponding to various information (e.g., a hobby, a specialty, a matter of concern, etc.) registered in the electronic device or the server by the user.

According to various embodiments, the image analyzing module 191 may perform a visual object recognition to classify the objects included in one image and to analyze a position (e.g., coordinate information) of each object in a screen in which each object is arranged. In regard to the execution of the image analyzing function, the image analyzing module 181 may perform a preprocessing process, a recognition process, and a post-processing process.

The preprocessing process may include an operation that changes the image to be easily recognized. The image analyzing module 181 may perform a noise removal, an image segmentation, a size normalization, an edge detection, a color constancy algorithm, a region growing, a boundary trace, or the like. In regard to the recognition process, the image analyzing module 181 may recognize a type of objects using an algorithm that recognizes the type of objects, e.g., pattern matching, template matching, artificial intelligence, neural network, fuzzy algorithm, decision tree, genetic algorithm, Principal Component Analysis (PCA), Scale-Invariant-Feature Transform (SIFT), Speeded-Up Robust Features (SURF), deep learning, etc. In regard to the post-processing process, the image analyzing module 181 may process the data, which are processed by the recognition process, through the post-processing process to improve a recognition accuracy. The image analyzing module 181 may perform a recommendation (e.g., a manner that selects the image by a user input after suggesting candidates to the user in the case that the recognition accuracy is equal to or lower than a predetermined level) after suggesting candidates in accordance with the recognition result, or a reduction of the candidates based on another algorithm or context.

With regard to the image segmentation, the image analyzing module 181 may operate, for example, a region growing method and a split-and-merge method. The image analyzing module 181 may split the image into small areas, merge similar areas by calculating a difference in color or brightness between adjacent areas to each other, and divide the image into areas that finally remain on the basis of the above-mentioned methods. In this case, the image analyzing method 181 may operate one of a bottom-up manner that merges the areas from relatively small areas or a top-down manner that searches the area while splitting the area from relatively large area to relatively small area.

According to various embodiments, the image analyzing module 181 may operate a graph partitioning method. The graph partitioning method may include a method that splits a dense graph obtained by connecting edges having a pixel difference value between adjacent pixels as a weight after making each pixel of the image a node such that an energy function is minimized. In this case, the image analyzing module 181 may operate a variety of methods in accordance with a kind of the energy function. In addition, the image analyzing module 181 may operate a variety of algorithms in association with the object recognition.

The image providing module 183 may generate the recommendation image on the basis of the objects analyzed by the image analyzing module 181. According to an embodiment, the image providing module 183 may provide a recommendation image including each object that is extracted or a recommendation image including a combination of the extracted objects. According to various embodiments, the image providing module 183 may provide a recommendation image obtained by modifying the extracted objects. Furthermore, the image providing module 183 may provide a recommendation image obtained by applying a specific filter to the extracted objects.

According to various embodiments, the image providing module 183 may generate the recommendation image on the basis of device information on the electronic device 100 or device information on a device to which the image is applied. The image providing module 183 may output a portion of the generated recommendation image to the display 160. For example, the image providing module 183 may modify a screen ratio (e.g., horizontal vs. vertical ratio) of the images, which are configured to include the objects corresponding to each person in the image in which the people are included, to correspond to the screen property. As an example, the image providing module 183 may modify an area corresponding to the image having a predetermined size (e.g., an upper half of the body) and including the face of specific person object to a screen ratio (e.g., 4:3 or 16:9) of the electronic device 100.

According to various embodiments, the image providing module 183 may control the number of the objects and the size of the objects, which are applied to one recommendation image, on the basis of the device information (e.g., at least one of a size of the display 160 or a specific screen, a resolution, a ratio, a display object set to be output through the screen (e.g., widget, icon, menu, etc.)). According to various embodiments, the image providing module 183 may determine whether the blank space is applied to the recommendation image in response to the device information, and thus the image providing module 183 may generate and provide the recommendation image including the blank space. In addition, the image providing module 183 may control properties (e.g., a color of the blank space, a shape of the blank space, an image shape included in the blank space, a brightness of the blank space, etc.) of the blank space in response to the device information. According to various embodiments, the image providing module 183 may generate the recommendation image by a direction in which the electronic device 100 displays the image. As another example, the image providing module 183 may collect information on the direction in which the electronic device 100 mainly displays the image and may generate and provide the recommendation image having the ratio corresponding to the designated specific direction in accordance with the information.

The image display module 185 may receive the recommendation image from the image providing module 183 and output the received recommendation image to the display 160. According to various embodiments, the image display module 185 may output a screen including the candidate image and at least one recommendation image to the display 160. Alternatively, the image display module 185 may output a screen including at least one recommendation image to the display 160. In this operation, the image display module 185 may control at least one of the size and shape of the at least one recommendation image in accordance with the output situation.

According to various embodiments, the image display module 185 may receive an input signal selecting the displayed recommendation image. The image display module 185 may output a screen to which the selection image selected by the input signal is applied. According to the various embodiments, the image display module 185 may output the preview screen corresponding to the screen applied with the selection image and may process a reception of an additional input (i.e., an input determining application of the screen). When the input signal corresponding to "confirm" is generated in the preview screen, the image display module 185 may output the screen applied with the selection image to the display 160. When the input signal corresponding to "cancel" is generated in the preview screen, the image display module 185 may cancel the output of the preview screen, and then the image display module 185 may output the screen through which the recommendation image is displayed.

According to various embodiments, the image display module 185 may receive an input event associated with a transmission of the specific recommendation image. In this case, the image display module 185 may transmit the selected recommendation image (e.g., the selection image) to the specific external device (e.g., the server 106 or the external electronic device). In this operation, the image display module 185 may output a progress screen associated with the transmission of the selection image.

As described above, the electronic device according to an embodiment may include a display outputting a screen, a processor electrically connected to the display, and a memory electrically connected to the processor and storing at least one image. The memory may store instructions, and the instructions, when executed by the processor, may cause the processor to display a candidate image having a first size and including at least a portion of the stored at least one image and to display a recommendation object having a second size smaller than the first size and corresponding to a portion of the candidate image on the screen together with the candidate image.

According to various embodiments, the instructions may allow the processor, when a user input is received to select the recommendation object, to apply a recommendation image having a resolution or a size relatively higher than the selected recommendation object to a background image of the screen.

According to various embodiments, the recommendation image may be, for example, a full-resolution image stored as the real background image of the electronic device, and the recommendation object may include visual information having a relatively lower resolution (e.g., a kind of thumbnail or preview) than the recommendation image. Here, the recommendation object and the recommendation image may have the same size depending on the recommendation manner. For example, the recommendation object may have the same size and resolution as those of the recommendation image, and the recommendation image may be applied as the background image in accordance with the selection of the recommendation object and the application request. According to various embodiments, the recommendation image may have a relatively higher resolution and size that those of the candidate image. Alternatively, the recommendation image may have the same size as that of the candidate image.

The recommendation object may be an object that is selectable by the user input and may be used to apply the recommendation image in response to the selection input. The recommendation object may be provided to include at least one of at least specific area of the candidate image or at least specific area of the blank space. The recommendation object may be displayed as an original image (e.g., an image corresponding to the size of the recommendation image).

According to various embodiments, the instructions may allow the processor to display at least a portion of the recommendation object on the screen such that the recommendation object is overlapped with the candidate image.

According to various embodiments, the instructions may allow the processor, when a user input is received to select the recommendation object, to display the recommendation object through substantially an entire area of the screen as a preview screen.

According to various embodiments, the instructions may allow the processor to provide the recommendation object having a display ratio (or a size ratio, or a screen ratio) same as or similar to the candidate image or the recommendation image corresponding to the recommendation object.

According to various embodiments, the instructions may allow the processor to display a guide indicating an area corresponding to the recommendation object selected from the candidate image to be overlapped with the candidate image in response to a user input selecting the recommendation object.

According to various embodiments, the instructions may allow the processor to control a size of the guide in response to a user input with respect to at least a portion of the guide.

According to various embodiments, the instructions may allow the processor to activate a camera in response to an execution of an image operating function and to store an image taken in response to in the memory as the candidate image.

According to various embodiments, the instructions may allow the processor to form a communication channel in response to the execution of the image operating function and to store an image provided from an external device connected thereto in the memory as the candidate image.

According to various embodiments, the instructions may allow the processor to display a blank space area outside the candidate image, to arrange the recommendation object in the blank space area, and to allow the recommendation object to have a specific screen ratio.

According to various embodiments, the instructions may allow the processor to display the recommendation object such that a shape of the recommendation object becomes different in accordance with a size and a position of one or more display objects included in the screen or to apply the recommendation image as the background image after changing a shape of the recommendation image.

According to various embodiments, the instructions may allow the processor to extract one or more feature objects included in the candidate image and to provide a recommendation object configured to include at least a portion of the at least one feature object or a recommendation image corresponding to the recommendation object in accordance with a specific condition.

According to various embodiments, the instructions may allow the processor to select the feature object from the candidate image on the basis of at least a portion of user context information.

According to various embodiments, the instructions may allow the processor to select the feature object from the candidate image on the basis of at least one of sensor information or time information, which are collected by the electronic device.

According to various embodiments, the instructions may allow the processor to provide the recommendation object configured to include at least a portion of an ROI corresponding to a specific person, animal, or thing among the feature objects included in the candidate image or a recommendation image corresponding to the recommendation object.

According to various embodiments, the instructions may allow the processor to provide a blank space to the recommendation object or the recommendation image on the basis of a screen ratio (or a size ratio, or a display ratio) of an area in which at least a portion of the at least one ROI is included in the candidate image.

According to various embodiments, the instructions may allow the processor to change at least one of a shape, a color, or a size of the recommendation object in accordance with property information of the display.

According to various embodiments, the instructions may allow the processor to change at least one of a shape, a color, or a size of the recommendation object or a recommendation image in accordance with screen property information of an external device connected to the electronic device.

According to various embodiments, the instructions may allow the processor to transmit the recommendation object selected by a user input or a recommendation image corresponding to the recommendation object to an external device connected through a communication channel.

According to various embodiments, an electronic device may include a display including a screen configured to include a first periphery and a second periphery substantially vertical to the first periphery, a processor electrically connected to the display, and a memory electrically connected to the processor and storing at least one image. The memory may store instructions, and the instructions, when executed by the processor, may cause the processor to display a first image configured to include at least a portion of the stored at least one image on at least a portion of the screen, to display a second image configured to include another portion of the stored at least one image and have a length ratio that is substantially equal to a ratio in length of the first periphery to the second periphery on the screen with the first image, to receive a user input selecting the second image, and to set the second image as at least one of a background image or a lock screen of the screen in response to at least a portion of the user input.

According to various embodiments, the first image may have a first size, and the second image may have a second size smaller than the first size.

According to various embodiments, the instructions may allow the processor to display a third image configured to include yet another portion of the stored at least one image, have a length ratio that is substantially equal to a ratio in length of the first periphery to the second periphery, and have a second size smaller than the first size on the screen with the first and second images.

According to various embodiments, the instructions may allow the processor to change positions at which the second and third images are displayed with respect to each other in response to a user input scrolling the second and third images.

According to various embodiments, the instructions may allow the processor to display guide set to scroll the second and third images and to change positions at which the second and third images are displayed with respect to each other in response to a user input with respect to the guide.

According to various embodiments, an electronic device according to an embodiment may include a display including a screen, a processor electrically connected to the display, and a memory electrically connected to the processor and storing at least one image. The memory may store instructions, and the instructions, when executed by the processor, may cause the processor to display a first image including at least a portion of the stored at least one image and having a first size on at least a portion of the screen, to display a second image including another portion of the stored at least one image and having a second size smaller than the first image on the screen with the first image, to display a guide indicating an area of the first image, which corresponds to the second image, to be overlapped with the first image in response to a first user input selecting the second image, and to operate the second image as at least one of a background image or a lock screen of the screen in response to a second user input selecting the guide.

According to various embodiments, the instructions may allow the processor to display at least one object displayed on the screen in the guide.

According to various embodiments, the at least one display object may include at least one of a widget, an icon, or a menu.

According to various embodiments, an electronic device according to an embodiment may include a display including a screen, a processor electrically connected to the display, and a memory electrically connected to the processor and storing at least one image. The memory may store instructions, and the instructions, when executed by the processor, may cause the processor to display a first image including at least a portion of the stored at least one image on a first area of the screen, to display a second image different from the stored at least one image on a second area not overlapped with the first area, to display a guide surrounding at least a portion of the first image and at least a portion of the second image with the first and second images, and to operate a third image including the portion of the first image and the portion of the second image as at least one of a background image or a lock screen of the screen in response to at least a portion of a user input selecting the guide.

According to various embodiments, the second image may be an image indicating a blank space.

According to various embodiments, the second image may be an image to which a black image, a white image, or a gradient is applied.

Figure 3:
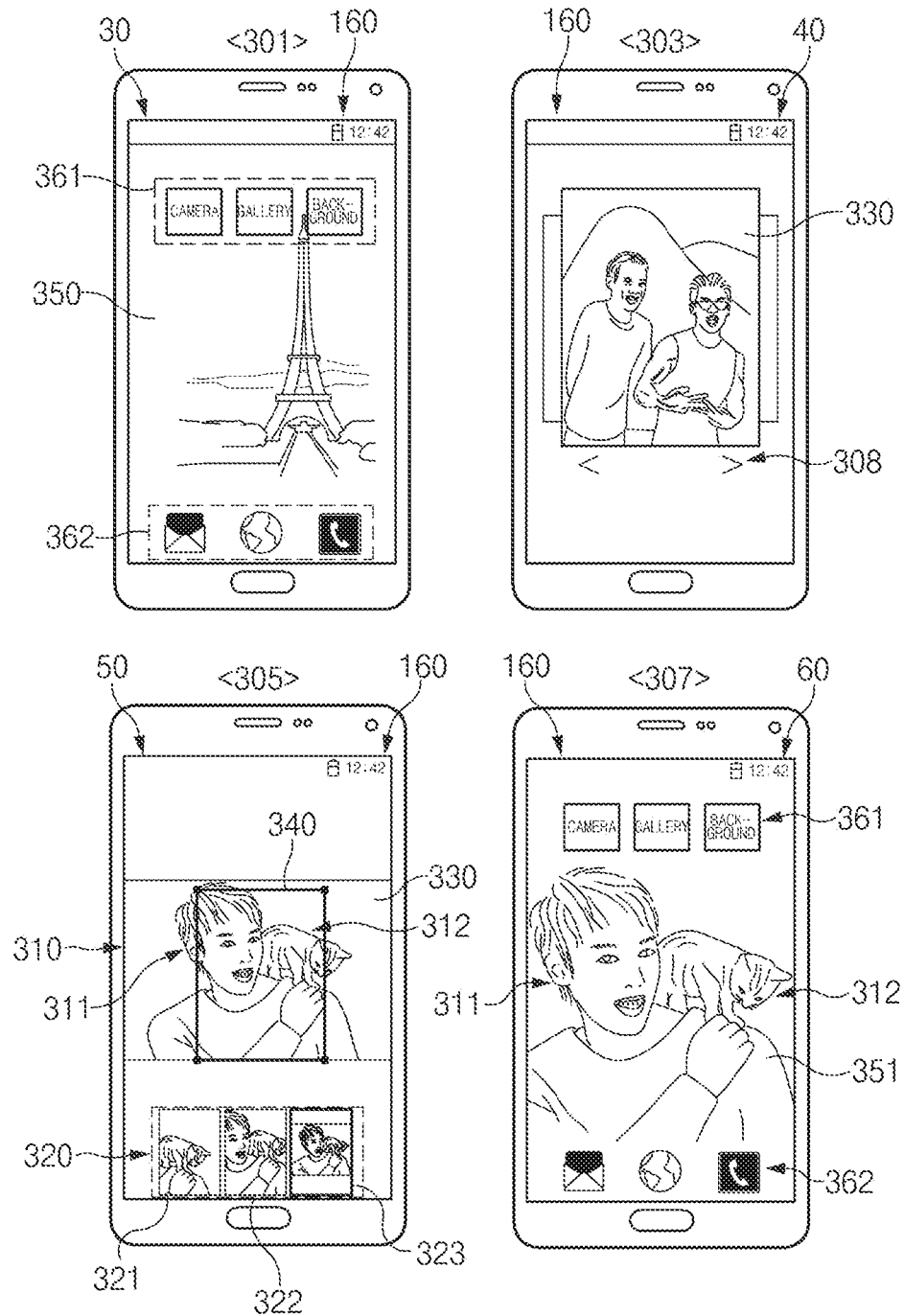
FIG. 3 is a flowchart showing an example of a screen interface of an electronic device associated with an image operation function according to various embodiments of the present disclosure.

FIG. 3 is a flowchart showing an example of a screen interface of an electronic device associated with an image operation function according to various embodiments of the present disclosure.

Referring to FIG. 3, the electronic device 100 according to various embodiments may display a screen in a state 301 depending on the power supply statue. For example, when a turn-on input is generated, the electronic device 100 may supply the power to the display 160 and output the specific screen. The screen in the state 301 may include, for example, one of the lock screen, the home screen, and the execution screen of the specific application. Hereinafter, the following descriptions will be described with respect to the home screen.

The home screen 30 may include, for example, a first background image 350, a first display object 361, and a second display object 262. In FIG. 3, the first background image 350 may include an image depending on the user's setting or the designated specific image. The first display object 361 may include at least one widget or icon defined by the user's setting or the setting of the electronic device 100. For example, at least one object included in the first display object 361 may include the icon associated with the image operating function. The first display object 361 may be changed in accordance with the user's setting. For instance, the first display object 361 may be changed to a weather widget, a watch widget, a schedule icon, or the like. The second display object 362 may include a function icon or a soft key button (or a short cut function key) associated with a specific function provided by the electronic device 100. For example, the second display object 362 may include a message function icon, a web function icon, a telephone function icon, or the like. The first and second display objects 361 and 362 may be displayed above the first background image 350. At least one of the first and second display objects 361 and 362 may be set (or configured) to be displayed on a present position even though the first background image 350 is controlled. Positions of the first and second display objects 361 and 362 may be controlled by the user's setting.

When an input signal associated with the image operating function is generated, the electronic device 100 may display the candidate image searching screen as shown in a state 303. In this regard, the electronic device 100 may output the icon or menu associated with the image operating function to the display 160 in the state 301. For example, when the background icon included in the first display object 361 is selected, the electronic device 100 may output the candidate image searching screen 40 as shown in the state 303 in accordance with the execution of the image operation function. In this operation, the electronic device 100 may display at least one candidate image 330 stored in the memory 130 at the predetermined size. In addition, the electronic device 100 may provide a search button 308 to search another candidate image or a scroll function (e.g., a horizontal scroll function or a vertical scroll function).

In the state 303, when the input signal corresponding to the candidate image selection is generated, the electronic device 100 may output a recommendation image providing screen 50 as shown in a state 305. The recommendation image providing screen 50 may include, for example, a candidate image area 310 and a recommendation area 320. The image processing module 180 may extract a first feature object 311 and a second feature object 312 as the analyzed result of the candidate image area 310. The image processing module 180 may generate at least one first feature object 311, at least one recommendation object including at least a portion of the second feature object 312, or the recommendation image.

The recommendation area 320 may include recommendation objects 321, 322, and 323 corresponding to the at least one recommendation images. FIG. 3 shows three recommendation images generated by the image processing module 180. The first recommendation object 321 may include a thumbnail of the recommendation image corresponding to the second feature object 312. The second recommendation object 322 may include a thumbnail of an image including at least a portion of the first and second feature objects 311 and 312. The third recommendation object 323 may include a thumbnail of an image including all of the first and second feature objects 311 and 322 and the blank space area. The third recommendation object 323 may correspond to the recommendation image to which the area in which first and second display objects 361 and 362 are arranged is applied. For example, the image processing module 180 may generate the recommendation image controlled to allow the first and second feature objects 311 and 312 to be displayed in an area except for an area in which the first and second display objects 361 and 362 are displayed.

According to various embodiments, guide information 340 may be displayed in the candidate image area 310. The guide information 340 may guide at least a portion of the object applied to the recommendation image. FIG. 3 shows the guide information 340 associated with the recommendation image corresponding to the second recommendation object 322. According to various embodiments, guide information corresponding to the first and third recommendation objects 321 and 323 may be displayed in the candidate image area 310 together with the guide information 340.

When a specific recommendation object (e.g., the third recommendation object 323) is selected among the recommendation objects 321, 322, and 323, the electronic device 100 may output a selection image application screen 60 as shown in a state 307. For example, the electronic device 100 may output a recommendation image 351, which is set such that the first and second feature objects 311 and 312 are not overlapped with a peripheral screen factor (e.g., the first display object 361 or the second display object 362), as the background image.

As described above, according to various embodiments, an electronic device may include a display including a screen configured to include a first periphery and a second periphery substantially vertical to the first periphery, a processor electrically connected to the display, and a memory electrically connected to the processor and storing at least one image. The memory may store instructions, and the instructions, when executed by the processor, may cause the processor to display a first image (e.g., at least one candidate image) configured to include at least a portion of the stored image and have a first size on at least a portion of the screen, to display a second image (e.g., a recommendation object) configured to include another portion of the at least one image, have a length ratio that is substantially equal to a ratio in length of the first periphery to the second periphery, and have a second size smaller that the first size on the screen with the first image, and to set the second image as at least one of a background image or a lock screen (e.g., the application image) of the screen in response to at least a portion of the user input when a user input selecting the second image is received.

According to various embodiments, a portion of the first image may be the same as a portion of the second image.

According to various embodiments, the first image may be different from the second image.

According to various embodiments, the instructions may allow the processor to display at least a portion of the second image on the screen to be overlapped with the first image.

According to various embodiments, the instructions may allow the processor to display the first and second images respectively through different areas of the screen.

According to various embodiments, the instructions may allow the processor to display a third image configured to include yet another portion of the stored at least one image, have a length ratio that is substantially equal to a ratio in length of the first periphery to the second periphery, and have a second size smaller than the first size on the screen with the first and second images.

As described above, according to various embodiments, an electronic device may include a display including a screen configured to include a first periphery and a second periphery substantially vertical to the first periphery, a processor electrically connected to the display, and a memory electrically connected to the processor and storing at least one image. The memory may store instructions, and the instructions, when executed by the processor, may cause the processor to display a first image configured to include at least a portion of the stored image on at least a portion of the screen, to display a second image (e.g., a recommendation object) configured to include another portion of the at least one image and have a length ratio that is substantially equal to a ratio in length of the first periphery to the second periphery on the screen with the first image, to receive a user input selecting the second image, and to set the second image as at least one of a background image or a lock screen of the screen in response to at least a portion of the user input when a user input selecting the second image is received.

As describe above, according to various embodiments, an electronic device may include a display including a screen, a processor electrically connected to the display, and a memory electrically connected to the processor and storing at least one image. The memory may store instructions, and the instructions, when executed by the processor, may cause the processor to display a first image configured to include at least a portion of the stored image and have a first size on at least a portion of the screen, to display a second image configured to include another portion of the at least one image and have a second size smaller than the first size on the screen with the first image, to display a guide indicating an area of the first image, which corresponds to the second image, to be overlapped with the first image in response to a first user input selecting the second image, and to set the second image as at least one of a background image or a lock screen of the screen in response to at least a portion of a second user input selecting the guide.

According to various embodiments, the instructions may be set to (or be configured to) control a size of the guide in response to a third user input with respect to at least a portion of the guide.

According to various embodiments, an electronic device according to an embodiment may include a display including a screen, a processor electrically connected to the display, and a memory electrically connected to the processor and storing at least one image. The memory may store instructions, and the instructions, when executed by the processor, may cause the processor to display a first image (e.g., a candidate image) including at least a portion of the stored image on a first area of the screen, to display a second image (e.g., an image configured to include at least a portion of the candidate image and at least a portion of the blank space image) different from the stored image on a second area not overlapped with the first area, to display a guide surrounding at least a portion of the first image and at least a portion of the second image with the first and second images, and to set a third image including at least the portion of the first image and at least the portion of the second image as at least one of a background image or a lock screen of the screen in response to at least a portion of a user input selecting the guide.

According to various embodiments, the second image may be a black image indicating that the second area is the blank space area.

According to various embodiments, the second image may include at least one thumbnail, and a position of the second image may be changed by the scroll.

According to various embodiments, the instructions may be configured to display a guide indicating a direction for the scroll and execute the scroll function in the indicated direction in response to an input selecting the guide.

According to various embodiments, the instructions may be configured to display the entire image of the stored image and to display a portion of the stored image, which is to be selected as the background image, as the guide.

According to various embodiments, the instructions may be configured to display the stored image without changing a length ratio of the stored image.

According to various embodiments, the instructions may be configured to allow the selected portion to be displayed at the same length ratio as the length ratio of the display.

According to various embodiments, the instructions may be configured to allow a layout of icon/widget displayed in a present background screen to be displayed in the guide.

According to various embodiments, the instructions may be configured to allow the guide to be displayed exceeding upper and lower widths or left and right widths of the stored image.

According to various embodiments, the instructions may be configured to display an image blank space in the case that the length ratio of the image, which is to be displayed, is different from the length ratio of the display.

According to various embodiments, the instructions may be configured to display an effect that the image blank space is filled.

According to various embodiments, the instructions may be configured to (automatically) select a portion of the image stored to have a screen ratio equal to a screen ratio of the display and to display the selected portion of the image through the entire area of the display.

According to various embodiments, the instructions may be configured to allow the layout of icon/widget displayed in the present background screen to be displayed in the entire area of the display. According to various embodiments, the instructions may be configured to display the image without the image blank space.

Figure 4:
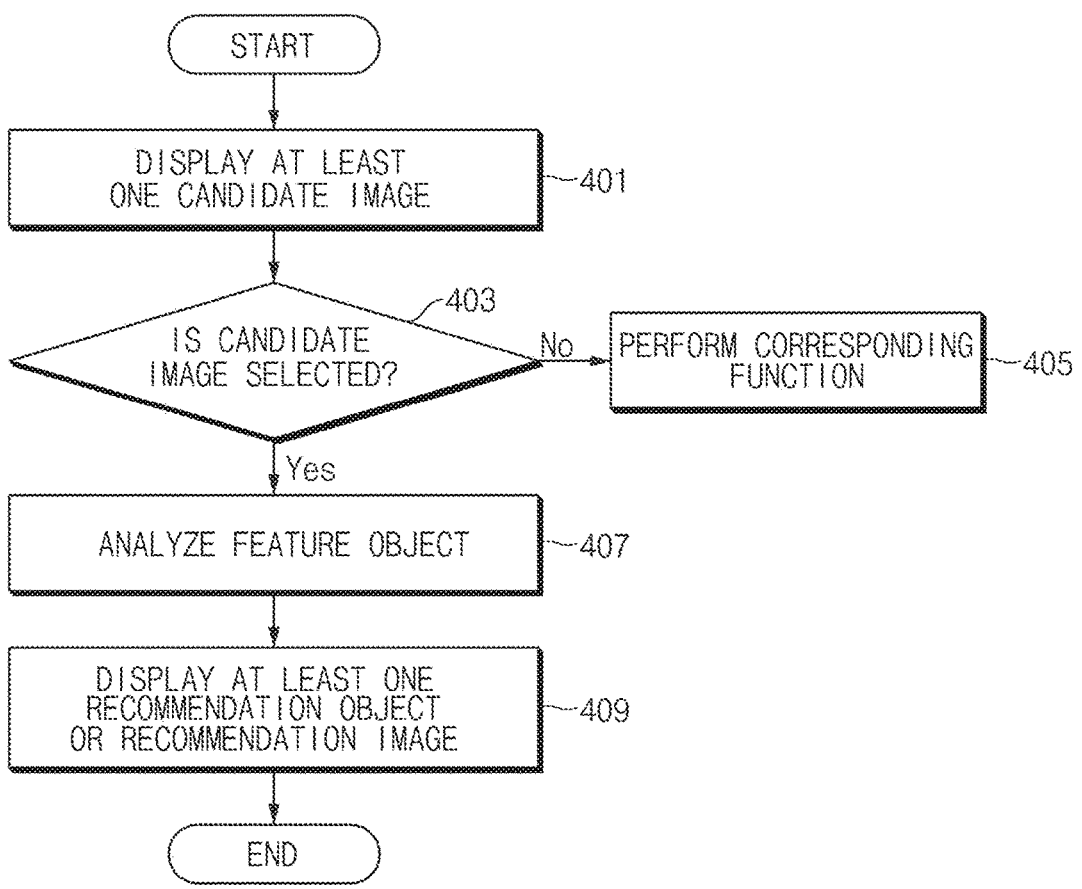
FIG. 4 is a view showing a recommend image providing method of an image operating method according to various embodiments of the present disclosure.

FIG. 4 is a view showing a recommend image providing method of an image operating method according to various embodiments of the present disclosure.

Referring to FIG. 4, according to the recommend image providing method of the image operating method according to various embodiments, the electronic device 100 may display at least one candidate image in operation 401. In this regard, the electronic device 100 may output the icon or the menu associated with the image operating function. When the input signal associated with the selection of the corresponding icon or menu is generated, the electronic device 100 may output at least one of the image stored in the memory 130, the image provided from the external device (e.g., the server 106 or the external electronic device), and the image collected by the camera to the display 160. In this case, the electronic device 100 may activate the camera and support the image collecting function. As another way, the electronic device 100 may form the communication channel with the external device and support the image receiving function.

When the input signal (or input event) is generated, the electronic device 100 may verify whether the input event is an input signal related to the selection of the candidate image in operation 403. When the input signal not related to the selection of the candidate image is generated, the electronic device 100 may execute a function corresponding to the input signal in operation 405. For example, the electronic device 100 may maintain at least one candidate image displaying function in response to the input signal. Alternatively, the electronic device 100 may return to the state in which the specific function is executed after stopping the image operating function in accordance with the type of the input signal.

When the input signal related to the selection of the candidate image is generated, the electronic device 100 may perform the analysis on the feature object in operation 407. For example, the electronic device 100 may extract one or more objects included in the selected candidate image. The electronic device 100 may extract the object (e.g., a person object, an animal object, a specific thing object, or the like) having specific features among the extracted objects.

In operation 409, the electronic device 100 may display at least one recommendation object or the recommendation image based on the feature object. In this operation, the electronic device 100 may generate at least one recommendation image based on the feature object and store the feature object-based recommendation image into the memory 130. In the operation of generating and displaying the recommendation image, the electronic device 100 may generate a plurality of recommendation images configured to include partial areas (e.g., a face area, a upper body area, a whole body area) of the feature object in the case where one feature object (e.g., the person object) is extracted. In the case where a plurality of feature objects is extracted, the electronic device 100 may generate at least one recommendation image in which the feature objects are included. According to an embodiment, the electronic device 100 may generates a plurality of recommendation images each configured to include partial areas of a specific feature object among the feature objects. The specific feature object may include at least one of, for example, a person object, a person object corresponding to a designated person, an animal object corresponding to a designated animal, or a thing object corresponding to a designated object.

According to various embodiments, the electronic device 100 may generate the recommendation images with various compositions, in which at least one feature object is disposed at a constant position (e.g., a center, upper, lower, left, or right position of the image) of the image. As another example, the electronic device 100 may generate one or more recommendation images in which at least one feature object has a size equal to or lower than (or equal to or greater than) a predetermined size.

As described above, according to various embodiments, the image operation method may include analyzing the image on the basis of a display to be designated as an image (e.g., background image) of the screen or a condition of the screen (e.g., a size of display, widget information displayed on the screen) and recommending and displaying at least one image in which a portion of the analyzed image based on the condition.

According to various embodiments, the image operating method may include receiving an input signal associated with the image selection, reducing and displaying the screen to which the image selected by the input signal (e.g., a first input event) is applied, displaying the image on the reduced screen, and displaying the image in response to the input signal (e.g., a second input event) after magnifying, reducing, or moving the image. The image operating method may further include outputting a screen, from which the image selected in response to an application input signal (e.g., a third input event) is selected, to the display.

According to various embodiments, the image operating method may include analyzing an image corresponding to an image selection signal applied to a background screen, extracting at least one object included in the image, and displaying a recommendation image corresponding to portions of the image on the basis of the extracted objects. In this operation, the image operating method may include providing a recommendation image in which at least one recommendation image is applied to an entire screen.

According to various embodiments as described above, the image operating method according to an embodiment may include displaying at least one candidate image through a display and displaying at least one recommendation object corresponding to partial areas of the candidate image selected from the candidate images and having a size smaller than that of the candidate image through an area partitioned from the candidate image.

According to various embodiments, the method may further include extracting at least one feature object (e.g., the person object, the animal object, the thing object, or the like) included in the candidate image, selecting at least one feature object in accordance with the condition designated in association with the extracted feature object, and generating the recommendation object on the basis of at least a portion of the selected at least one feature object.

According to various embodiments, the method may further include applying the recommendation image corresponding to the recommendation object selection to the background image of the designated screen.

Figure 5:
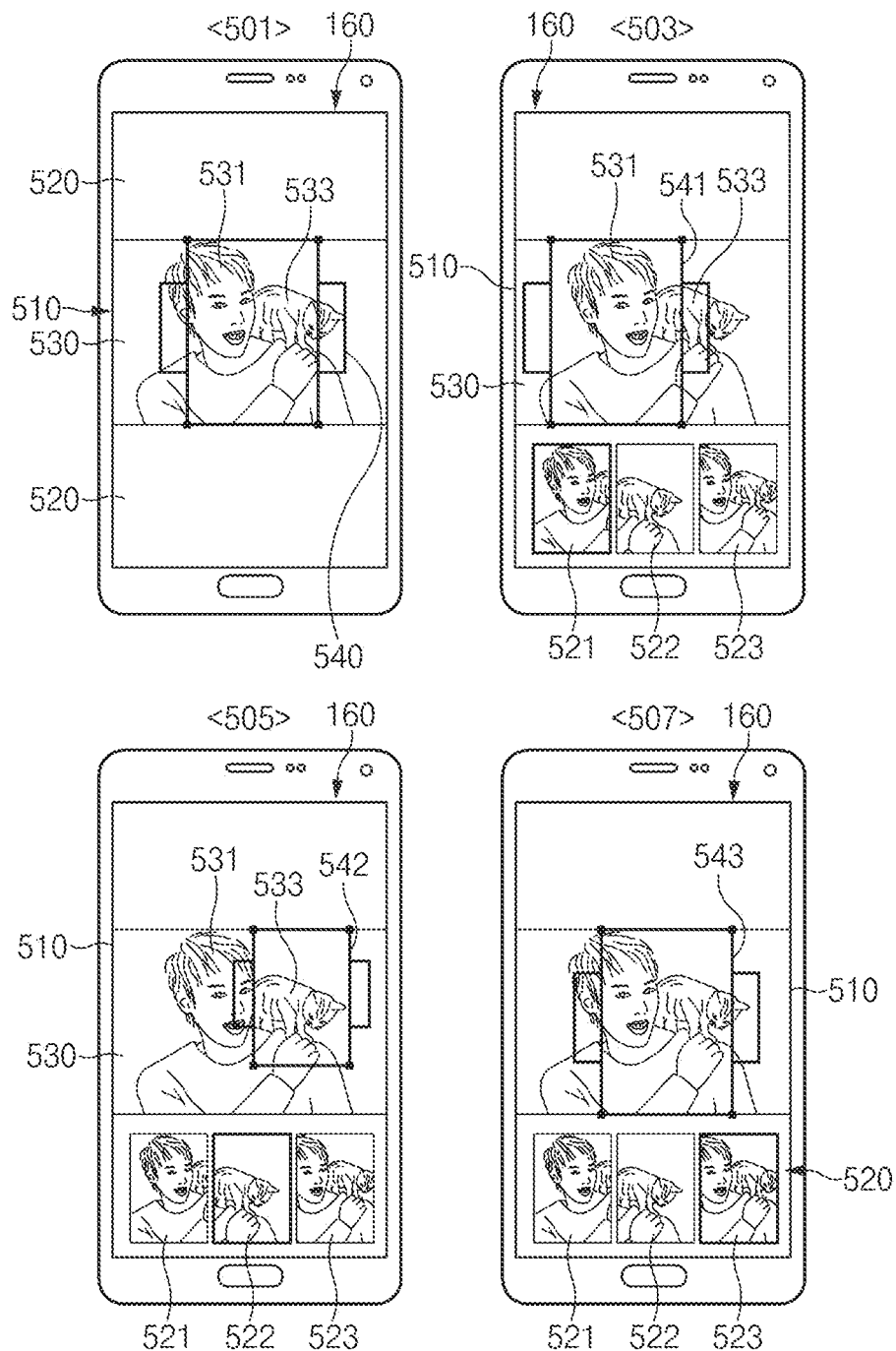
FIG. 5 is a view showing an example of a screen interface associated with an region of interest (ROI)-oriented image recommendation according to various embodiments of the present disclosure.

FIG. 5 is a view showing an example of a screen interface associated with an ROI-oriented image recommendation according to various embodiments of the present disclosure.

Referring to FIG. 5, when a setting association with the execution of the image operating function arrives or an input signal associated with the execution is generated, the electronic device 100 may display at least one candidate image 530 through a portion of the screen as shown in a state 501. According to an embodiment, the electronic device 100 may output a screen configured to include a first area 510 in which the candidate image 530 is displayed and a second area 520 corresponding to the blank space of the candidate image 530 through the display 160. In addition, the electronic device 100 may display guide information 540 indicating at least a partial area (or at least a partial area of the specific object) of the candidate image 530 in the first area 510.

In regard to the support of the above-mentioned function, the electronic device 100 may extract at least one ROI among the objects included in the candidate image 530. For instance, the electronic device 100 may extract a first object 531 (e.g., the person object) and a second object 533 (e.g., the animal object) from the candidate image 530. The guide information 540 may be provided by an image ratio of the image to an entire area of the display 160 when the electronic device 100 is arranged in a specific arrangement state (e.g., a vertical arrangement state or a horizontal arrangement state).

In the operation of determining the ROI, the electronic device 100 may utilize various manners for the object recognition, such as a face recognition, a thing recognition, etc. As another way, the electronic device 100 may assign a priority to a key person (e.g., a person selected by a user's designation or a person stored into a memory like the phone book) and a certain thing (e.g., a thing selected by a user's designation or word and image indicating a certain thing input by the user's designation). In this case, information on the ROI may be stored inside a terminal device and may be provided through a server connectable to an external source.

According to the analyzed result of the candidate image 530, the candidate image 530 may be analyzed in a state where the face of the person and the upper half of the body occupy the largest area. In addition, electronic device 100 may analyze that the background portion of the image except for the person and a cat is blur. The electronic device 100 may extract a first object 531 corresponding to the person and a second object 533 corresponding to one cat as the ROI by analyzing the candidate image 530. Accordingly, the electronic device 100 may select recommendation image groups in consideration of a ratio to be displayed on the screen focusing on three areas respectively corresponding to the face of the person, the cat, and the person with the cat. In this case, the electronic device 100 may generate the recommendation image by determining the composition to match at least one of a feature of the person (e.g., the first object 531) or the things (e.g., the second object 533) and the ratio (or a size) of the screen displayed by the set recommendation manner. According to an embodiment, the electronic device 100 may place the area in which the face of the person is arranged at an upper end of the screen with respect to the center of the screen. As another way, the electronic device 100 may place a whole body of the person at the center of the screen.

According to an embodiment, when the extraction of the ROI is completed, the electronic device 100 may generate one or more recommendation images on the basis of the extracted first and second objects 531 and 533. The electronic device 100 may output the recommendation objects 521, 522, and 523 corresponding to the generated recommendation images through a predetermined area as shown in a state 503. According to an embodiment, the electronic device 100 may output the candidate image 530 through the first area 510 and may output the recommendation objects 521, 522, and 523 through at least a partial area (e.g., a lower end or an upper end of the display 160) of the second area 520. In this operation, the electronic device 100 may control the size of the recommendation objects 521, 522, and 523 output corresponding to the size of the second area 520.

Referring to the state 503, the electronic device 100 may output a first recommendation object 521 in which the first object 531 becomes main portion (e.g., the first object 531 is displayed at a size greater than a specific size or displayed at a designated position) or is included, a second recommendation object 522 corresponding to the recommendation image appearing such that the second object 533 becomes main portion, or a third recommendation image appearing such that the first and second objects 521 and 533 become main portion.

According to various embodiments, when the first recommendation object 521 is indicated, the electronic device 100 may output first guide information 541 corresponding to the first recommendation object 521 to the first area 510 (or the candidate image 530). As shown in a state 505, when the second recommendation object 522 is indicated, the electronic device 100 may output second guide information 542 corresponding to the second recommendation object 522 to the first area 510 (or the candidate image 530). As shown in a state 507, when the third recommendation object 523 is indicated, the electronic device 100 may output third guide information 543 corresponding to the third recommendation object 523 to the first area 510 (or the candidate image 530). The size and position of the first, second, and third guide information 541, 542, and 543 may be changed in response to the user input. Responsive to the change in the size or position, the image of the recommendation image corresponding guide information may be changed.

According to various embodiments, the electronic device 100 may provide a screen associated with the selection of at least one object in the state 501. For example, the electronic device 100 may extract the first object 531 and the second object 533 in response to the user input. As another way, the electronic device 100 may automatically extract the first object 531 and the second object 533.

According to an embodiment, the electronic device 100 may perform the analysis on the candidate image 530 to determine one or more extraction areas in consideration of the ratio of the screen (or the ratio of the size) of the screen in which the analyzed features are displayed. The electronic device 100 may display recommendation objects corresponding to the extraction areas as shown in the states 503 to 507.

In regard to the above-mentioned object recognition method, the electronic device 100 may process the object recognition method in various ways in accordance with other information (e.g., position, sensor information, additional device information) of the electronic device except the method of using only the image itself. For example, the electronic device 100 may collect various information, such as sensor information, external electronic device information, time information, etc., associated with the recommendation of the object, and thus the electronic device 100 may control the shape, color, or brightness of the recommendation image on the basis of the collected various information.

According to an embodiment, in the case that a family travel photo is analyzed as the candidate image, the electronic device 100 may allow the shape of the recommendation image to be different on the basis of the position information. For example, in the case that a position on which the image operating function is performed is a first position (e.g., a house registered in the electronic device 100), the electronic device 100 may generate and provide the recommendation images around each person. As another example, in the case that a position on which the image operating function is performed is a second position (e.g., a public place like company), the electronic device 100 may generate and provide the overall view- or landscape-oriented recommendation images in consideration of a given policy or a condition (e.g., a personal privacy policy).

Figure 6:
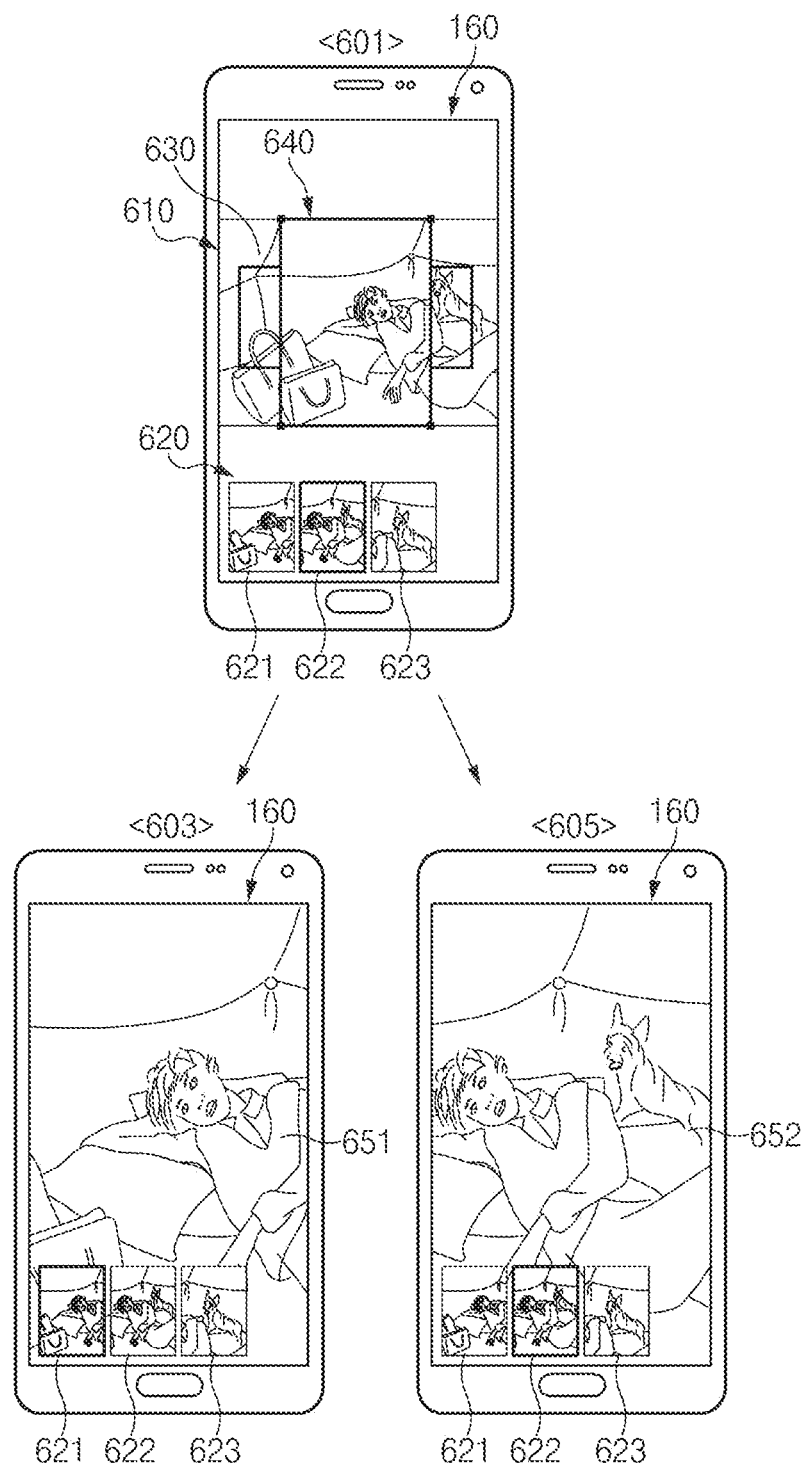
FIG. 6 is a view showing an example of a screen interface associated with the providing of the recommendation image in accordance with an ROI-oriented selection according to various embodiments of the present disclosure.

FIG. 6 is a view showing an example of a screen interface associated with the providing of the recommendation image in accordance with an ROI-oriented selection according to various embodiments of the present disclosure.

Referring to FIG. 6, the electronic device 100 may output one or more candidate images in association with the image operating function. When any one of the candidate images is selected, the electronic device 100 may generate a recommendation image corresponding to the selected candidate image and recommendation objects corresponding to the recommendation image. According to various embodiments, when the candidate image 630 is selected, the electronic device 100 may generate the recommendation objects 621, 622, and 623 on the basis of the candidate image 630. When any one of the recommendation objects 621, 622, and 623 is selected, the electronic device 100 may generate the recommendation image corresponding to the selected recommendation object. The electronic device 100 may output the generated recommendation image through the entire screen of the display 160.

According to an embodiment, the electronic device 100 may display a screen configured to include a first area 610 including the candidate image 630 and a second area 620 in which the recommendation objects 621, 622, and 623 are arranged through the display 160 through the display 160 as shown in a state 601. The electronic device 100 may display guide information 640 through the first area 610. According to an embodiment, the electronic device 100 may display the guide information 640 corresponding to the recommendation object (e.g., the second recommendation object 622) specified by default (or automatically specified) through the first area 610.

According to various embodiments, any one of the recommendation objects 621, 622, and 623 may be selected by the user input. For example, when an input signal (e.g., a touch event) corresponding to the selection of the first recommendation object 621 is generated, the electronic device 100 may display a first recommendation image 651 corresponding to the first recommendation object 621 through the entire screen of the display 160 as shown in a state 603. The electronic device 100 may output the recommendation objects 621, 622, and 623 through a specific area of the first recommendation image 651. For example, the electronic device 100 may output the recommendation objects 621, 622, and 623 to positions same as or similar to those of the recommendation objects 621, 622, and 623 shown in the state 601. The electronic device 100 may output the recommendation objects 621, 622, and 623 to be overlaid with the first recommendation image 651 such that the recommendation objects 621, 622, and 623 may be selected.

When an input signal corresponding to the selection of the first recommendation object 621 and another recommendation object (e.g., the second recommendation object 622) is received, the electronic device 100 may output the second recommendation image 652 as shown in a state 605. In this operation, the electronic device 100 may output the second recommendation image 652 through the entire screen of the display 160. The recommendation objects 621, 622, and 623 may be displayed to be overlaid with the second recommendation image 652.

When a specific input signal (e.g., an input signal requesting the presently-displayed recommendation image to be applied to the screen) is generated while a specific recommendation image is output to the display 160, the electronic device 100 may apply the presently-displayed recommendation image to a function screen (e.g., a lock screen, a home screen, a background screen of a specific application). The background screen of the specific application may include, for example, a background screen of a message creation window, a background screen of execution of a social networking site (SNS) function, a background screen of an e-mail creation window, a background of a text editor, a background screen of a document viewer, or the like. The electronic device 100 may output a popup window that determines the application of the image in association with the application of the recommendation image in the state 603 or 605. As another example, in the case that a specific time lapses while the specific recommendation image is output or a specified input event (e.g., a long-press touch event) is generated, the electronic device 100 may process the application of the recommendation image.

As described above, the electronic device 100 may display the recommendation image in an aspect ratio obtained when the image recommended in response to the selection of the recommendation object is actually applied. The user may verify the screen to which the recommendation image is applied through the preview screen.

Figure 7:
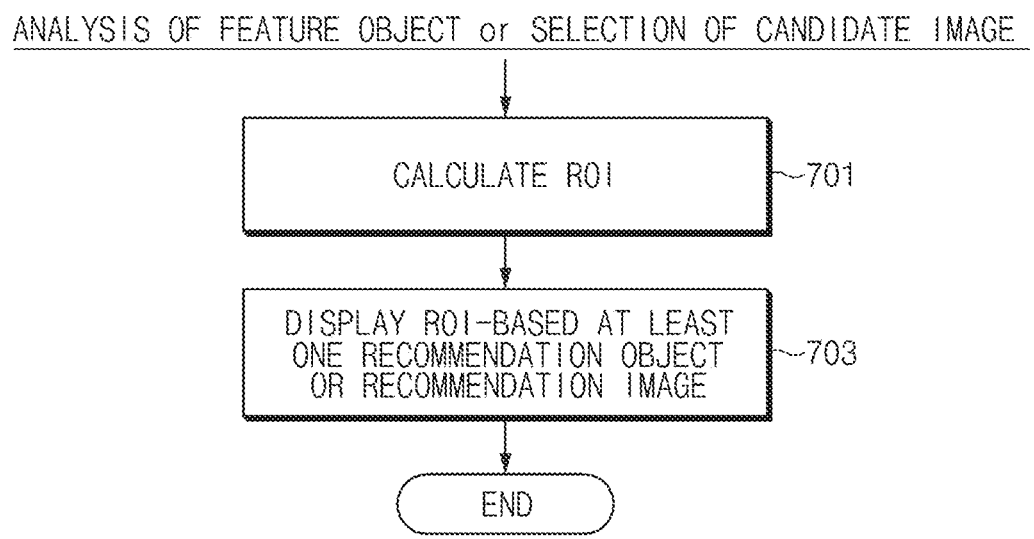
FIG. 7 is a view showing a method of providing an ROI-oriented recommendation image of an image operating method according to various embodiments of the present disclosure.

FIG. 7 is a view showing a method of providing an ROI-oriented recommendation image of an image operating method according to various embodiments of the present disclosure.

Referring to FIG. 7, when the candidate image is selected, the electronic device 100 may process the analysis on the ROI of the selected candidate image. As shown in operation 701, the electronic device 100 may calculate the ROI among the analyzed feature objects. As another way, when the candidate image is selected, the electronic device 100 may directly calculate the ROI from the selected candidate image. In regard to the process of operation 701, the electronic device 100 may store database corresponding to the ROIs. For example, the electronic device 100 may store and manage information on an image corresponding to a key person, key animal, or key thing designated by the user or on features extracted from the image. When the feature objects are extracted from the candidate image, the electronic device 100 may verify whether the ROIs exist in the extracted feature objects. Alternatively, the electronic device 100 may directly verify whether objects corresponding to the ROIs exist in the candidate image using database.

When the ROI is calculated, the electronic device 100 may display the ROI-based at least one recommendation object or recommendation image in operation 703. For example, the electronic device 100 may display the recommendation image having the composition in which at least a partial area of the ROI greater than a predetermined size is included. According to an embodiment, the electronic device 100 may display partial areas selected to have a second size different from a first size of the candidate image as the recommendation object or the recommendation image. The electronic device 100 may output at least one guide information corresponding to the partial areas. According to various embodiments, the electronic device 100 may generate and display the recommendation object (e.g., an image in the thumbnail or having a predetermined size) configured to include at least a portion of the ROI, and the electronic device 100 may display the recommendation image corresponding to the selection of the recommendation object.

Figure 8:
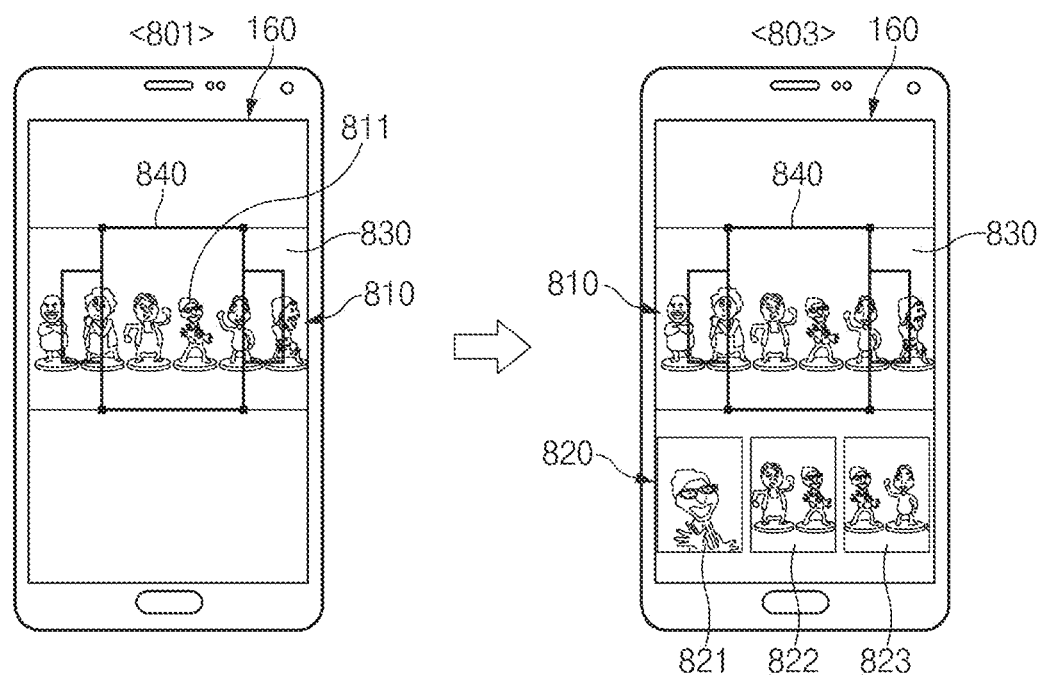
FIG. 8 is a view showing an example of a screen interface associated with the providing of the use context-based image recommendation image according to various embodiments of the present disclosure.

FIG. 8 is a view showing an example of a screen interface associated with the providing of the use context-based image recommendation image according to various embodiments of the present disclosure.

Referring to FIG. 8, the electronic device 100 may output at least one candidate image 830 through a first area 810 of the display 160 in association with the execution of the image operating function as shown in a state 801. In addition, the electronic device 100 may output guide information 840 through a first area 810. The guide information 840 may be information that indicates a predetermined composition configured to include at least a portion object (e.g., at least one person) of the candidate image 830.

According to various embodiments, when the image operating function is executed, the electronic device 100 may automatically activate the camera to allow the camera to be maintained in a photographing standby state. As another way, the electronic device 100 may form a communication channel with an external device designated when the image operating function is executed and may receive at least one candidate image or a thumbnail corresponding to the candidate image. In regard to the support of the above-mentioned function, the electronic device 100 may provide items of a memory, a camera, and an external device as a sub-menu with respect to the display of the candidate image in a menu item associated with the image operating function. Alternatively, the electronic device 100 may provide a screen in which one of the sub-menus may be automatically set during the execution of the image operating function.

When the candidate image 830 is selected, the electronic device 100 may collect user context information corresponding to the selected candidate image 830. For example, the electronic device 100 may collect information corresponding to people included in the candidate image 830. In this operation, the electronic device 100 may collect at least one of information on the people stored in the memory and information on the people provided from the specific server 106. Alternatively, the electronic device 100 may manage a user's search history and collect information on people whom the user prefers on the basis of the search information. As another way, the electronic device 100 may collect information on people tagging to a gallery (e.g., a database related to photographs).

According to drawings shown in FIG. 8, the electronic device 100 may collect person information with respect to the person objects included in the candidate image 830. According to an embodiment, the electronic device 100 may extract six person objects from the candidate image 830. The electronic device 100 may extract the object of the people whom the user prefers or the object of the people searched more than a specified number of times on the basis of the user context information. For example, the electronic device 100 may extract a fourth person object 811 from the left among the six people as the preference object (or the ROI). The electronic device 100 may generate recommendation objects 821, 822, and 823 each having a predetermined size and including the fourth person object 811 in state 803. In addition, the electronic device 100 may generate recommendation images corresponding to the recommendation objects 821, 822, and 823. The electronic device 100 may output the recommendation objects 821, 822, and 823 generated with respect to the person object 811 to the second area 820.

Figure 9:
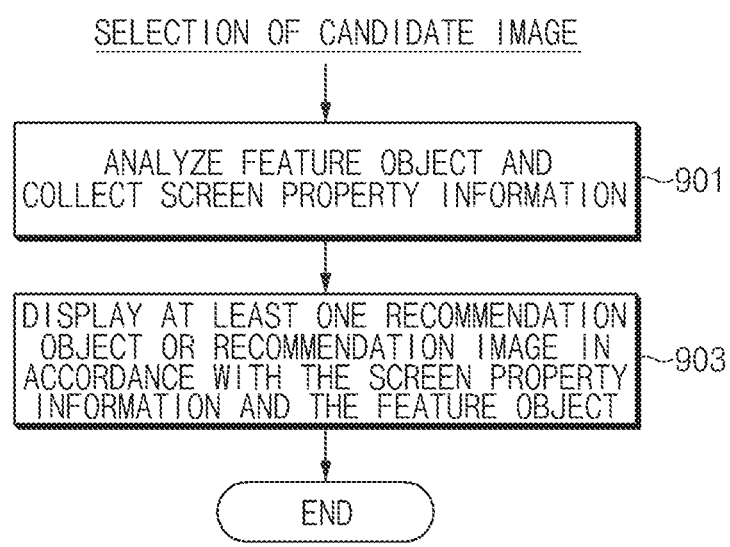
FIG. 9 is a view showing a method of providing a recommendation image on the basis of a screen property and a feature object according to various embodiments of the present disclosure.

FIG. 9 is a view showing a method of providing a recommendation image on the basis of a screen property and a feature object according to an embodiment of the present disclosure.

Referring to FIG. 9, in the case that the image operating function is executed, the electronic device 100 may output a screen that allows at least one candidate image to be selected. When an input signal associated with the selection of the candidate image is generated, the electronic device 100 may perform the analysis of the feature object and the collection of information on the screen property on the candidate image in accordance with the input signal as shown in operation 901. In this regard, the electronic device 100 may extract one or more feature objects included in the candidate image. In addition, the electronic device 100 may collect the property of the screen to which the feature objects are applied. The screen property may include, for example, information on a whole size of the display 160, a basic arrangement (e.g., a horizontal arrangement or a vertical arrangement) of the display 160, and color, size, and position of at least one display object (e.g., an object, such as a widget or an icon, arranged in an area except for the area to which the candidate image is applied) included in the screen. According to an embodiment, the electronic device 100 may verify a size and a position of the display objects. Alternatively, the electronic device 100 may verify a size of an area in which the display object is not displayed or information on a screen ratio.

In operation 903, the electronic device 100 may display at least one recommendation object or the recommendation image in accordance with the screen ratio information and the feature objects. For example, the electronic device 100 may determine a position of one or more feature objects such that the feature objects are not overlapped with the display objects and may generate the recommendation objects or the recommendation image, which is configured to include at least one or more areas of the feature objects as viewed relative to the determined position. Alternatively, the electronic device 100 may detect areas having a size equal to or greater than a predetermined size among areas in which the display object is not detected. The electronic device 100 may select the largest area among the areas having the size equal to or greater than the predetermined size. The electronic device 100 may generate recommendation objects or recommendation image, in which at least a partial area of the feature objects designated to the selected area is arranged. When the recommendation objects are generated, the electronic device 100 may output the recommendation objects to the display 160. When a specific feature object is selected among the feature objects, the electronic device 100 may apply the recommendation image corresponding to the selected recommendation object to the designated screen.

According to various embodiments, the electronic device 100 may display specific guide information on the display 160. The guide information may include information to guide the property (e.g., a layout of the screen, an arrangement of the icon, etc.) of the screen to which the recommendation image corresponding to the recommendation object selected in response to the user input is applied. In the case that the selected recommendation image is applied to the screen, the user may verify how the selected image is affected by the property of the screen. The guide information may show a guideline form and a layout widget (or icon) that is actually applied in accordance with the user's setting. Alternatively, the guide information may recommend the layout during the generation and display of the recommendation objects.

Figure 10:
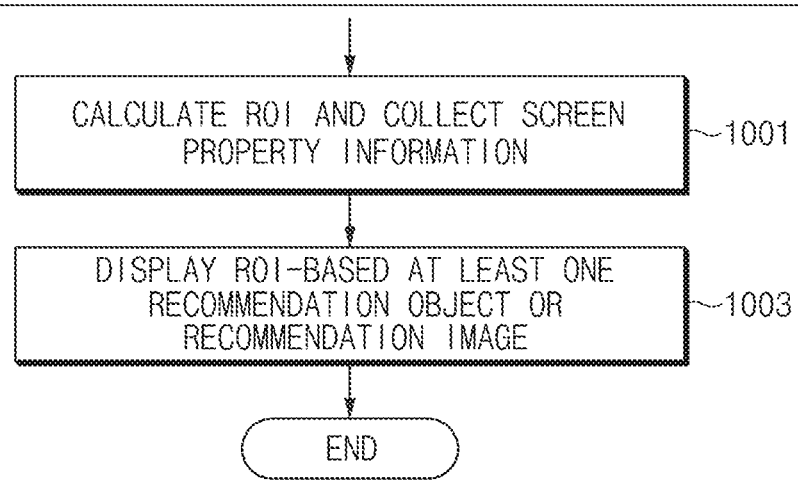
FIG. 10 is a view showing a method of providing a recommendation image on the basis of a screen property and an ROI according to various embodiments of the present disclosure.

FIG. 10 is a view showing a method of providing a recommendation image on the basis of a screen property and an ROI according to various embodiments of the present disclosure.

Referring to FIG. 10, in the case that the image operating function is executed, the electronic device 100 may provide a screen associated with selection of at least one candidate image. In this regard, the electronic device 100 may provide a screen to search the at least one candidate image stored in the memory 130. Alternatively, the electronic device 100 may perform an analysis on the feature object included in the selected candidate image in response to the selection of the candidate image.

When the candidate image is selected or the analysis of the feature object is completed, the electronic device 100 may calculate the ROI and collect the screen property information in operation 1001. The calculating of the ROI may include detecting an object matching with at least one of person, animal, and object, which are previously designated. In the case that the ROI does not exist, the electronic device 100 may select at least one feature object disposed at a designated position (e.g., a center of the screen) among the feature objects as the ROI. Alternatively, the electronic device 100 may select at least one feature object having a size equal to or greater that a predetermined size as the ROI. The electronic device 100 may collect the screen property information while calculating the ROI. As described above, the screen property information may include at least one of a size of the display, a resolution of the display, a position and a size of at least one display object included in the screen displayed in the display 160, and a position and a size of a blank space in which the display objects are not displayed.

In operation 1003, the electronic device 100 may display at least one recommendation object or recommendation image on the basis of the ROI and the screen property information. In this operation, the electronic device 100 may generate and display the at least one recommendation object on the basis of the ROI and the screen property information and display the recommendation image corresponding to the selected recommendation object through the display 160.

According to various embodiments, the electronic device 100 may generate the recommendation object or the recommendation image on the basis of partial areas of the ROI. In this regard, the electronic device 100 may detect the specific area (e.g., a face or an upper half body) of the ROI. According to various embodiments, the electronic device 100 may detect a position of the display objects of the screen to which the recommendation image is applied or the electronic device 100 may detect at least one of a shape, a size, and a position of the certain area, in which the display objects are not disposed, by verifying the screen property information. The electronic device 100 may select at least one of the number of the ROIs, a kind of portion of the ROI, and a size of the portion of the ROI in response to at least one of a shape, size and position of the specific area in which the display objects are not disposed. According to various embodiments, the electronic device 100 may detect an area in which the display objects arranged in predetermined positions among the display objects are arranged. For example, in the case that the predetermined number of display objects are arranged at upper and lower ends of the screen, the electronic device 100 may detect a specific area in which one or more display objects disposed at the upper end are not arranged. The electronic device 100 may generate the recommendation object and the recommendation image to correspond to the detected specific area.

As described above, according to various embodiments, the electronic device according to an embodiment may include the memory storing at least one candidate image and the processor connected to the memory. At least one instruction stored in the memory and executed by the processor may be configured to collect the screen property information (e.g., size, shape, and resolution of the display, position, size, and number of the display objects displayed through the screen), to extract the feature object (or ROI) included in the selected candidate image among the displayed candidate images in accordance with the screen property information, and to generate the recommendation object on the basis of at least a portion of the extracted feature object (or ROI).

Figure 11:
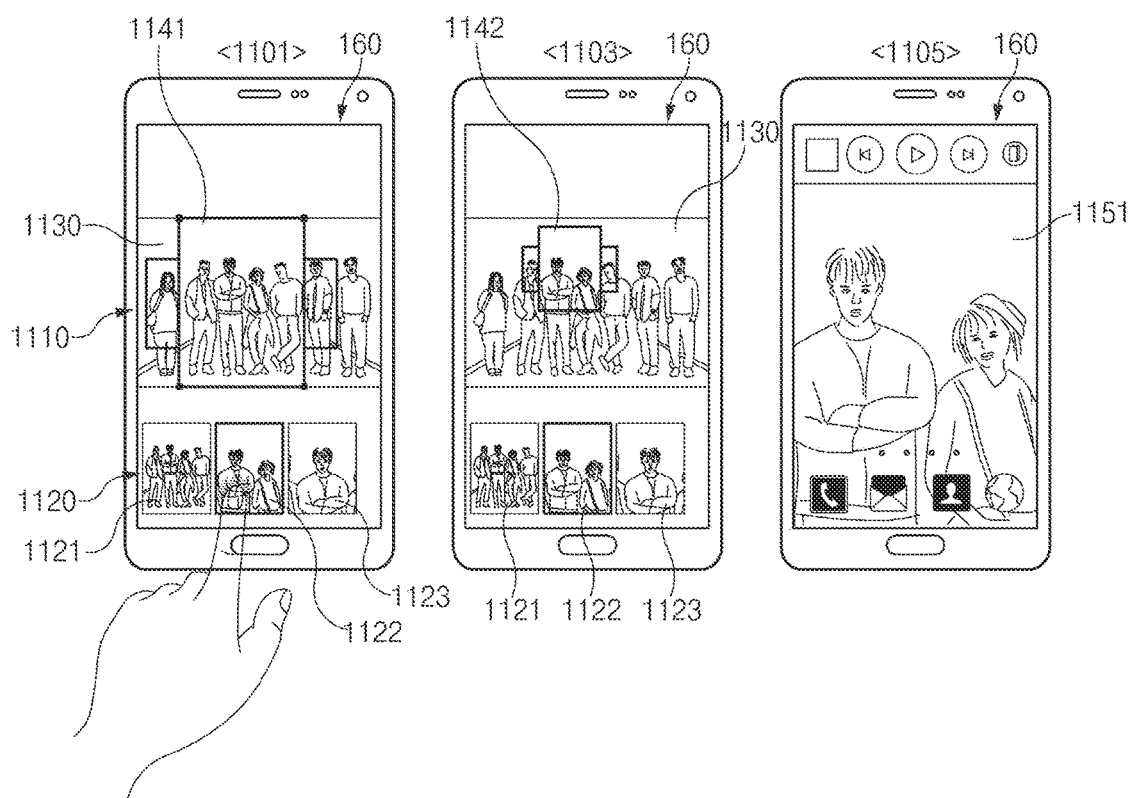
FIG. 11 is a view showing an example of a screen interface in accordance with a guide operation according to various embodiments of the present disclosure.

FIG. 11 is a view showing an example of a screen interface in accordance with a guide operation according to various embodiments of the present disclosure.

Referring to FIG. 11, the electronic device 100 may display a screen configured to include a first area 1110 in which a candidate image 1130 is disposed and a second area 1120 in which recommendation objects 1121, 1122, and 1123 are disposed through the display 160 as shown in a state 1101. The recommendation objects 1121, 1122, and 1123 may be generated by selecting the specific object among the feature objects included in the candidate image 1130. For example, the electronic device 100 may select at least one feature object disposed at a center area of the screen among the feature objects included in the candidate image 1130. The electronic device 100 may display a first recommendation object 1121 configured to include a first number of feature objects (e.g., four feature objects) including the selected feature objects, a second recommendation object 1122 configured to include a second number of feature objects (e.g., two feature objects) including the selected feature objects, and a third recommendation object 1123 configured to include only the selected feature object through a specific area of the display 160.

The electronic device 100 may output guide information (e.g., a layout) in response to the selected recommendation object among the recommendation objects 1121, 1122, and 1123. According to an embodiment, the electronic device 100 may display first guide information 1141 corresponding to the first recommendation object 1121 designated as default above the candidate image 1130 as shown in a state 1101. In addition, when an input signal associated with the selection of the second recommendation object 1122 is received, the electronic device 100 may display second guide information 1142 above the candidate image 1130 as shown in a state 1103. When an input event associated with the application of the screen is generated after the second guide information 1142 is displayed, the electronic device 100 may output the screen to which the second recommendation image 1151 corresponding to the selected second recommendation object 1122 is applied as shown in a state 1105.

As described above, the electronic device 100 may display the layout (e.g., the guide information), to which the recommendation image is applied in response to the selection of the recommendation object, on the candidate image in a simple shape (or a real shape or a transparent shape). Accordingly, the user may predict a shape obtained after the recommendation image is set on the basis of the layout information obtained before the recommendation image is applied.

The layout of the image applied to the screen may be displayed by using a basic screen (e.g., the candidate image 1130) and may be configured to verify a layout of another screen in accordance with the use's request. For example, in the case that the user performs a dragging gesture in left and right directions after the user performs a long-press gesture on a background screen setting layout (e.g., the guide information displayed on the candidate image), the electronic device 100 may display another layout (e.g., another guide information corresponding to another recommendation object) that is to be applied to a real background screen.

According to various embodiments, the electronic device 100 may provide a function that may control the guide information corresponding to the recommendation image area. For example, when an input event associated with the selection of the second guide information 1142 is generated in the state 1103, the electronic device 100 may activate a control function of the second guide information 1142. Responsive to the input event additionally input, the electronic device 100 may decrease or increase the size of the second guide information 1142 and may move the position of the second guide information 1142. In this operation, when the position and the size of the guide information are controlled, the electronic device 100 may change a display state of the recommendation object on the changed guide information.

Figure 12:
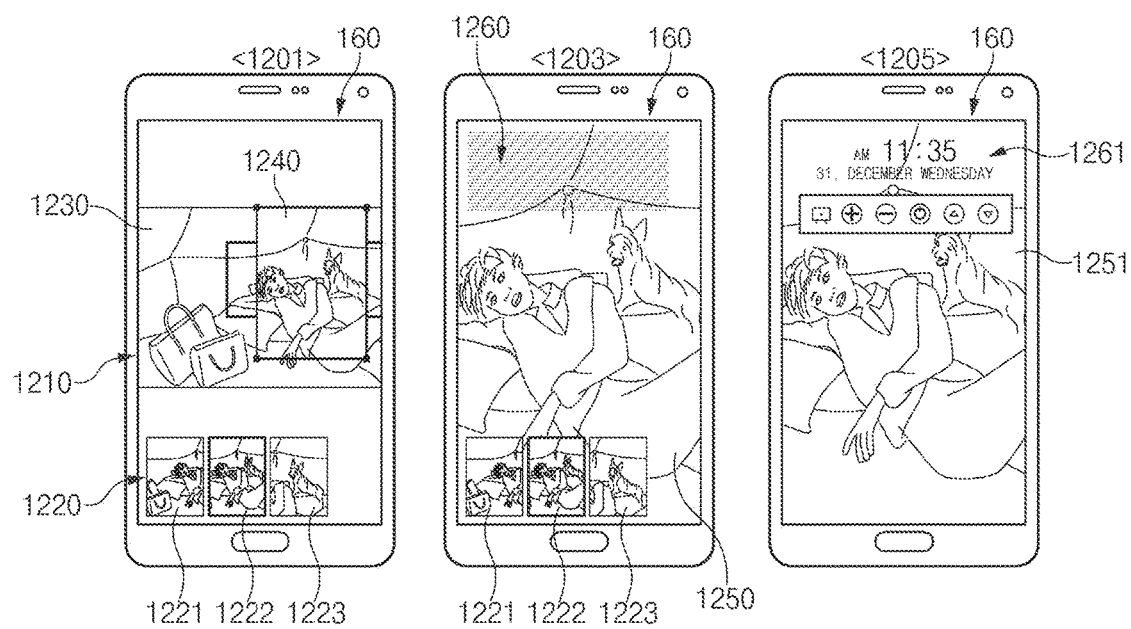
FIG. 12 is a view showing a screen interface providing a screen property-based image operating function according to various embodiments of the present disclosure.

FIG. 12 is a view showing a screen interface providing a screen property-based image operating function according to various embodiments of the present disclosure.

Referring to FIG. 12, the electronic device 100 may display a screen configured to include a first area 1210 in which a selected candidate image 1230 is included and a second area 1220 in which recommendation objects 1221, 1222, and 1223 generated on the basis of the selected candidate image 1230 are disposed through the display 160 as shown in a state 1201. The electronic device 100 may display first guide information 1240 corresponding to the selected recommendation object (e.g., the second recommendation object 1222) selected as default (or by a user input) above the candidate image 1230 (or above the first area 1210).

According to various embodiments, when an input signal corresponding to the selection of the recommendation object is received, the electronic device 100 may output an application preview image 1250 corresponding to the recommendation object (e.g., the second recommendation object 1222) selected by the input signal as shown in a state 1203. In this operation, the electronic device 100 may display the recommendation objects 1221, 1222, and 1223 above the application preview image 1250. In addition, the electronic device 100 may collect screen property information to which the recommendation image is applied or may verify the screen property information stored in the memory. For example, as shown in a state 1205, the electronic device 100 may collect information on a display object 1261 disposed at a certain position on the screen to which the recommendation image is applied and having a certain size. The electronic device 100 may display guide information 1260 corresponding to the display object 1261 on the application preview image 1250. The guide information 1260 may be a certain image, line, or text corresponding to the position and the size of the display object 1261. The guide information 1260 may have a size that is the same as that of the display object 1261 or includes the entire portion of the display object 1261. According to various embodiments, the guide information 1260 may be removed in accordance with the user input in the state 1203. For example, when an input event (e.g., a long-press or touch drag event) is generated to indicate the guide information 1260, the electronic device 100 may temporarily remove the guide information 1260 in the state 1203. When a specific input event (e.g., a long-press event or a double touch) is generated, the electronic device 100 may display the removed guide information 1260 on the screen again. According to various embodiments, the electronic device 100 may support a function that removes or re-displays the guide information 1260 in the state 1205. For example, when the specific input event is generated in the state 1205, the electronic device 100 may temporarily remove the display object 1261. When the specific input event (e.g., an event that is the same as or different from the input event used to remove the display object 1261) while the display object 1261 is removed, the electronic device 100 may display the display object 1261 on the screen again.

In a state in which the application preview image 1250 is displayed, the electronic device 100 may output a screen to which the selected recommendation image 1251 is applied as a screen 1205 when an input event associated with the screen application is generated. The display object 1261 may be displayed on the screen through which the selected recommendation image 1251 is displayed.

As described above, the electronic device 100 may recommend the image on the property of the screen to be set. In this regard, the electronic device 100 may analyze feature objects included in the candidate image selected by the user and determine at least one extraction area appropriate for a screen ratio of a screen in which the analyzed feature objects are mainly displayed. Then, the electronic device 100 may recommend the image in consideration of the feature objects reflected in the extraction area and the property of the screen to be set.

According to various embodiments, when the candidate image 1230 is selected in the state 1201, the electronic device 100 may provide ROI-based recommendation objects in the selected candidate image 1230. In this operation, the ROI may include a partial area (e.g., a face) of a certain person object. Accordingly, the ROI may be covered (or overlapped) by the property (e.g., the display object) of the screen (e.g., the home screen) to be set. In this regard, the electronic device 100 may generate the recommendation objects such that the display objects included the screen, which is to be set, are not overlapped with the ROI. In this operation, the electronic device 100 may control a magnification of the image such that the ROI is not overlapped with the display object or may provide at least one recommendation object (e.g., the second recommendation object 1222) in which a position is controlled.

Figure 13:
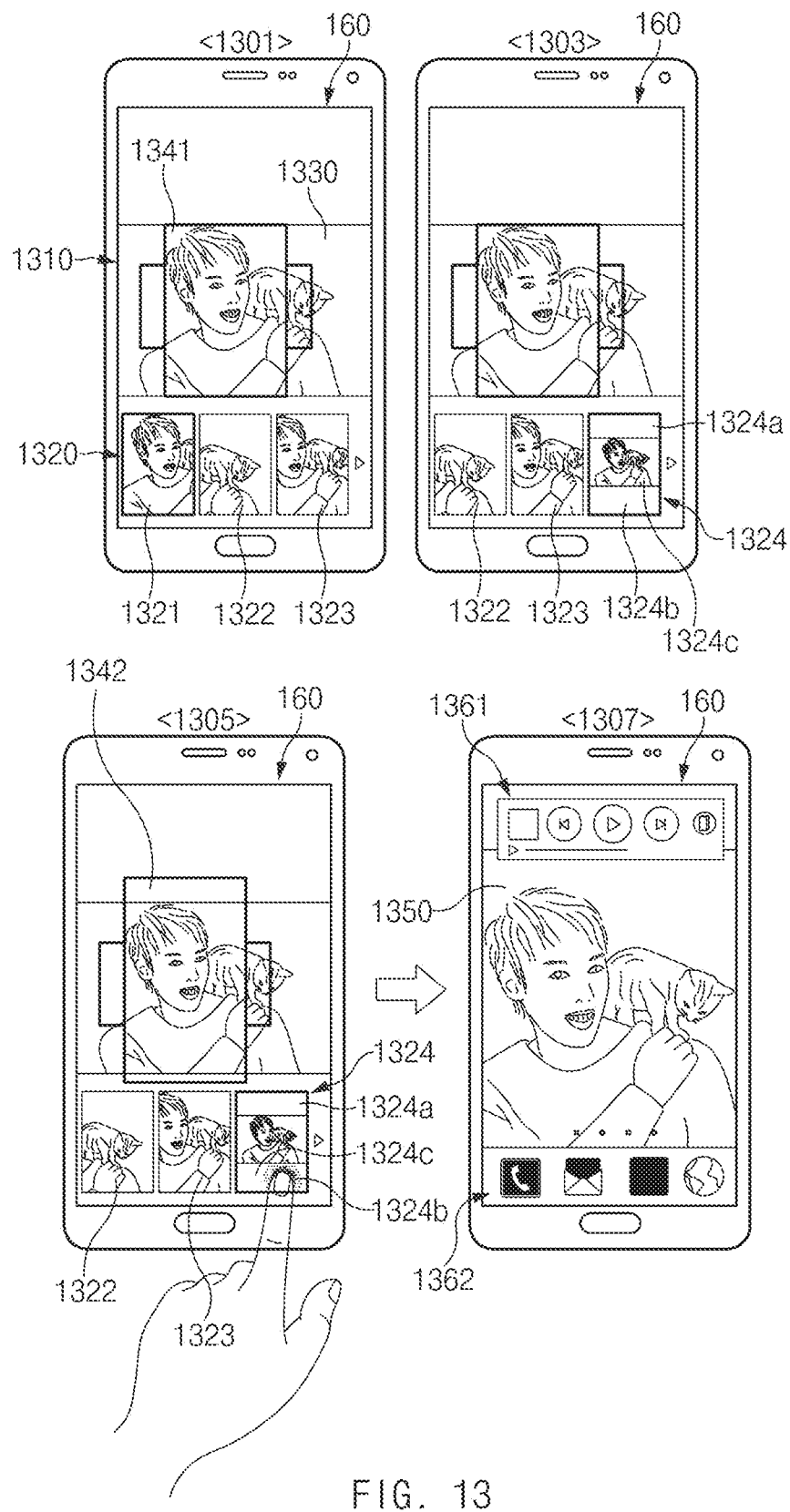
FIG. 13 is a view showing an example of a screen interface associated with a process of providing excessive recommendation of image according to various embodiments of the present disclosure.

FIG. 13 is a view showing an example of a screen interface associated with a process of providing excessive recommendation of image according to various embodiments of the present disclosure.

Referring to FIG. 13, an image selected by the user may be a horizontal image having a relatively large horizontal length, and an image display state of the electronic device 100 may be a vertical screen having a relatively large vertical length. In this case, the electronic device 100 may generate and provide a recommendation object and a recommendation image corresponding to a horizontal screen.

According to an embodiment, when a candidate image 1330 is selected, the electronic device 100 may display a first area 1310 in which the candidate image 1330 is displayed and a second area 1320 including recommendation objects 1321, 1322, and 1323 through the display 160 as shown in a state 1301. In the case that the number of the recommendation objects 1321, 1322, and 1323 having the specified size is much more than the number of the recommendation objects that may be displayed in the second area 1320, the second area 1320 may be scrolled while being scrolled as shown in FIG. 13. According to an embodiment, the electronic device 100 may provide three recommendation objects each having a composition that does not exceed the size of the candidate image 1330 in consideration of the resolution and the screen ratio of the display 160. When considering the resolution and the screen ratio of the display 160, an image including all of the person and the cat, which are the ROI, may not be provided.

When a scroll event occurs on the second area 1320, the electronic device 100 may not output the recommendation object, which is not displayed, as shown in a state 1303. According to an embodiment, the electronic device 100 may output the first recommendation object 1321, the second recommendation object 1322, and the third recommendation object 1323 to the second area 1320 as shown in the state 1301. Responsive to the occurrence of the scroll event, the electronic device 100 may output the second recommendation object 1322, the third recommendation object 1323, and the fourth recommendation object 1324 to the second area 1320. According to an embodiment, the fourth recommendation object 1324 may correspond to a recommendation image configured to include the blank space area and a specific area of the candidate image 1330. Alternatively, the fourth recommendation object 1324 may correspond to a recommendation image obtained by modifying the candidate image with the horizontal mode to correspond to the vertical mode of the display 160. The fourth recommendation object 1324 may include, for example, an upper blank space area 1324a, a lower blank space area 1324b, and a center image area 1324c.

When the fourth recommendation object 1324 is selected in the state 1303, the electronic device 100 may display guide information 1342 corresponding to the fourth recommendation object 1324 on the candidate image 1330 as shown in a state 1305. According to an embodiment, the guide information 1342 may be displayed on the candidate image 1330 and the blank space area to include the blank space area corresponding to the upper blank space area 1324a and the lower blank space area 1324b.

According to an embodiment, the upper and lower blank spaces of the fourth recommendation object 1324 may be controlled based on positions of first and second display objects 1361 and 1362. Alternatively, the fourth recommendation object 1324 may include an object in which the upper and lower blank spaces have the similar ratio in consideration that the first and second display objects 1361 and 1362 have the similar screen ratio and arrangement area. As another way, the fourth recommendation object 1324 may include a recommendation object associated with the output of the image in which the upper and lower blank spaces have a symmetry ratio.

When an input event associated with an application of the fourth recommendation object 1324, the electronic device 100 may output a screen to which the fourth recommendation image 1350 is applied as shown in a state 1307. In the state 1307, the electronic device 100 may output the fourth recommendation image 1350 as a background image and may output the first and second display objects 1361 and 1362 through a specific area. Here, the area in which the first and second display objects 1361 and 1362 are arranged may include an area corresponding to the blank space area of the fourth recommendation image 1350.

The electronic device 100 may select a blank space area symmetrically exceeding the upper and lower ends of a specific area including the ROIs while providing the fourth recommendation object 1324. Alternatively, the electronic device 100 may select the blank space such that the upper end of the blank space of the fourth recommendation object 1324 is greater or smaller than the lower end of the blank space of the fourth recommendation object 1324. For example, the electronic device 100 may select a face area among areas for the person and cat, which are the ROIs, as a center of the ROIs. In this case, the electronic device 100 may set the blank space to exceed the layout of the area in which upper portions of the faces of the candidate image are arranged. According to various embodiments, when a color confusion (e.g., a color in the blank space is similar to that of a specific area of the candidate image 1330) occurs regardless of an importance (e.g., an importance of a condition designated in order of leg<body<face), the electronic device 100 may not provide the recommendation object and the recommendation image, which are configured to include the blank space.

Figure 14:
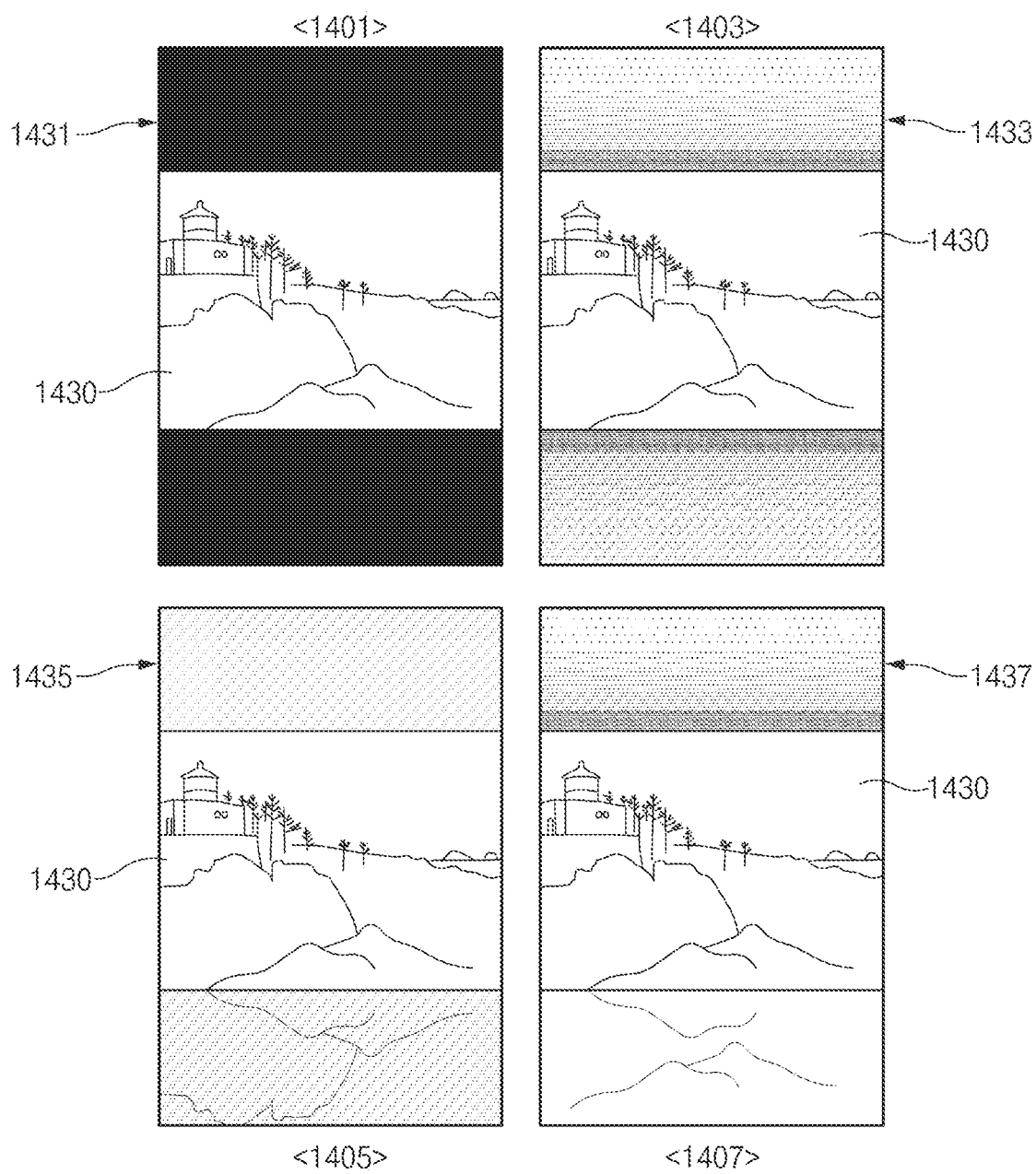
FIG. 14 is a view showing an example of a screen interface associated with a process of displaying the blank space according to various embodiments of the present disclosure.

FIG. 14 is a view showing an example of a screen interface associated with a process of displaying the blank space according to various embodiments of the present disclosure.

Referring to FIG. 14, the electronic device 100 may process the blank space to have a specific color, image, or shape while providing a recommendation object or a recommendation image configured to include the blank space area. For example, the electronic device 100 may apply specific effects (e.g., gradation effect, reversal effect, crop and blur effect, or the like) to the blank space area. According to an embodiment, the electronic device 100 may process a first blank space 1431 to have a specific single color (e.g., a black color) as shown in a state 1401. The single color may be set by default or selected by the user. Alternatively, the single color may be selected on the basis of the overall color of the candidate image 1430 or a screen to which the image is applied. As another way, the single color may include a black image set to be applied to the blank space area.

According to an embodiment, the electronic device 100 may apply the gradation effect to a second blank space area 1433 as shown in a state 1403. A base color of the gradation may be set by default or selected by the user. Alternatively, the base color of the gradation may be selected on the basis of the overall color of a picture or a screen to which the image is applied. According to an embodiment, the electronic device 100 may apply a shadow effect (e.g., the reversal effect) to a third blank space 1435 as shown in a state 1405. According to an embodiment, the electronic device 100 may apply the crop and blur effect to a specific area of the candidate image 1430 and provide the specific area to a fourth blank space 1437 as shown in a state 1407. According to various embodiment, the electronic device 100 may provide another image effect in addition to the effects applied to the four blank space areas 1431, 1433, 1435, and 1437.

Figure 15:
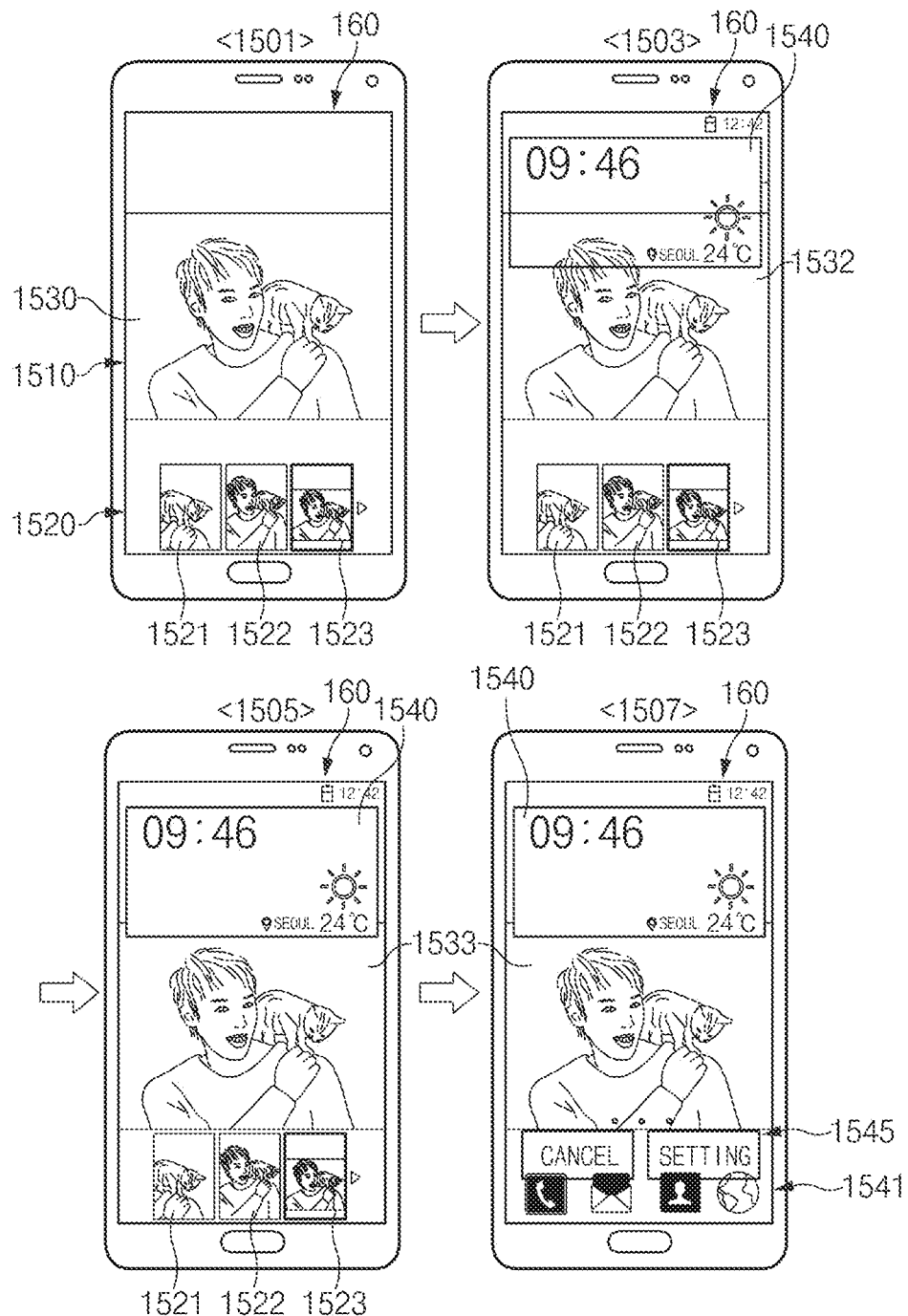
FIG. 15 is a view showing a screen providing a screen property-based recommendation image according to various embodiments of the present disclosure.

FIG. 15 is a view showing a screen providing a screen property-based recommendation image according to various embodiments of the present disclosure.

Referring to FIG. 15, the electronic device 100 may verify the screen property and provide at least one recommendation object or recommendation image on the basis of the screen property. For example, an aspect ratio of the candidate image selected by the user may be a horizontal form image in which a horizontal length is relatively greater than t a vertical length, and a basic display state of the display 160 may be a vertical form image in which the vertical length is relatively greater than the horizontal length. In this case, the electronic device 100 may generate a recommendation object and a recommendation image, which have an optimized ratio to a vertical mode, by using at least a specific area of the candidate image having the horizontal form and at least a portion of the blank space area.

Responsive to the execution of the image operating function and the selection of the candidate image, the electronic device 100 may display a screen configured to include a first area 1510 in which a candidate image 1530 is disposed and a second area 1520 in which recommendation objects 1521, 1522, and 1523 are disposed through the display 160 as shown in a state 1501. According to an embodiment, the recommendation objects 1521, 1522, and 1523 may be generated based on at least a specific area of at least a certain object among ROIs (e.g., person or cat) included in the candidate image 1530. A change in the candidate image 1530 displayed in the first area 1510 may be determined depending on the designation of the recommendation objects disposed in the second area 1520. For example, the second recommendation image may be displayed in the first area 1510 in accordance with the designation of the second recommendation object.

According to various embodiments, the electronic device 100 may receive an input event associated with the application of the screen property. In this regard, the electronic device 100 may process an assignment of at least one virtual key button, a menu, or a physical button to indicate the application of the screen property. Alternatively, the electronic device 100 may automatically process the application of the screen property when a predetermined time lapses after the recommendation image 1532 is displayed in the first area 1510.

Responsive to the screen property application process, the electronic device 100 may display a first display object 1540 of a screen (e.g., a home screen), to which the recommendation image 1532 is applied, on the recommendation image 1532 as shown in a state 1503. The first display object 1540 may include, for example, a watch widget or a weather widget. As shown in FIG. 15, a specific area (e.g., a specific portion like the face of the ROI) of the recommendation image 1532 may be covered by the first display object 1540. Responsive to this, the electronic device 100 may display a recommendation image 1533 corresponding to the third recommendation object 1523 as shown in a state 1505 in consideration of the position of the first display object 1540 and the specific area (e.g., a face area of the person or a face area of the animal) of the ROI.

According to various embodiments, in the case that the specific area (e.g., the face area of the person) of the recommendation objects currently provided is overlapped with the position of the first display object 1540 by at least a portion (or a predetermined size), the electronic device 100 may output at least one recommendation object in which the positions of the ROIs are controlled such that the ROIs are not overlapped with the first display object 1540. For example, the electronic device 100 may provide the third recommendation object 1523 having upper and lower blank spaces that are asymmetrical with each other such that the first display object 1540 is not overlapped with the second display object 1541. For example, the electronic device 100 may adjust a ratio of the image or adjust a position or size of a layout including the ROI, so that the first display object 1540 is not overlapped with the second display object 1541. When an input event is generated to select the adjusted recommendation object, the electronic device 100 may output a recommendation image (e.g., the recommendation image 1533) corresponding to a recommendation object (e.g., the third recommendation object 1523) as shown in a state 1505.

According to various embodiments, when an input event associated with the application of the recommendation image 1533 is generated, the electronic device 100 may output the virtual key button 1545 associated with the application of the recommendation image 1533 as shown in a state 1507. According to various embodiments, the screen may include a second display object 1541 in addition to the first display object 1540. In this case, the electronic device 100 may provide a recommendation image to which the position or ratio of the ROI not overlapped with the first and second display objects 1540 and 1541.

As described above, according to various embodiments, the electronic device according to an embodiment may include a memory, a processor, and an instruction stored in the memory. The instruction executed by the processor may set to allow at least a portion of the feature object (or the ROI selected according to the specific condition) included the candidate image used as the recommendation object to be disposed at a position that is not overlapped with the display object set to be displayed through the screen.

Figure 16:
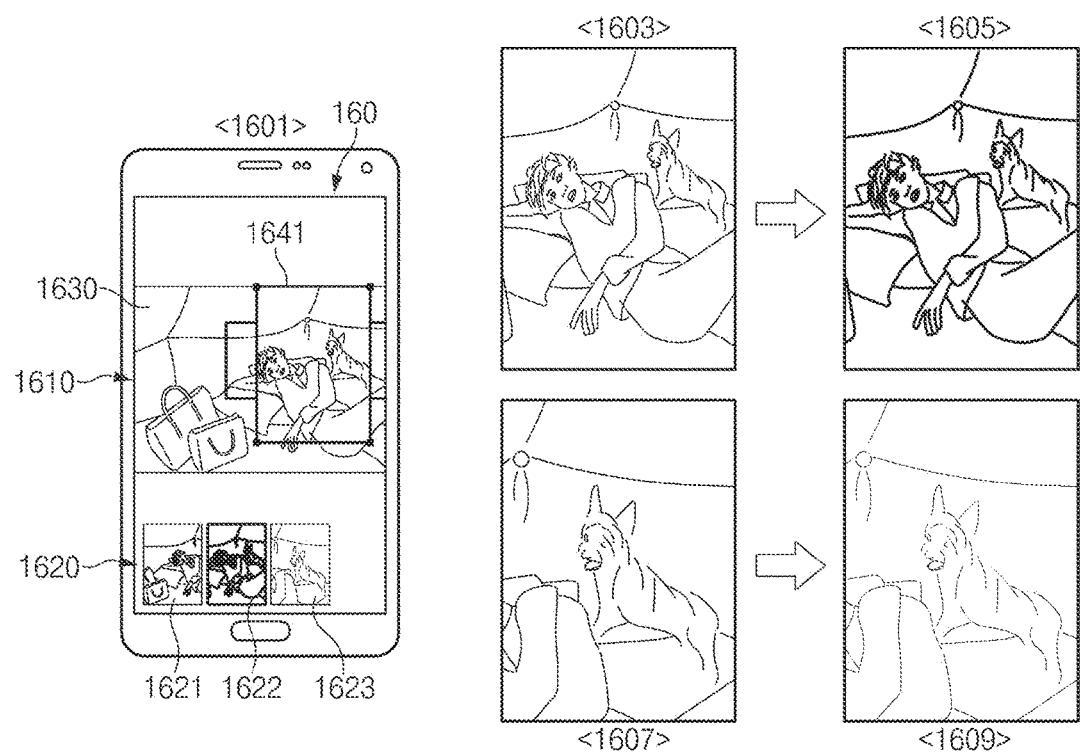
FIG. 16 is a view showing an example of a screen interface associated with a process of providing a recommendation image to which a filter is applied according to various embodiments of the present disclosure.

FIG. 16 is a view showing an example of a screen interface associated with a process of providing a recommendation image to which a filter is applied according to various embodiments of the present disclosure.

Referring to FIG. 16, the electronic device 100 may provide recommendation images applied with various filters in addition to cropping the portion image area of the candidate image 1630. According to an embodiment, when the image operating function is executed and the candidate image 1630 is selected, the electronic device 100 may output a first area 1610 through which the candidate image 1630 is displayed and a second area 1620 in which recommendation objects 1621, 1622, and 1623 are disposed to the display 160 as shown in a state 1601. In addition, the electronic device 100 may output guide information 1641. The guide information 1641 may include, for example, information indicating a partial area of the candidate image 1630 corresponding to the first recommendation object 1621 or the second recommendation object 1622.

According to various embodiments, the electronic device 100 may provide a recommendation object or a recommendation image, to which a specific display effect is applied. For example, the electronic device 100 may provide an image 1605 obtained by applying a first filter to an image 1603 configured to include all of first ROIs (e.g., a person and an animal) as the recommendation object or the recommendation image. In addition, the electronic device 100 may provide an image 1609 obtained by applying a second filter to an image 1607 configured to include a second ROI (e.g., an animal) as the recommendation object or the recommendation image. The first and second filters may provide the same effect or different effects. The first and second filters may be changed in accordance with the user's selection or setting.

According to an embodiment, the first recommendation object 1621 may include an object corresponding to an original image obtained by cropping a specific area of the candidate image 1630 designated by the guide information 1641. The second recommendation object 1622 may include an object corresponding to the recommendation image obtained by applying the first filter (e.g., a color filter, a brightness filter, a sharpness filter, a blur filer, or the like) to the first recommendation object 1621. The second recommendation object 1622 may include an object corresponding to a recommendation image obtained by cropping another specific area, i.e., a specific area including a dog, of the candidate image 1630, which is not designated by the guide information 1641. According to various embodiments, the electronic device 100 may provide a recommendation object and a recommendation image, which are obtained by applying at least one filter to at least one of the ROIs included in the candidate image 1630.

In addition, the electronic device 100 may provide a recommendation object and a recommendation image applied with a specific filter designated depending on an image property (e.g., a color type, a color brightness, a size of the ROI, the number of the ROIs, etc.) of the candidate image 1630. For example, in the case that the brightness of the candidate image 1630 is relatively dark, the electronic device 100 may provide at least one recommendation object and recommendation image applied with a relatively bright filter. In addition, in the case that the size of the ROIs of the candidate image 1630 is equal to or smaller than a predetermined size, the electronic device 100 may provide at least one recommendation object and recommendation image applied with the sharpness filter. Furthermore, in the case that the number of the ROIs of the candidate image 1630 is equal to or smaller than a predetermined number, the electronic device 100 may provide the recommendation object and the recommendation image applied with a charcoal filter (e.g., a filter giving a smudge effect of charcoal to an image) or a cartoon filter (e.g., a filter simplifying the lines or changing a color to a predetermined specific color to give a cartoon effect to an image).

Figure 17:
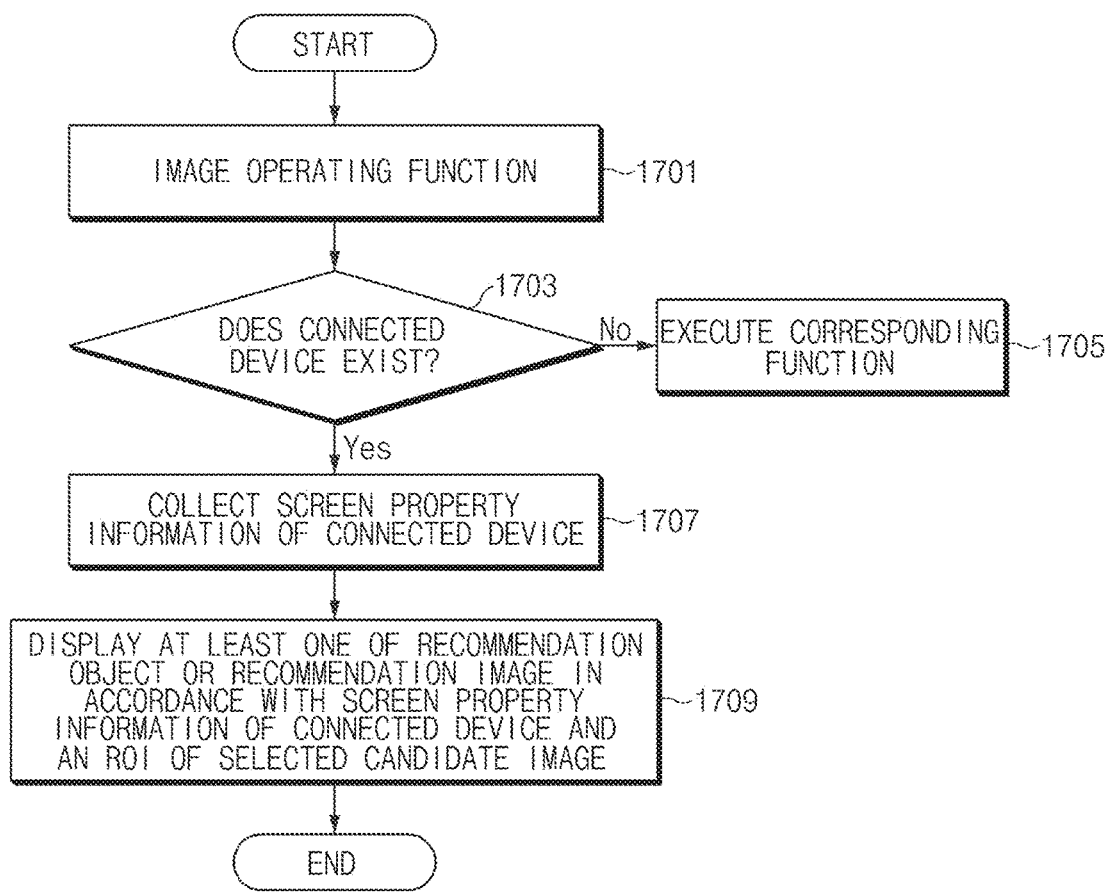
FIG. 17 is a flowchart showing an image operating method in accordance with a connection device according to various embodiments of the present disclosure.

FIG. 17 is a flowchart showing an image operating method in accordance with a connection device according to various embodiments of the present disclosure.

Referring to FIG. 17, in the image operating method according to various embodiments, when a specific input event occurs, the electronic device 100 may recognize the input event as a request to execute the image operating function in operation 1701. For example, when an input signal corresponding to the selection of icon associated with the execution of the image operating function or an input signal corresponding to the selection of menu associated with the execution of the image operating function occurs, the electronic device 100 may enter into a state in which the image operating function is executed. The execution state of the image operating function may include, for example, a state in which at least one candidate image is displayed through the display 160. Alternatively, the execution state of the image operating function may include, for example, a state in which at least one function (e.g., a camera function or an external device connection function) associated with the collection of the candidate image is executed.

According to an embodiment, the electronic device 100 may verify whether a connected device exists in operation 1703. In this regard, the electronic device 100 may verify whether the presently-connected device exists on the basis of at least one communication channel, such as a short-range communication channel, a mobile communication channel, etc. In the case that the connected device does not exist, the electronic device 100 may execute a specific function in operation 1705. For example, the electronic device 100 may select a candidate image associated with the image operating function and provide one or more recommendation objects or a recommendation image generated based on partial areas of the candidate image. According to various embodiments, the electronic device 100 may provide an external device connection menu during the execution of the image operating function. When the external device connection menu is selected, the electronic device 100 may attempt to connect the external device by searching the external device using a designated scan method (e.g., a scan that forms the short-range communication channel). When the external device is connected in this operation, an operation after an operation 1707.

In the case that the connected device exists, the electronic device 100 may collect information on a screen property of the connected device in the operation 1707. In this regard, when the image operating function is executed, the electronic device 100 may request the screen property information (e.g., information on size, resolution, and shape of a display of the connected device, a display object arranged in the screen) to the connected device. Alternatively, the electronic device 100 may obtain the screen property information by requesting the screen property information during the forming operation of the communication channel with the external device. In this case, the electronic device 100 may store and manage the screen property information into the memory.

In operation 1709, the electronic device 100 may display at least one of the recommendation object or the recommendation image in accordance with the screen property information of the connected device and an ROI of the selected candidate image. In this regard, the electronic device 100 may provide a screen that allows the candidate image to be selectable. When the candidate image is selected, the electronic device 100 may analyze feature objects included in the candidate image to detect the ROI. Here, the ROI may include, for example, a designated person, animal, or thing. Alternatively, the ROI may include a designated portion (e.g., a face or an upper half body) of the feature object. When the ROI is obtained, the electronic device 100 may provide at least one recommendation object and recommendation image associated with the ROIs on the basis of the screen property information of the connected device.

Figure 18:
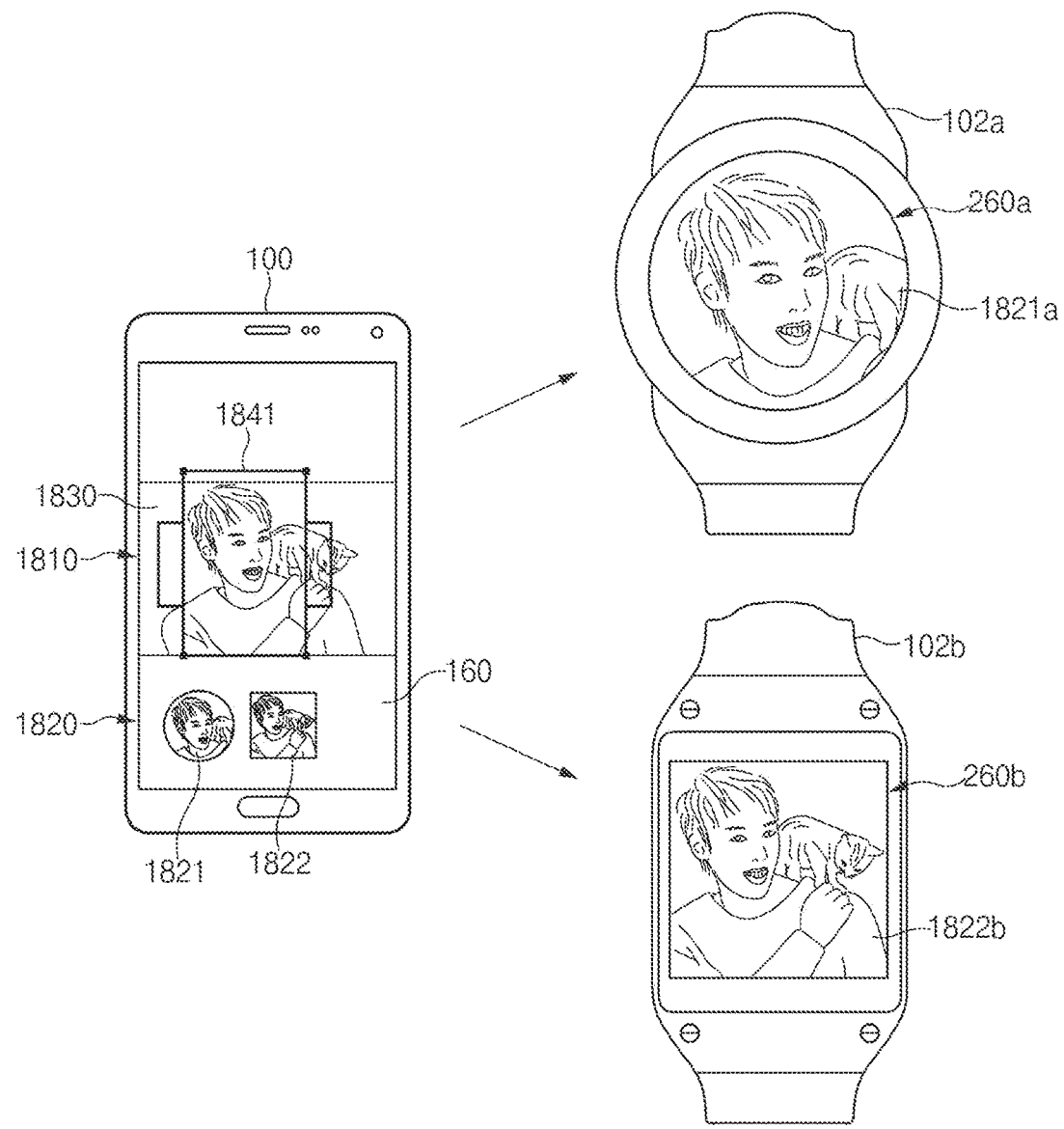
FIG. 18 is a view showing a process of providing a recommendation image on the basis of the connection device according to various embodiments of the present disclosure.

FIG. 18 is a view showing a process of providing a recommendation image on the basis of the connection device according to various embodiments of the present disclosure.

Referring to FIG. 18, the electronic device 100 may output a selected candidate image 1830 through a first area 1810 with regard to the execution of the image operating function. When the image operating function is requested to be executed, the electronic device 100 may automatically verify whether the connected external device exists or may verify whether the connected external device exists in response to the user input. When the connected external device (e.g., an external electronic device 102a or an external electronic device 102b) exists, the electronic device 100 may collect the screen property information from the external electronic device 102a. For example, the electronic device 100 may collect first screen property information from the external electronic device 102a and may collect second screen property information from the external electronic device 102b. In this operation, the electronic device 100 may automatically collect the screen property information when the external devices are connected to the electronic device 100.

When the screen property information are collected, the electronic device 100 may output one or more recommendation objects 1821 and 1822 to the second area 1820 on the basis of the selected candidate image 1830 and the screen property information. For example, the electronic device 100 may output a first recommendation object 1821 related to the external electronic device 102a and a second recommendation object 1822 related to the external electronic device 102b. In this operation, the electronic device 100 may provide the recommendation objects 1821 and 1822 to correspond to the screen display shape (e.g., a circular, square, or rectangular shape) of the external devices. According to an embodiment, the electronic device 100 may determine the size or number of the ROIs to be different with respect to the screen size. In addition, the electronic device 100 may determine the size or number (or composition) of the ROIs to be different with respect to the screen display shape. Referring to FIG. 18, for the external electronic device 102a including the circular display 260a, the electronic device 100 may provide a first recommendation object 1821 corresponding to a first recommendation image 1821a in which one ROI is included. For the external display device 102b including a rectangular display 260b, the electronic device 100 may provide a second recommendation object 1822 corresponding to a second recommendation image 1822b in which two ROIs are included. In addition, the electronic device 100 may output guide information 1841. The guide information 1841 may include, for example, information indicating a partial area of the candidate image 1830 corresponding to the one or more recommendation objects 1821 and 1822.

When the first recommendation object 1821 is selected, the electronic device 100 may transmit a first recommendation image corresponding to the first recommendation object 1821 to the external electronic device 102a. The external electronic device 102a may output the first recommendation image 1821a provided from the electronic device 100 to the circular display 260a. When the second recommendation object 1822 is selected, the electronic device 100 may transmit a second recommendation image corresponding to the second recommendation object 1822 to the external electronic device 102b. The external electronic device 102b may output the second recommendation image 1822b provided from the electronic device 100 to the rectangular display 260b. The first recommendation image 1821a or the second recommendation image 1822b may include a background image of the external electronic device 102a or 102b or a basic screen for the specific application execution.

In the above-mentioned description, the screen property information may be collected from two external devices, but the electronic device 100 may collect the screen property information of a corresponding device from one external device. For example, the electronic device 100 may transmit a screen property information request message when one or more external devices are connected. The user who uses the external device may provide the user input corresponding to the request from the electronic device 100 to allow the screen property information to be transmitted to the electronic device 100.

Figure 19:
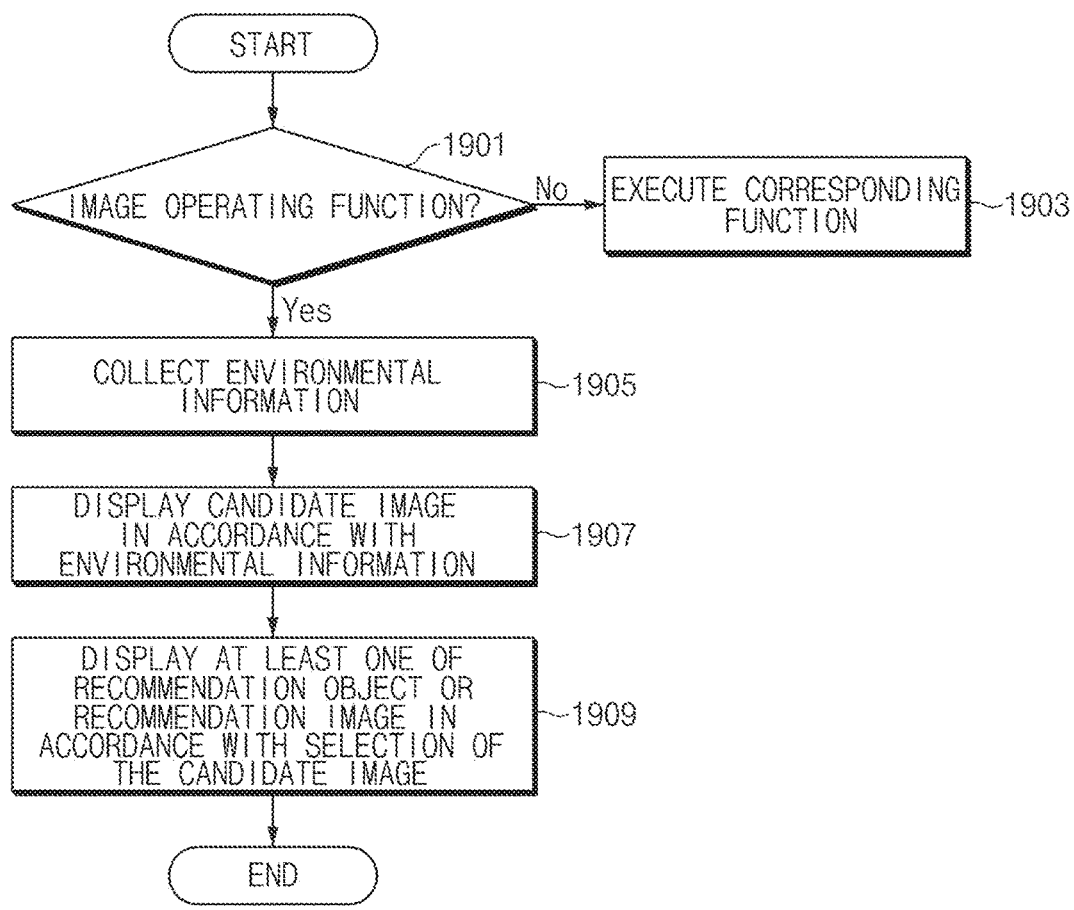
FIG. 19 is a flowchart showing an image operating method in accordance with environmental information according to various embodiments of the present disclosure.

FIG. 19 is a flowchart showing an image operating method in accordance with environmental information according to various embodiments of the present disclosure.

Referring to FIG. 19, in the image operating method according to various embodiments, the electronic device 100 may verify whether an input event associated with an image operating function occurs in operation 1901. For example, the electronic device 100 may verify whether a selection of icons or menu items associated with the execution of the image operating function occurs. When the input event associated with the execution of the image operating function does not occur, the electronic device 100 may execute a function corresponding to a type of the input event in operation 1903. For example, the electronic device 100 may play a file in response to the type of the input event, activate a camera function, or process a connection of the external device.

When the input event associated with the execution of the image operating function occurs, the electronic device 100 may collect environmental information in operation 1905. The electronic device 100 may collect sensor information (e.g., position information, moving state information, temperature information, etc.) generated by at least one sensor included in the electronic device 100, time information (e.g., current time information, weather information, et.), and server information (e.g., weather information, news information, emergency disaster information, etc.) provided from the server 106.

When the environmental information are collected, the electronic device 100 may display a candidate image based on at least one environmental information in operation 1907. According to an embodiment, when the position information are collected, the electronic device 100 may display at least one candidate image associated with the collected position. In this regard, the candidate image stored in the electronic device 100 may include the position information. According to an embodiment, when the weather information or the time information are collected, the electronic device 100 may output at least one candidate image corresponding to a designated weather or a specific time among the candidate images. In this regard, the candidate image stored in the electronic device 100 may include time or weather information. According to the method of providing the candidate image in accordance with the environmental information, the electronic device 100 may provide at least one environmental information list that may be collected and may classify and provide the candidate image on the basis of the environmental information selected by the user input.

In operation 1909, the electronic device 100 may display at least one of a recommendation object and a recommendation image in accordance with the selection of the candidate image. For example, the electronic device 100 may extract at least one object included in the candidate image and provide at least one recommendation object or the recommendation image corresponding to the extracted object. According to an embodiment, the electronic device 100 may detect the specific object in response to the type of the environmental information when the object included in the candidate image is extracted. For example, when the candidate image is provided on the basis of the environmental information associated with the time, the electronic device 100 may extract a time-related object (e.g., sun, moon, star, watch, or the like) included in the candidate image as the ROI.

Figure 20:
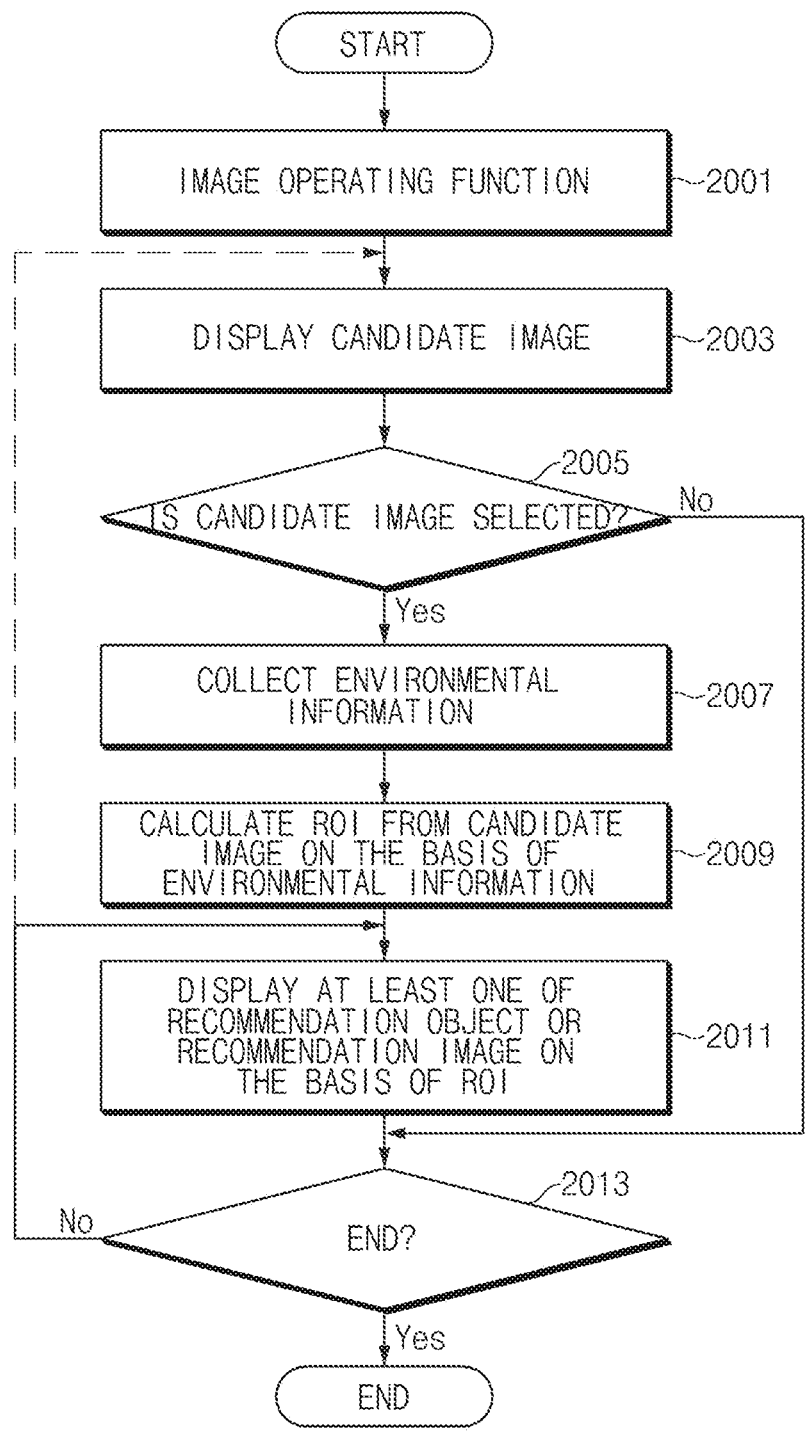
FIG. 20 is a flowchart showing an image operating method on the basis of environmental information and ROI according to various embodiments of the present disclosure.

FIG. 20 is a flowchart showing an image operating method on the basis of environmental information and ROI according to various embodiments of the present disclosure.

Referring to FIG. 20, in regard to the image operating method according to various embodiments, the electronic device 100 may execute the image operating function in response to an occurrence of input event or a user input in operation 2001. Responsive to the execution of the image operating function, the electronic device 100 may display a candidate image in operation 2003. For example, the electronic device 100 may display at least one candidate image stored in the memory 130 through the display 160. In this regard, the electronic device 100 may display an image most recently stored in memory 130 as an uppermost layer of the candidate image and display other images as a lower layer of the candidate image, thereby searching the image. Alternatively, the electronic device 100 may display an image most recently taken by a camera as the uppermost layer of the candidate image. As another way, the electronic device 100 may display a candidate image provided from an external device having a most recent connection history as the uppermost layer of the candidate image.

In operation 2005, the electronic device 100 may verify whether an input event associated with the selection of the candidate image occurs. When the input event associated with the selection of the candidate image does not occur, the electronic device 100 may proceed to operation 2013 without performing next operations. When the input event associated with the selection of the candidate image occurs, the electronic device 100 may collect the environmental information in operation 2007. The environmental information may include, for example, sensor information collected by a sensor included in the electronic device 100, information provided from an external device connected with a communication channel, user input information, or system information such as alarm or schedule.

In operation 2009, the ROI may be calculated from the candidate image on the basis of the environmental information. For example, in the case that the environmental information are specific position information, the electronic device 100 may calculate a specific thing (e.g., building, car, ship, airplane, etc.) object or a text object from the candidate image as the ROI. Alternatively, the electronic device 100 may calculate a person object as a basic ROI and calculate the thing or text object as an additional ROI. As another way, the electronic device 100 may calculate a specific background object other than the person object as the ROI.

In operation 2011, the electronic device 100 may display at least one of the recommendation object or the recommendation image, which is based on the ROI. In this operation, the electronic device 100 may provide at least one recommendation object configured to include at least a portion of the ROI and the recommendation image corresponding to the recommendation object.

In operation 2013, the electronic device 2013 may verify whether an event associated with an end of the image operating function occurs. When the event associated with the end of the image operating function dies not occur, the electronic device 100 may proceed to the operation 2011 to maintain the state in which the recommendation object or the recommendation image is provided, or may proceed to the operation 2003 to search or select a new candidate image.

Figure 21:
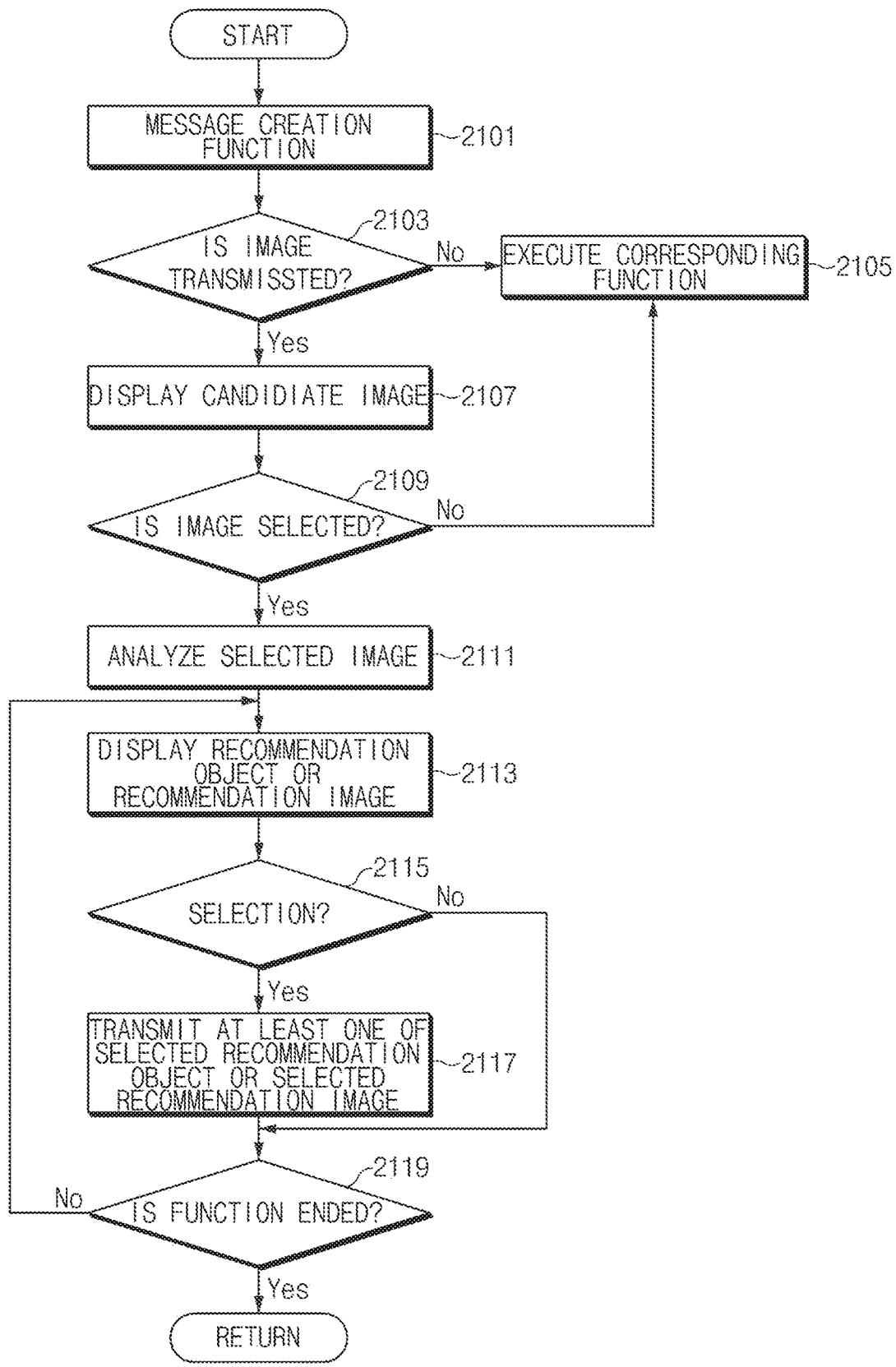
FIG. 21 is a flowchart showing an image operating method associated with a message function according to various embodiments of the present disclosure.

FIG. 21 is a flowchart showing an image operating method associated with a message function according to various embodiments of the present disclosure.

Referring to FIG. 21, in regard to the message-based image operating method, the electronic device 100 may activate the message creation function in accordance with a user input or a set schedule in operation 2101. In this regard, the electronic device 100 may display a message creation window through the display 160. Alternatively, the electronic device 100 may display a function screen including a message creation area through the display 160.

In operation 2103, the electronic device 100 may verify whether an input event associated with an execution of the image transmission function occurs. When the input event associated with the execution of the image transmission function does not occur, the electronic device 100 may support a function corresponding to the input event, e.g., a message text input function, a message transmission function, a message editing function, etc., in operation 2105.

When the input event associated with the execution of the image transmission function occurs, the electronic device 100 may display a candidate image in operation 2107. In this operation, the electronic device 100 may display an area allowing at least one candidate image to be selected in at least a specific area of the message creation screen. Alternatively, the electronic device 100 may output the candidate image selection area to overlay with an upper layer of the message creation screen. As another way, the electronic device 100 may output a popup window associated with the candidate image selection.

In operation 2109, the electronic device 100 may verify whether an input event associated with the image selection occurs. When the image selection input event does not occur within a predetermined time, the electronic device 100 may proceed to an operation 2105 to process a function (e.g., return to the message creation function due to cancellation of the image transmission function) in accordance with the type of the input event.

When the image selection input event occurs, the electronic device 100 may perform an analysis on the selected image in operation 2111. For example, the electronic device 100 may detect at least one feature object included in the selected candidate image. Alternatively, the electronic device 100 may verify whether the specific ROI is included in the feature objects included in the candidate image.

In operation 2113, the electronic device 100 may display at least one of the recommendation object or the recommendation image. In this operation, the electronic device 100 may provide the recommendation object or the recommendation image using at least a portion of the feature object. Alternatively, the electronic device 100 may provide the recommendation object or the recommendation image using at least a portion of the ROI.

In operation 2115, the electronic device 100 may verify whether an input event associated with the selection of the recommendation object or the recommendation image occurs. When the selection event of the recommendation object or the recommendation image does not occur, the electronic device 100 may skip an operation 2117. When the selection event of the recommendation object or the recommendation image occurs, the electronic device 100 may transmit at least one of the selected recommendation object or recommendation image in operation 2117. In this regard, the electronic device 100 may allow the recommendation image to be included in the message, which is being created, generate a message including the image, and transmit the message including the recommendation image to a specific electronic device (e.g., an external device set to receive the message) in response to a transmission input request. According to various embodiment, in the case that a message creation function is being executed on the basis of an SNS, the electronic device 100 may transmit the image to the external device or a message server in real time when the recommendation image is selected.

In operation 2119, the electronic device 100 may verify whether an event associated with the end of the image transmission function or the message creation function occurs. When the event associated with the end of the image transmission function does not occur, the electronic device 100 may proceed to the operation 2113 to maintain the recommendation image display function. Alternatively, the electronic device 100 may proceed to the operation 2107 to support the candidate image searching function. When the event associated with the end of the image transmission function or the message creation function occurs, the electronic device 100 may end the image transmission function or the message creation function. When the image transmission function is ended, the electronic device 100 may return to the state in which the message creation function is activated (e.g., operation 2101).

Figure 22:
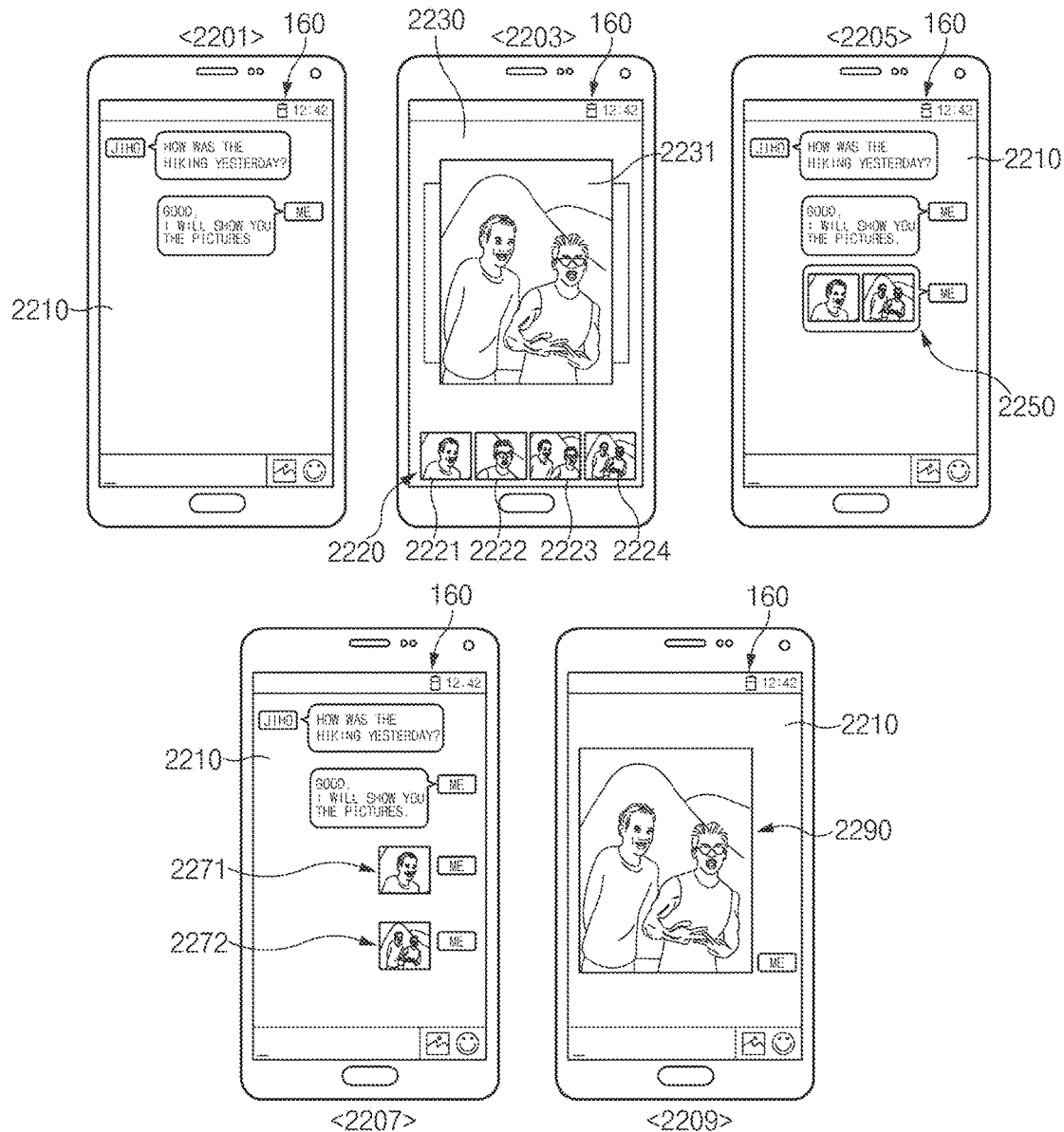
FIG. 22 is a view showing an example of a screen interface supporting an image operating function associated with a message function according to various embodiments of the present disclosure.

FIG. 22 is a view showing an example of a screen interface supporting an image operating function associated with a message function according to various embodiments of the present disclosure.

Referring to FIG. 22, the electronic device 100 may display a message function screen 2210 through the display 160 as shown in a state 2201 in response to the user input or the execution request of the message function. The message function screen 2210 may include, for example, a screen displaying a received message. According to an embodiment, the message function screen 2210 may include an icon or a menu item, which is in association with the message creation area and the image transmission function.

When the icon associated with the image transmission is selected, the electronic device 100 may output a candidate image selection screen 2230 as shown in a state 2203. The candidate image selection screen 2230 may be a screen configured to include a recommendation area 2220 in which at least one candidate image 2231 and recommendation objects 2221, 2222, 2223, and 2224 corresponding to the specific candidate image are arranged. According to various embodiments, the electronic device 100 may display the candidate image selection screen 2230 on the message function screen 2210. When the candidate image, which is to be provided, does not exist, the electronic device 100 may activate a camera. Accordingly, the area in which the candidate image 2231 is displayed may be, for example, an area in which a preview image is displayed. When the candidate image 2231 is selected (or when the candidate image 2231 is designated), the electronic device 100 may provide the recommendation objects 2221, 2222, 2223, and 2224 on the basis of at least one object included in the candidate image 2231. The recommendation objects may be displayed in a recommendation area 2220. The recommendation area 2220 may be disposed at a lower end area (or an upper end area) of the screen.

When an event selecting at least one recommendation object among the recommendation objects 2221, 2222, 2223, and 2224 occurs, the electronic device 100 may transmit a recommendation image corresponding to the selected recommendation object to an external device connected thereto. According to an embodiment, the electronic device 100 may receive an input event associated with the recommendation image transmission after the event selecting first and fourth recommendation objects 2221 and 2224 occurs. In this case, the electronic device 100 may display transmission state information 2250 corresponding to the transmission of the selected first and fourth recommendation objects 2221 and 2224 as shown in a state 2205. A receiving side external device may output a screen to which the first and second recommendation objects 2221 and 2224 are received.

According to various embodiments, the electronic device 100 may output first transmission state information 2271 associated with the transmission of the first recommendation object 2221 in accordance with the occurrence of the selection event for the first recommendation object 2221 as shown in a state 2207. In addition, when an event for selecting the fourth recommendation object 2224 occurs after the first recommendation object 2221 is transmitted, fourth transmission state information 2272 associated with the transmission of the fourth recommendation object 2224 may be output. According to various embodiments, the electronic device 100 may output the first transmission state information 2271 when an event associated with the transmission occurs after the first recommendation object 2221 is selected. The electronic device 100 may have a state in which a first recommendation image corresponding the first recommendation object 2221 and a fourth recommendation image corresponding to the fourth recommendation object 2224 are transmitted to the external device. When the first and fourth recommendation images are received from the electronic device 100, the external device may store the first and fourth recommendation images. Furthermore, the external device may output first and fourth recommendation objects 2221 and 2224 respectively corresponding to the received first and fourth recommendation images to the display 160 of the external device.

According to various embodiments, when a specific feature object is selected, the external device (or the electronic device 100) may output the recommendation image corresponding to the selected recommendation object to the display as shown in a state 2209. According to an embodiment, when an event for selecting the fourth transmission state information 2272 is received, the external device (or the electronic device 100) may output the fourth recommendation image 2290 corresponding to the fourth transmission state information 2272 as an image having a predetermined certain size. Alternatively, responsive to the selection of the fourth transmission state information 2272, the external device (or the electronic device 100) may output a message function screen to which the fourth recommendation image 2290 is applied as a background image. As another way, the external device (or the electronic device 100) may provide a message function screen (or a designated screen such as a home screen, a lock screen, or an execution screen of specific application), to which the fourth recommendation image 2290 is applied as a background image, in a preview state and may output the applied screen in response to a determined input.

As described above, according to various embodiments, the electronic device according to an embodiment may include a memory, a processor, and an instruction stored in the memory. The instruction executed by the processor may set to display at least one candidate image and the recommendation object corresponding to at least one candidate image while the message function is executed in response to the input event and to transmit the recommendation image corresponding to the recommendation object selected by the input event corresponding to the recommendation object selection.

Figure 23:
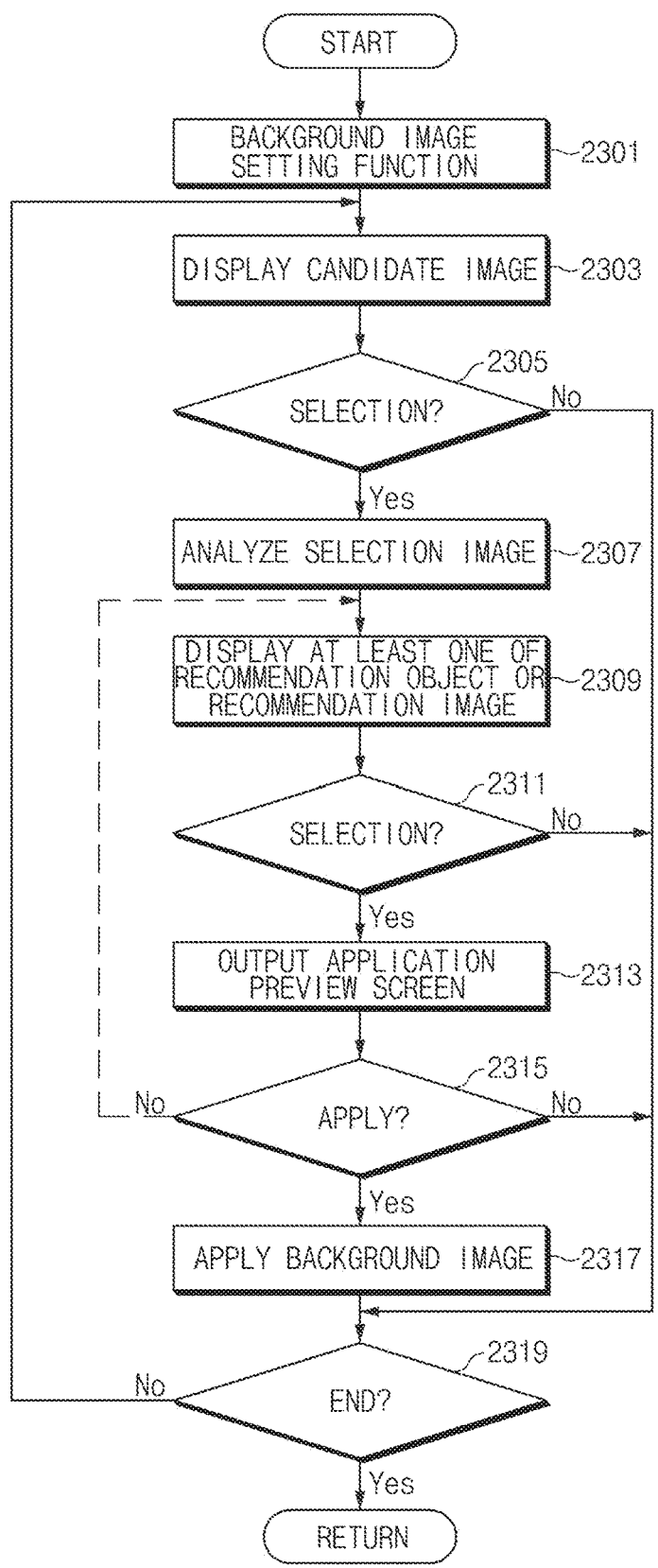
FIG. 23 is a flowchart showing an image operating method associated with a background image according to various embodiments of the present disclosure.

FIG. 23 is a flowchart showing an image operating method associated with a background image according to various embodiments of the present disclosure.

Referring to FIG. 23, in regard to the image operating method associated with the background image, the electronic device 100 may execute a background image setting function in operation 2301. In this regard, the electronic device 100 may provide at least one icon or menu associated with the background image setting process through a home screen. When an input event associated with the background image setting process occurs, the electronic device 100 may display a candidate image in operation 2303. The electronic device 100 may display the candidate image as a predetermined display ratio during the display of the candidate image.

In operation 2305, the electronic device 100 may verify whether an input event associated with the selection of the candidate image occurs. In the case that the input event associated with the selection of the candidate image does not occur, the electronic device 100 may proceed to an operation 2319 after skipping operations 2307 to 2317. When the input event associated with the selection of the candidate image occurs, the electronic device 100 may analyze the selected image in operation 2307. For example, the electronic device 100 may analyze at least one feature object included in the selected candidate image. Alternatively, the electronic device 100 may extract a designated ROI from the candidate image. According to various embodiments, the electronic device 100 may collect at least one of a screen property information of the display 160, a screen property information of a display of an external device in that case that the external device is connected to the electronic device 100, an environmental information (e.g., sensor information, time information, etc.) and may set the feature object or the ROI, which are extracted from the candidate image, to be different on the basis of the collected information.

When the feature object or the ROI is extracted, the electronic device 100 may display at least one of a recommendation object or a recommendation image in operation 2309. For example, the electronic device 100 may generate the recommendation object using at least a portion of the extracted object. The electronic device 100 may display the recommendation image corresponding to a specific recommendation object or a recommendation object selected by the user input among the recommendation objects. Here, the recommendation object may be an image having a thumbnail form, and the recommendation image may include an image having a predetermined size.

In operation 2311, the electronic device 100 may verify whether an input event associated with a preliminary application of the recommendation image occurs. When the input event associated with a preliminary application of the recommendation image does not occur, the electronic device 100 may proceed to the operation 2319 after skipping the operations 2313 to 2317. When the input event associated with the preliminary application of the recommendation image occurs, the electronic device 100 may output a preview screen to which the recommendation image is applied in operation 2313. As described above, the preview screen to which the recommendation image is applied may include a screen in which the display objects of the screen to which the recommendation image is applied are arranged or a screen in which a specific object corresponding to the display objects is arranged.

In operation 2315, the electronic device 100 may verify whether an input event applying the preview screen to which the recommendation image is applied occurs. When the input event related to the application of the preview screen does not occur, the electronic device 100 may proceed to the operation 2319 after skipping the operation 2317 or proceed to the operation 2309. Alternatively, the electronic device 100 may proceed to the operation 2303. When the input event related to the application of the preview screen occurs, the electronic device 100 may apply the background image in operation 2317. In operation 2319, the electronic device 100 may verify whether an input event related to the end of the background image setting function occurs. When the input event related to the end of the background image setting function does not occur, the electronic device 100 may proceed to the operation 2303 and may re-execute the operations following the operation 2303 or may maintain the previously executed operation (e.g., operation 2309, operation 2323).

According to various embodiments, the background image setting method according to an embodiment may include displaying at least one candidate image through at least a portion of a display, displaying at least one recommendation object corresponding to specific areas of the candidate image selected from the at least one candidate image and having a size smaller than a size of the candidate image through an area distinguished from the candidate image, and setting a recommendation image corresponding to the recommendation object as a background image in response to a user input selecting the recommendation object.

Figure 24:
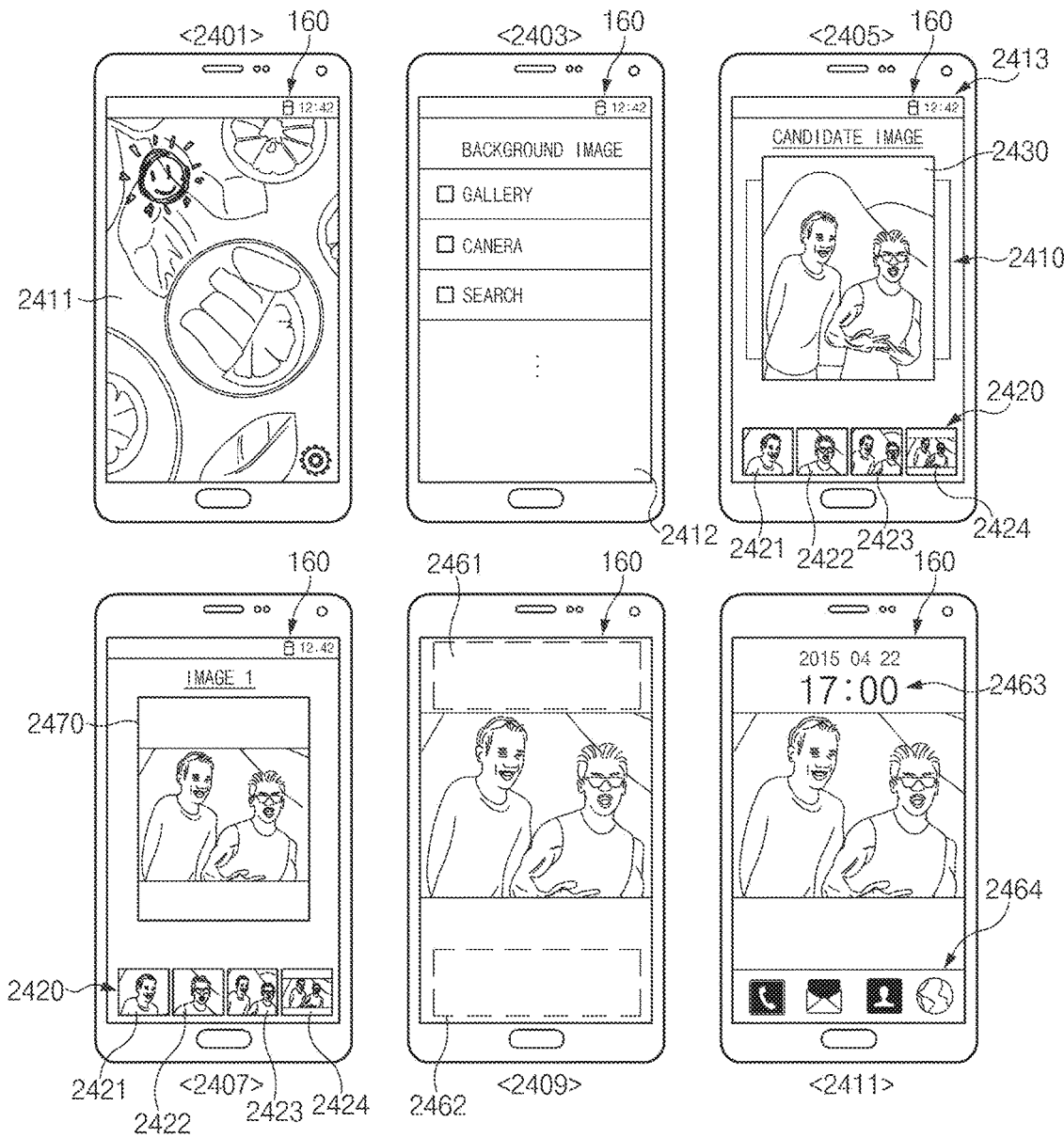
FIG. 24 is a view showing an example of a screen interface supporting an image operating function associated with a background image according to various embodiments of the present disclosure.

FIG. 24 is a view showing an example of a screen interface supporting an image operating function associated with a background image according to various embodiments of the present disclosure.

Referring to FIG. 24, the electronic device 100 may output a background screen 2411 configured to include the background image (e.g., a background image of a lock screen, a background image of a home screen, or a background image of an application execution screen, etc.) to the display 160 as shown in a state 2401. At least one icon or menu related to the setting of the background image may be included in the background screen 2411. Alternatively, the electronic device 100 may provide a separate menu button (e.g., a physical button or a touch button) and may output a background image setting screen 2412 in response to the selection of the corresponding button as shown in a state 2403. The background image setting screen 2412 may include, for example, items that is selectable in association with the candidate image selection.

According to an embodiment, the background image setting screen 2412 may include a gallery item, a camera item, a search item, and the like. When the gallery item is selected, the electronic device 100 may display at least one picture included in the gallery as a candidate image 2430. Alternatively, when the camera item is selected, the electronic device 100 may provide a picture taking screen and may display the picture as the candidate image 2430. When the search item is selected, the electronic device 100 may search an image corresponding to an input instruction input thereto from an external device (e.g., a server or an external electronic device), and when a specific image is selected from the searched result, the selected image may be displayed as the candidate image 2430.

When the candidate image 2430 is selected (or designated), the electronic device 100 may provide a recommendation object selection screen 2413 as shown in a state 2405. The recommendation object selection screen 2413 may include, for example, a candidate image display area 2410 and a recommendation object display area 2420. In the state in which the recommendation object display area 2420 is displayed, the electronic device 100 may provide a function to select another candidate image. For example, when a designated event occurs on the candidate image display area 2410, the electronic device 100 may display another candidate image. In the case that the candidate image 2430 is displayed by selecting the gallery item, the electronic device 100 may display another image included in the gallery as the candidate image 2430. Alternatively, when an input event requesting to display another candidate image in the state in which the candidate image 2430 is displayed by selecting the camera item, the electronic device 100 may activate the camera function again and output the preview screen. When an input event requesting to display another candidate image in the state in which the candidate image 2430 is displayed by selecting the search item, the electronic device 100 may display a previously searched result or display a search screen.

The recommendation objects 2421, 2422, 2423, and 2424 may be generated based on at least a portion of at least one object of the candidate image 2430 arranged in the candidate image display area 2410. FIG. 24 shows a state in which the recommendation objects are generated based on two person objects included in the candidate image 2430. The electronic device 100 may provide a first recommendation object 2421, a second recommendation object 2422, and a third recommendation object 2423, each of which is configured to include at least a portion of the two person objects, and a fourth recommendation object 2424 configured to include a blank space area.

According to an embodiment, when the fourth recommendation object 2424 is selected, the electronic device 100 may output a fourth recommendation image 2470 corresponding to the selected fourth recommendation object 2424 through a specific area of the display 160 as shown in a state 2407. In this state 2407, the electronic device 100 may maintain the display state of the recommendation objects 2421, 2422, 2423, and 2424. When an input event associated with the preliminary application of the fourth recommendation image 2470 occurs, the electronic device 100 may output the application preview screen including the fourth recommendation image 2470 as the background image to the display 160 as shown in a state 2409. The application preview screen may include guide objects 2461 and 2462 corresponding to the display objects arranged in a real background image. Referring to FIG. 24, a first guide object 2461 may include an object corresponding to the first display object 2463. A second guide object 2462 may include an object corresponding to the second display object 2464. When an input event associated with the application of the background image in the application preview screen occurs, the electronic device 100 may output an image application screen to which the fourth recommendation image 2470 is applied to the display 160 as shown in a state 2411. The screen corresponding to the state 2411 may be, for example, a lock screen or a home screen. The image application screen may include the background image corresponding to the fourth recommendation image 2470, the first display object 2463, and the second display object 2464.

According to various embodiments, the electronic device 100 may provide (e.g., skip the state 2403) the recommendation object selection screen 2413 of the state 2405 in the state 2401. For example, when an input event requesting to set the background image occurs, the electronic device 100 may collect at least one candidate image in association with the specific item (e.g., the gallery item) and display the candidate image 2430 through the candidate image display area 2410. The electronic device 100 may analyze the candidate image displayed in the candidate image display area 2410 by default (or automatically) and output the generated recommendation objects to the recommendation object display area 2420 on the basis of the analyzed result. Furthermore, according to various embodiments, the electronic device 100 may output the image application screen as shown in a state 2411 in accordance with the occurrence of the application input event in the recommendation image display state in the state 2407.

Figure 25:
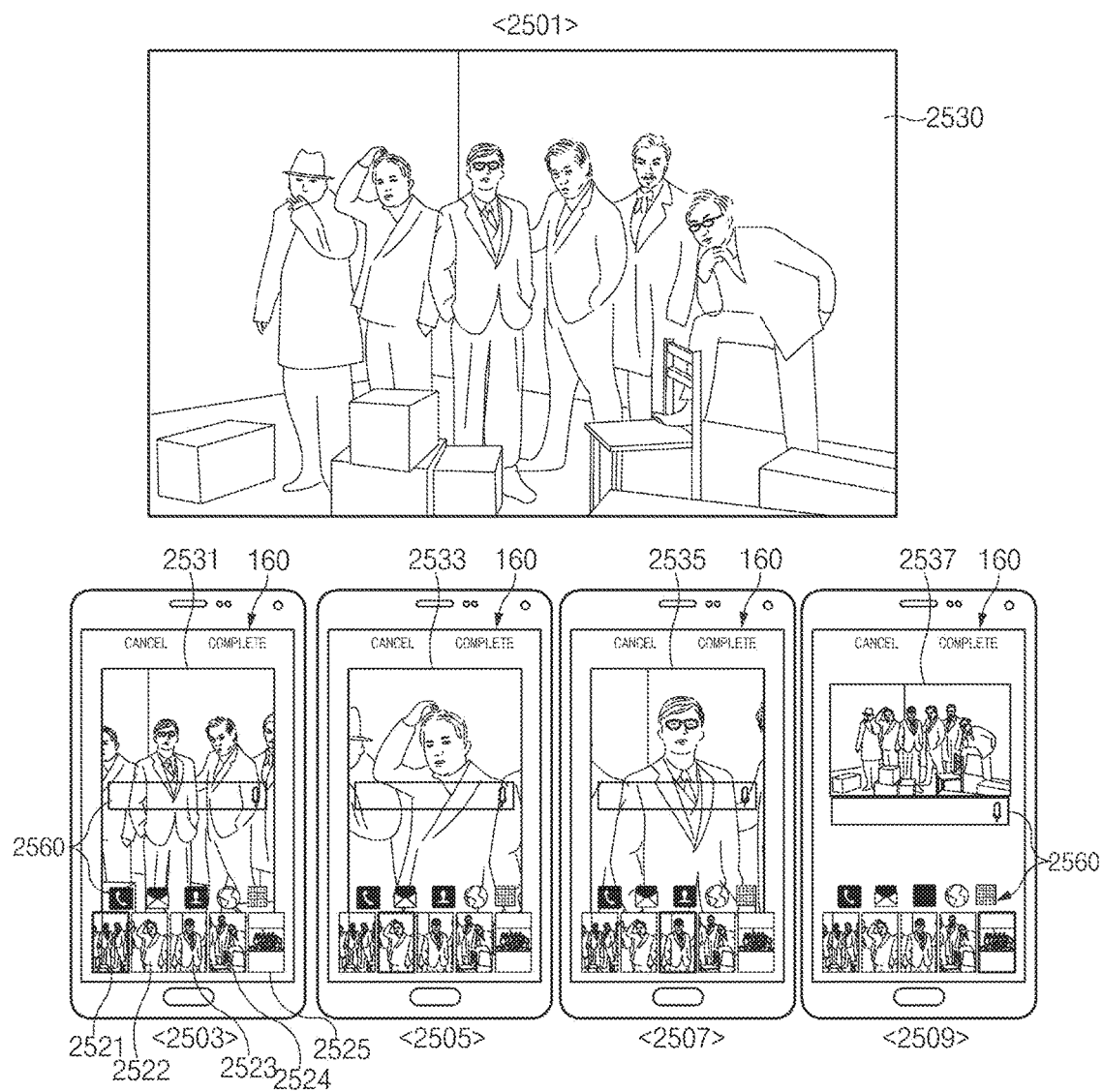
FIG. 25 is a view showing another example of a screen interface supporting an image operating function associated with a background image according to various embodiments of the present disclosure.

FIG. 25 is a view showing another example of a screen interface supporting an image operating function associated with a background image according to various embodiments of the present disclosure.

Referring to FIG. 25, responsive to the execution of the image operating function, the electronic device 100 may output a candidate image 2530 to the display as shown in a state 2501. The candidate image 2530 may include, for example, an image provided from a server or an external device. When the candidate image 2530 is selected, the electronic device 100 may analyze the candidate image 2530. In this operation, the electronic device 100 may determine a specific person object to an ROI in accordance with user context information (e.g., SNS registered information or user search history information). The electronic device 100 may display recommendation objects 2521, 2522, 2523, 2524, and 2525, each including at least a portion of the ROI, to the display 160 as shown in a state 2503. In this operation, the electronic device 100 may display a first preview screen 2531, to which a recommendation image corresponding to a first recommendation object 2521 selected from the recommendation objects 2521, 2522, 2523, 2524, and 2525 by default (or automatically) is applied, through the display 160. The first preview screen 2531 may include, for example, display objects 2560. Alternatively, the electronic device 100 may display a second preview screen 2533, to which a recommendation image corresponding to the second recommendation object 2522 selected by the user input is applied, through the display 160 as shown in a state 2505. As another way, the electronic device 100 may display a third preview screen 2535, to which a recommendation image corresponding to the third recommendation object 2523 selected by the user input is applied, through the display 160 as shown in a state 2507.

Alternatively, the electronic device 100 may display a fourth preview screen 2537, to which a recommendation image corresponding to the fifth recommendation object 2525 selected by the user input is applied, through the display 160 as shown in a state 2509. In the case of the fourth preview screen 2535, the electronic device 100 may apply the recommendation image corresponding to the fifth recommendation object 2525, but the electronic device 100 may dispose the recommendation image corresponding to the fifth recommendation object 2525 in an area (e.g., an upper area not overlapped with the display object disposed at a middle area) in which the display objects 2560 are not overlapped with each other.

In the above descriptions, the candidate image and the recommendation objects are simultaneously arranged in one screen, but they should not be limited thereto or thereby. For example, when the candidate image is selected, the electronic device 100 may display only the recommendation objects generated on the basis of the selected candidate image in one screen. Alternatively, the electronic device 100 may display the recommendation image corresponding to the recommendation object selected by default and the recommendation objects in one screen. In this case, the electronic device 100 may provide the recommendation image as the preview screen (a screen before being applied as the background image of the screen). As another way, according to various embodiments, the electronic device 100 may provide the screen in which at least one recommendation image is displayed without including a separate recommendation objects. When the input event occurs in the state in which the recommendation image is displayed, the electronic device 100 may display another recommendation image (e.g., an image having another composition and generated from one candidate image). The screen state in which the recommendation image is displayed may include a preview screen state.

According to various embodiments, the preview screens (e.g., the preview screens 2531, 2533, 2535, and 2537) may be displayed through at least a portion of the display 160. For example, at least one of the preview screens may have a size smaller than the whole size of the display 160 and may be displayed at the designated position. The preview screens may include an image obtained by reducing the image applied to the screen. In the case that the preview screen is applied, the preview screen may be displayed through the entire portion of the display 160 after being magnified.

Figure 26:
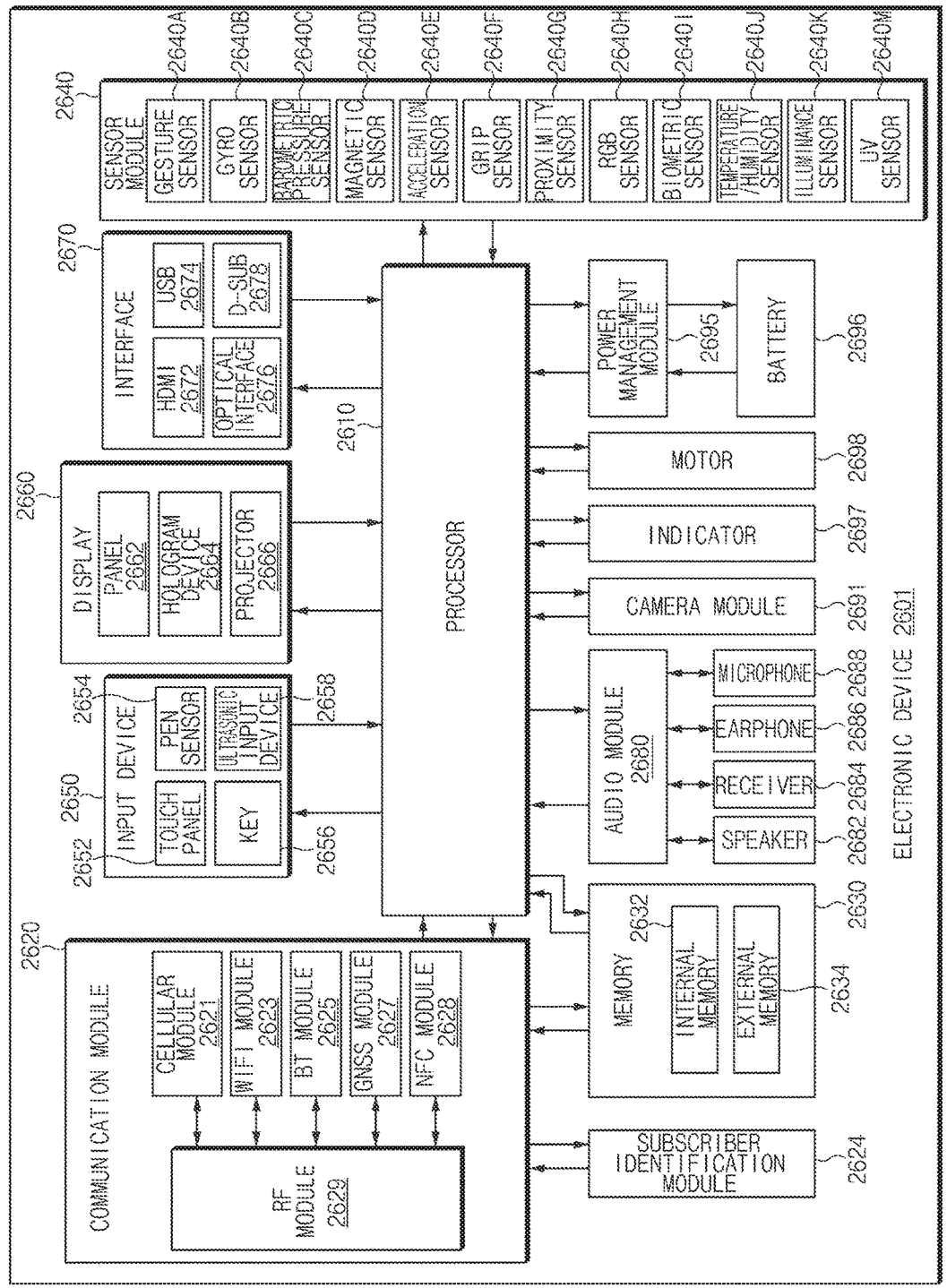
FIG. 26 is a block diagram showing an electronic device according to an embodiment of the present disclosure.

FIG. 26 is a block diagram showing an electronic device according to an embodiment of the present disclosure.

Referring to FIG. 26, an electronic device 2601 may include, for example, all or a part of an electronic device illustrated in the above-mentioned various embodiments. The electronic device 2601 may include one processor (e.g., an AP) 2610, a communication module 2620, a subscriber identification module 2624, a memory 2630, a sensor module 2640, an input device 2650, a display 2660, an interface 2670, an audio module 2680, a camera module 2691, a power management module 2695, a battery 2696, an indicator 2697, and a motor 2698.

The processor 2610 may drive an OS or an application program to control a plurality of hardware or software components connected to the processor 2610 and may process and compute a variety of data. The processor 2610 may be implemented with a system on chip (SoC), for example. According to an embodiment of the present disclosure, the processor 2610 may further include a graphic processing unit (GPU) and/or an image signal processor. The processor 2610 may include at least a part (e.g., a cellular module 2621) of components illustrated in FIG. 26. The processor 2610 may load and process an instruction or data, which is received from at least one of other components (e.g., a nonvolatile memory), and may store a variety of data at a nonvolatile memory.

The communication module 2620 may be configured the same as or similar to the communication interface 170 of FIG. 1. The communication module 2620 may include a cellular module 2621, a Wi-Fi module 2623, a Bluetooth (BT) module 2625, a GNSS module (e.g., a GPS module 2627, a Glonass module, a Beidou module, a Galileo module, etc.), a NFC module 2628, and a radio frequency (RF) module 2629. Additionally, the communication module 2620 may further include an MST module.

The cellular module 2621 may provide voice communication, video communication, a text service, an Internet service or the like through a communication network. According to an embodiment, the cellular module 2621 may perform discrimination and authentication of the electronic device 2601 within a communication network using a subscriber identification module 2624 (e.g., a subscriber identification module (SIM) card), for example. According to an embodiment, the cellular module 2621 may perform at least a portion of functions that the processor 2610 provides. According to an embodiment, the cellular module 2621 may include a CP.

Each of the Wi-Fi module 2623, the BT module 2625, the GNSS module 2627, and the NFC module 2628 may include a processor for processing data exchanged through a corresponding module, for example. According to an embodiment, at least a portion (e.g., two or more components) of the cellular module 2621, the Wi-Fi module 2623, the BT module 2625, the GNSS module 2627, and the NFC module 2628 may be included within one integrated circuit (IC) or an IC package.

The RF module 2629 may transmit and receive a communication signal (e.g., an RF signal). The RF module 2629 may include a transceiver, a power amplifier module (PAM), a frequency filter, a low noise amplifier (LNA), an antenna, or the like. According to another embodiment, at least one of the cellular module 2621, the Wi-Fi module 2623, the BT module 2625, the GNSS module 2627, or the NFC module 2628 may transmit and receive an RF signal through a separate RF module.

The subscriber identification module 2624 may include, for example, a card and/or embedded SIM including a subscriber identification module and may include unique identify information (e.g., integrated circuit card identifier (ICCID)) or subscriber information (e.g., integrated mobile subscriber identity (IMSI)).

The memory 2630 (e.g., a memory 260) may include an internal memory 2632 or an external memory 2634. For example, the internal memory 2632 may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM)), a mask ROM, a flash ROM, a flash memory (e.g., a NAND flash memory or a NOR flash memory), a hard drive, or a solid state drive (SSD).

The external memory 2634 may include a flash drive, for example, compact flash (CF), secure digital (SD), micro secure digital (Micro-SD), mini secure digital (Mini-SD), extreme digital (xD), multimedia card (MMC), a memory stick, or the like. The external memory 2634 may be functionally and/or physically connected to the electronic device 2601 through various interfaces.

The electronic device may further include a security module. The security module may be a module having a relatively higher security level than that of the memory 2630 and may include a circuit to guarantee secure data storage and protected execution environment. The security module may be realized as a separate circuit and may include a separate processor. The security module may include an embedded secure element (eSE) disposed inside an attachable/detachable smart chip or a SD card, or embedded in a fixed chip of the electronic device 2601. Furthermore, the security module may be driven by another operation system different from the OS of the electronic device 2601. For example, the security module may be driven on the basis of a java card open platform (JCOP).

The sensor module 2640 may measure, for example, a physical quantity or may detect an operation state of the electronic device 2601. The sensor module 2640 may convert the measured or detected information to an electric signal. The sensor module 2640 may include at least one of a gesture sensor 2640A, a gyro sensor 2640B, a pressure sensor 2640C, a magnetic sensor 2640D, an acceleration sensor 2640E, a grip sensor 2640F, a proximity sensor 2640G, a color sensor 2640H (e.g., red, green, blue (RGB) sensor), a biometric sensor 2640I, a temperature/humidity sensor 2640J, an illuminance sensor 2640K, or an UV sensor 2640M. Although not illustrated, additionally or alternatively, the sensor module 2640 may further include, for example, an E-nose sensor, an electromyography sensor (EMG) sensor, an electroencephalogram (EEG) sensor, an electrocardiogram (ECG) sensor, an infrared (IR) sensor, an iris sensor, and/or a fingerprint sensor. The sensor module 2640 may further include a control circuit for controlling at least one or more sensors included therein. According to an embodiment, the electronic device 2601 may further include a processor which is a part of the processor 2610 or independent of the processor 2610 and is configured to control the sensor module 2640. The processor may control the sensor module 2640 while the processor 2610 remains at a sleep state.

The input device 2650 may include, for example, a touch panel 2652, a (digital) pen sensor 2654, a key 2656, or an ultrasonic input unit 2658. The touch panel 2652 may use at least one of capacitive, resistive, infrared and ultrasonic detecting methods. Also, the touch panel 2652 may further include a control circuit. The touch panel 2652 may further include a tactile layer to provide a tactile reaction to a user.

The (digital) pen sensor 2654 may be, for example, a part of a touch panel or may include an additional sheet for recognition. The key 2656 may include, for example, a physical button, an optical key, a keypad, and the like. The ultrasonic input device 2658 may detect (or sense) an ultrasonic signal, which is generated from an input device, through a microphone (e.g., a microphone 2688) and may check data corresponding to the detected ultrasonic signal.

The display 2660 (e.g., a display 160) may include a panel 2662, a hologram device 2664, or a projector 2666. The panel 2662 may be, for example, flexible, transparent, or wearable. The panel 2662 and the touch panel 2652 may be integrated into a single module. The hologram device 2664 may display a stereoscopic image in a space using a light interference phenomenon. The projector 2666 may project light onto a screen so as to display an image. The screen may be arranged in the inside or the outside of the electronic device 2601. According to an embodiment, the display 2660 may further include a control circuit for controlling the panel 2662, the hologram device 2664, or the projector 2666.

The interface 2670 may include, for example, an HDMI 2672, a USB 2674, an optical interface 2676, or a D-sub-miniature (D-sub) 2678. The interface 2670 may be included, for example, in a communication interface 170 illustrated in FIG. 1. Additionally or alternatively, the interface 2670 may include, for example, a mobile high definition link (MHL) interface, a SD card/MMC interface, or an infrared data association (IrDA) standard interface.

The audio module 2680 may convert a sound and an electric signal in dual directions. At least a portion of the audio module 2680 may be included, for example, in an input/output interface 150 illustrated in FIG. 1. The audio module 2680 may process, for example, sound information that is input or output through a speaker 2682, a receiver 2684, an earphone 2686, or a microphone 2688.

The camera module 2691 for shooting a still image or a video may include, for example, at least one image sensor (e.g., a front sensor or a rear sensor), a lens, an image signal processor (ISP), or a flash (e.g., an LED or a xenon lamp).

The power management module 2695 may manage, for example, power of the electronic device 2601. According to an embodiment, a power management integrated circuit (PMIC), a charger IC, or a battery or fuel gauge may be included in the power management module 2695. The PMIC may have a wired charging method and/or a wireless charging method. The wireless charging method may include, for example, a magnetic resonance method, a magnetic induction method, or an electromagnetic method and may further include an additional circuit, for example, a coil loop, a resonant circuit, or a rectifier, and the like. The battery gauge may measure, for example, a remaining capacity of the battery 2696 and a voltage, current or temperature thereof while the battery is charged. The battery 2696 may include, for example, a rechargeable battery or a solar battery.

The indicator 2697 may display a specific state of the electronic device 2601 or a portion thereof (e.g., a processor 2610), such as a booting state, a message state, a charging state, and the like. The motor 2698 may convert an electrical signal into a mechanical vibration and may generate the following effects, vibration, haptic, and the like. Although not illustrated, a processing device (e.g., a GPU) for supporting a mobile television (TV) may be included in the electronic device 2601. The processing device for supporting a mobile TV may process media data according to the standards of DMB, digital video broadcasting (DVB), MediaFlo™, or the like.

Figure 27:
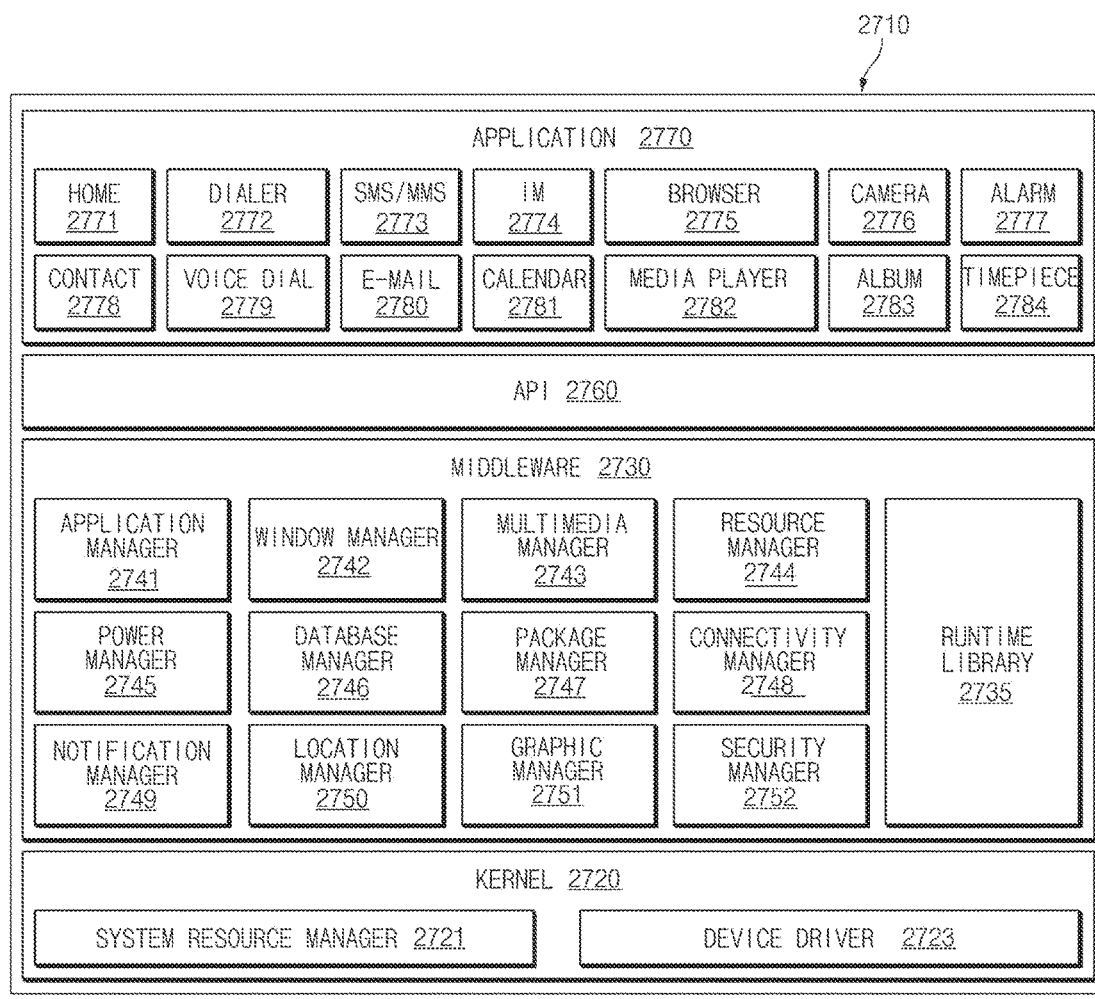
FIG. 27 is a view showing a program block according to an embodiment of the present disclosure.

FIG. 27 is a view showing a program block according to an embodiment of the present disclosure.

Referring to FIG. 27, according to various embodiments, a program module 2710 (e.g., a program 270) may include an OS to control resources associated with an electronic device (e.g., an electronic device 100) and/or diverse applications (e.g., an application program 277) driven on the OS. The OS may be, for example, android, iOS, windows, Symbian, Tizen, or Bada.

The program module 2710 may include a kernel 2720, a middleware 2730, an API 2760, and/or an application 2770. At least a part of the program module 2710 may be preloaded on an electronic device or may be downloadable from an external electronic device (e.g., electronic devices 102 and 104, a server 106).

The kernel 2720 (e.g., a kernel 271) may include, for example, a system resource manager 2721 and/or a device driver 2723. The system resource manager 2721 may perform control, allocation, or retrieval of system resources. According to an embodiment, the system resource manager 2731 may include a process managing part, a memory managing part, or a file system managing part. The device driver 2723 may include, for example, a display driver, a camera driver, a Bluetooth driver, a common memory driver, an USB driver, a keypad driver, a Wi-Fi driver, an audio driver, or an inter-process communication (IPC) driver.

The middleware 2730 may provide, for example, a function which the application 2770 needs in common, or may provide diverse functions to the application 2770 through the API 2760 to allow the application 2770 to efficiently use limited system resources of the electronic device. According to an embodiment, the middleware 2730 may include at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, or a security manager 2752.

The runtime library 2735 may include, for example, a library module which is used by a compiler to add a new function through a programming language while the application 870 is being executed. The runtime library 2735 may perform input/output management, memory management, or capacities about arithmetic functions.

The application manager 2741 may manage, for example, a life cycle of at least one application of the application 2770. The window manager 2742 may manage a GUI resource which is used in a screen. The multimedia manager 2743 may identify a format necessary for playing diverse media files, and may perform encoding or decoding of media files by using a codec suitable for the format. The resource manager 2744 may manage resources such as a storage space, memory, or source code of at least one application of the application 870.

The power manager 2745 may operate, for example, with a basic input/output system (BIOS) to manage a battery or power, and may provide power information for an operation of an electronic device. The database manager 2746 may generate, search for, or modify database which is to be used in at least one application of the application 2770. The package manager 2747 may install or update an application which is distributed in the form of package file.

The connectivity manager 2748 may manage, for example, wireless connection such as Wi-Fi or Bluetooth. The notification manager 2749 may display or notify an event such as arrival message, promise, or proximity notification in a mode that does not disturb a user. The location manager 2750 may manage location information of an electronic device. The graphic manager 2751 may manage a graphic effect that is provided to a user, or manage a user interface relevant thereto. The security manager 2752 may provide a general security function necessary for system security or user authentication. According to an embodiment, in the case where an electronic device (e.g., an electronic device 100) includes a telephony function, the middleware 2730 may further include a telephony manager for managing a voice or video call function of the electronic device.

The middleware 2730 may include a middleware module that combines diverse functions of the above-described components. The middleware 2730 may provide a module specialized to each OS kind to provide differentiated functions. Additionally, the middleware 2730 may remove a part of the preexisting components, dynamically, or may add a new component thereto.

The API 2760 (e.g., an API 145) may be, for example, a set of programming functions and may be provided with a configuration which is variable depending on an OS. For example, in the case where an OS is the android or the iOS, it may be permissible to provide one API set per platform. In the case where an OS is the Tizen, it may be permissible to provide two or more API sets per platform.

The application 2770 (e.g., an application program 147) may include, for example, one or more applications capable of providing functions for a home 2771, a dialer 2772, an short message service (SMS)/Multimedia Messaging Service (MMS) 2773, an instant message (IM) 2774, a browser 2775, a camera 2776, an alarm 2777, a contact 2778, a voice dial 2779, an e-mail 2780, a calendar 2781, a media player 2782, am album 2783, and a timepiece 2784, or for offering health care (e.g., measuring an exercise quantity or blood sugar) or environment information (e.g., atmospheric pressure, humidity, or temperature).

According to an embodiment, the application 2770 may include an application (hereinafter referred to as "information exchanging application" for descriptive convenience) to support information exchange between the electronic device (e.g., an electronic device 101) and the server 104. The information exchanging application may include, for example, a notification relay application for transmitting specific information to the external electronic device, or a device management application for managing the external electronic device.

For example, the information exchanging application may include a function of transmitting notification information, which arise from other applications (e.g., applications for SMS/MMS, e-mail, health care, or environmental information), to an external electronic device (e.g., electronic devices 102 and 104). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device (e.g., electronic devices 102 and 104), which communicates with the electronic device, an application running in the external electronic device, or a service (e.g., a call service or a message service) provided from the external electronic device.

According to an embodiment, the application 2770 may include an application (e.g., a health care application of mobile medical devices) which is assigned in accordance with an attribute of the external electronic device (e.g., electronic devices 102 and 104). According to an embodiment, the application 870 may include an application which is received from the external electronic device (e.g., the server 106 or the external electronic devices 102 and 104). According to an embodiment, the application 2770 may include a preloaded application or a third party application which is downloadable from a server. The component titles of the program module 2710 according to the embodiment of the present disclosure may be modifiable depending on kinds of OSs.

According to various embodiments, at least a portion of the program module 2710 may be implemented by software, firmware, hardware, or a combination of two or more thereof. At least a portion of the program module 2710 may be implemented (e.g., executed), for example, by a processor (e.g., a processor 120). At least a portion of the program module 2710 may include, for example, modules, programs, routines, sets of instructions, processes, or the like for performing one or more functions.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to various embodiments of the present disclosure may include at least one of an application-specific IC (ASIC) chip, a field-programmable gate array (FPGA), and a programmable-logic device for performing some operations, which are known or will be developed.

According to various embodiments of the present disclosure, at least a portion of an apparatus (e.g., modules or functions thereof) or a method (e.g., operations) according to various embodiments of the present disclosure, for example, may be implemented by instructions stored in a computer-readable storage media in the form of a programmable module. The computer-readable storage media may be, but not limited to, the memory 130.

A computer-readable recording media may include a hard disk, a floppy disk, a magnetic media (e.g., a magnetic tape), an optical media (e.g., compact disc read only memory (CD-ROM) and a digital versatile disc (DVD), a magneto-optical media (e.g., a floptical disk), and a hardware device (e.g., read only memory (ROM), random access memory (RAM), a flash memory, or the like). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a programming module according to an embodiment of the present disclosure may include at least one of the above elements, or a portion of the above elements may be omitted, or additional other elements may be further included. Operations performed by a module, a programming module, or other elements according to an embodiment of the present disclosure may be executed sequentially, in parallel, repeatedly, or in a heuristic method. Also, a portion of operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a processor electrically connected to the display; and
   a memory electrically connected to the processor and configured to store at least one image and instructions,
   wherein the instructions are configured to, when executed by the processor, cause the processor to:
      control the display to display a candidate image, having a first dimension and including at least a portion of the stored at least one image, in a first area of the screen,
      control the display to display a recommendation object, having a second dimension and corresponding to a recommendation image extracted from the candidate image, in a second area of the screen together with the candidate image,
      control the display to display a guide indicating an area corresponding to the recommendation object selected from the candidate image to be overlapped with the candidate image in response to a user input selecting the recommendation object, and control a dimension of the guide in response to a user input with respect to at least a portion of the guide, wherein the candidate image includes at least one feature object and the recommendation image includes a part region of the candidate image, and the part region includes at least a portion of a shape of the at least one feature object extracted from the candidate image, and wherein the recommendation object in the second dimension is smaller than the candidate image in the first dimension and the recommendation object in the second dimension corresponds to a portion of the candidate image.

2. The electronic device of claim 1, wherein the instructions are configured to, when executed by the processor, cause the processor to, when a user input is received to select the recommendation object, apply a recommendation image having a resolution or a dimension higher than the selected recommendation object to a background image of the screen.

3. The electronic device of claim 1, wherein the instructions are configured to, when executed by the processor, cause the processor to control the display to display at least a portion of the recommendation object on the screen such that the recommendation object is overlapped with the candidate image.

4. The electronic device of claim 1, wherein the instructions are configured to, when executed by the processor, cause the processor to, when a user input is received to select the recommendation object, control the display to display the recommendation object through substantially an entire area of the screen as a preview screen.

5. The electronic device of claim 2, wherein the instructions are configured to, when executed by the processor, cause the processor to provide the recommendation object having a display ratio the same as or similar to the candidate image or the recommendation image corresponding to the recommendation object.

6. The electronic device of claim 2, wherein the instructions are configured to, when executed by the processor, cause the processor to control the display to display the recommendation object such that a shape of the recommendation object becomes different in accordance with a dimension and a position of one or more display objects included in the screen or to apply the recommendation image as the background image after changing a shape of the recommendation image.

7. The electronic device of claim 1, wherein the instructions are configured to, when executed by the processor, cause the processor to:
activate a camera in response to an execution of an image operating function, and store an image taken in response to in the memory as the candidate image, or
form a communication channel in response to the execution of the image operating function, and store an image provided from an external device connected thereto in the memory as the candidate image.

8. The electronic device of claim 1, wherein the instructions are configured to, when executed by the processor, cause the processor to:
control the display to display a blank space area outside the candidate image,
arrange the recommendation object in the blank space area, and
allow the recommendation object to have a specific screen ratio.

9. The electronic device of claim 1, wherein the instructions are configured to, when executed by the processor, cause the processor to:
extract the at least one feature object included in the candidate image, and
provide the recommendation object or the recommendation image in accordance with a specific condition.

10. The electronic device of claim 9, wherein the instructions are configured to, when executed by the processor, cause the processor to select the feature object from the candidate image based on at least a portion of user context information.

11. The electronic device of claim 9, wherein the instructions are configured to, when executed by the processor, cause the processor to select the feature object from the candidate image based on at least one of sensor information or time information, which are collected by the electronic device.

12. The electronic device of claim 1, wherein the instructions are configured to, when executed by the processor, cause the processor to provide the recommendation object configured to include at least a portion of a region of interest (ROI) corresponding to a designated person, animal, or thing among the feature objects included in the candidate image or a recommendation image corresponding to the recommendation object.

13. The electronic device of claim 12, wherein the instructions are configured to, when executed by the processor, cause the processor to provide a blank space to the recommendation object or the recommendation image based on a screen ratio of an area in which at least a portion of the at least one ROI is included in the candidate image.

14. The electronic device of claim 1, wherein the instructions are configured to, when executed by the processor, cause the processor to change at least one of a shape, a color, or a dimension of the recommendation object in accordance with property information of the display.

15. The electronic device of claim 1, wherein the instructions are configured to, when executed by the processor, cause the processor to change at least one of a shape, a color, or a dimension of the recommendation object or a recommendation image in accordance with screen property information of an external device connected to the electronic device.

16. The electronic device of claim 1, wherein the instructions are configured to, when executed by the processor, cause the processor to transmit the recommendation object selected by a user input or a recommendation image corresponding to the recommendation object to an external device connected through a communication channel.

17. A method of setting a background image, the method comprising:
displaying, by an electronic device, at least one candidate image including at least one feature object through at least a portion of a display;
displaying, by the electronic device, at least one recommendation object corresponding to a recommendation image extracted from the candidate image and having a dimension smaller than a recommendation object in the displayed candidate image through an area distinguished from the candidate image;
setting, by the electronic device, a recommendation image including a part region of the candidate image, and wherein the part region includes at least a portion of a shape of the at least one feature object extracted from the candidate image corresponding to the recommendation object in the displayed candidate image as a background image in response to a user input selecting the recommendation object;

displaying, by the electronic device, a guide indicating an area corresponding to the recommendation object selected from the candidate image to be overlapped with the candidate image in response to a user input selecting the recommendation object; and setting, by the electronic device, a dimension of the guide in response to a user input with respect to at least a portion of the guide.

18. An electronic device comprising:

a display configured to display a screen including a first periphery and a second periphery substantially vertical to the first periphery;

a processor electrically connected to the display; and a memory electrically connected to the processor and configured to store at least one image and instructions, wherein the instructions are configured to, when executed by the processor, cause the processor to:

control the display to display a candidate image including at least one feature object and comprising at least a portion of the stored at least one image on at least a portion of the screen in a first area of the screen, control the display to display a recommendation object corresponding to a recommendation image extracted from the candidate image, wherein the recommendation image includes a part region of the candidate image, and the part region includes at least a portion of a shape of the at least one feature object extracted from the candidate image and has a length ratio that is substantially equal to a ratio in length of the first periphery to the second periphery on the screen with the first image, wherein a dimension of the second image is smaller than the dimension of the recommendation image in the first image in a second area, receive a user input selecting the recommendation image, set the recommendation image as at least one of a background image or a lock screen of the screen in response to at least a portion of the user input, control the display to display a guide indicating an area corresponding to the recommendation object selected from the candidate image to be overlapped with the candidate image in response to a user input selecting the recommendation object, and control a dimension of the guide in response to a user input with respect to at least a portion of the guide.

* * * * *